(12) United States Patent
Karam et al.

(10) Patent No.: US 10,638,271 B2
(45) Date of Patent: Apr. 28, 2020

(54) SYSTEM, METHOD AND COMPUTER PROGRAM FOR A MONITORING SYSTEM

(71) Applicant: TMA CAPITAL AUSTRALIA PTY LTD, NSW (AU)

(72) Inventors: Anthony Karam, Dural (AU); Gregori Alexandravich Laletin, Liverpool (AU); Kevin John Walsh, Glenmore Park (AU); Paul Blazkiewicz, Denham Court (AU)

(73) Assignee: TMA CAPITAL AUSTRALIA PTY LTD, South Granville (AU)

( * ) Notice: Subject to any disclaimer, the term of this patent is extended or adjusted under 35 U.S.C. 154(b) by 0 days.

(21) Appl. No.: 16/321,351

(22) PCT Filed: Jul. 28, 2017

(86) PCT No.: PCT/AU2017/050785
§ 371 (c)(1),
(2) Date: Jan. 28, 2019

(87) PCT Pub. No.: WO2018/018092
PCT Pub. Date: Feb. 1, 2018

(65) Prior Publication Data
US 2019/0174268 A1 Jun. 6, 2019

(30) Foreign Application Priority Data

Jul. 29, 2016 (AU) .................................. 2016903000
Jul. 29, 2016 (AU) .................................. 2016903001
(Continued)

(51) Int. Cl.
*H04W 4/029* (2018.01)
*G07B 15/04* (2006.01)
(Continued)

(52) U.S. Cl.
CPC ............... *H04W 4/029* (2018.02); *G01S 5/02* (2013.01); *G01S 5/0226* (2013.01); *G07B 15/04* (2013.01);
(Continued)

(58) Field of Classification Search
CPC .... H04J 11/0076; G01S 19/21; G01S 5/0226; G01B 11/26; H04W 4/029; H04W 16/20;
(Continued)

(56) References Cited

U.S. PATENT DOCUMENTS 5,648,767 A 7/1997 O'Connor
6,653,946 B1 * 11/2003 Hassett ................. G01S 13/765
235/384

(Continued)

FOREIGN PATENT DOCUMENTS

AU 2015100112 A4 3/2015
CN 202650084 U 1/2013
(Continued)

OTHER PUBLICATIONS

Stevan Stankovski Gordana Ostojic Nikola Djukic Srdjan Tegeltija Aleksandar Milojkovic, (2014),"Bluetooth parking access control", Sensor Review, vol. 34 Iss 3 pp. 244-254 Permanent link to this document: http://dx.doi.org/10.1108/SR-06-2012-643.
(Continued)

*Primary Examiner* — Phuoc H Doan
(74) *Attorney, Agent, or Firm* — Kilpatrick Townsend & Stockton LLP

(57) ABSTRACT

Disclosed is a system, method, mobile communication device and one or more computer programs for a monitoring system. In one aspect, the system includes a plurality of transmitters, each transmitter having associated therewith a reflector antenna configured to substantially reflect signal transmission toward a detection area; and a mobile device
(Continued)

configured to: receive transmitter signals from at least two transmitters from the plurality of transmitters; and determine that the mobile device is located within the detection area based on received signal strengths of the at least some of the transmitter signals.

23 Claims, 38 Drawing Sheets

(30) Foreign Application Priority Data

| Aug. 3, 2016 | (AU) | ................................ | 2016903055 |
|---|---|---|---|
| Aug. 3, 2016 | (AU) | ................................ | 2016903056 |
| Nov. 3, 2016 | (AU) | ................................ | 2016904487 |
| Nov. 3, 2016 | (AU) | ................................ | 2016904488 |

(51) Int. Cl.
| *G08G 1/00* | (2006.01) |
|---|---|
| *G01S 5/02* | (2010.01) |
| *G08G 1/017* | (2006.01) |
| *G08G 1/065* | (2006.01) |
| *G07B 15/06* | (2011.01) |

(52) U.S. Cl.
CPC ............. *G08G 1/017* (2013.01); *G08G 1/065* (2013.01); *G08G 1/207* (2013.01); *G07B 15/063* (2013.01)

(58) Field of Classification Search
CPC ............... H04W 16/14; H04B 7/18519; H04B 7/18517; H04B 7/0413
USPC .......... 235/384; 398/118; 725/118; 455/41.1, 455/573; 340/5.2
See application file for complete search history.

(56) References Cited

U.S. PATENT DOCUMENTS

| 6,829,550 | B2 | 12/2004 | Kim |
|---|---|---|---|
| 7,053,762 | B2 | 5/2006 | Sakai |
| 7,053,767 | B2 | 5/2006 | Petite et al. |
| 8,456,274 | B2 | 6/2013 | Modiano |
| 8,587,454 | B1 | 11/2013 | Dearworth |
| 8,965,411 | B1 | 2/2015 | Busch-Sorensen |
| 2003/0228846 | A1 | 12/2003 | Berliner et al. |
| 2008/0084272 | A1 | 4/2008 | Modiano |
| 2008/0278347 | A1 | 11/2008 | Ho et al. |
| 2009/0156126 | A1 | 6/2009 | Willis |
| 2009/0314833 | A1 | 12/2009 | Ruiz |
| 2009/0325539 | A1 | 12/2009 | Malik |
| 2012/0130775 | A1 | 5/2012 | Bogaard et al. |
| 2012/0274449 | A1 | 11/2012 | Wilkinson |
| 2012/0283209 | A1 | 11/2012 | Dozzo et al. |
| 2012/0284109 | A1 | 11/2012 | Postrel |
| 2013/0132167 | A1 | 5/2013 | Krug et al. |
| 2014/0232518 | A1 | 8/2014 | Stoehr |
| 2015/0094104 | A1 | 4/2015 | Wilmhoff et al. |
| 2015/0120403 | A1 | 4/2015 | Silberberg |
| 2015/0147067 | A1* | 5/2015 | Ryan .................... H04B 10/116 398/118 |
| 2016/0042575 | A1 | 2/2016 | Ganguly et al. |

FOREIGN PATENT DOCUMENTS

| CN | 203102410 U | 7/2013 |
|---|---|---|
| CN | 103679906 A | 3/2014 |
| CN | 104036574 A | 9/2014 |
| CN | 104537886 A | 4/2015 |
| CN | 104637138 A | 5/2015 |
| DE | 29901677 U1 | 8/2000 |
| DE | 202012103022 U1 | 8/2012 |
| DE | 102014018190 | 7/2015 |
| EP | 1026354 A2 | 8/2000 |
| EP | 2312537 A1 | 4/2011 |
| FR | 2881304 A1 | 7/2006 |
| GB | 600805 | 4/1948 |
| JP | 2003-022460 A | 1/2003 |
| JP | 2003-85456 A | 3/2003 |
| JP | 2004-030114 A | 1/2004 |
| JP | 2005-076288 A | 3/2005 |
| WO | 2004-070674 A2 | 8/2004 |
| WO | 2005-020178 A1 | 3/2005 |
| WO | 2016-123662 A1 | 8/2016 |
| WO | 2018-018092 A1 | 1/2018 |

OTHER PUBLICATIONS

International Search Report and Written Opinion dated Oct. 11, 2017 in PCT/AU2017/050785, all pages.
Supplementary Partial European Search Report dated Mar. 11, 2020 in EP Application No. 17833107, all pages.

* cited by examiner

SYSTEM, METHOD AND COMPUTER PROGRAM FOR A MONITORING SYSTEM

CROSS-REFERENCE TO RELATED APPLICATIONS

The present application claims priority from Australian Provisional Patent Application No 2016903000 filed on 29 Jul. 2016, Australian Provisional Patent Application No. 2016903001 filed on 29 Jul. 2016, Australian Provisional Patent Application No 2016903055 filed on 3 Aug. 2016, Australian Provisional Patent Application No. 2016903056 filed on 3 Aug. 2016, Australian Provisional Patent Application No. 2016904488 filed on 3 Nov. 2016, and Australian Provisional Patent Application No. 2016904487 filed on 3 Nov. 2016, the content of which is incorporated herein by reference.

FIELD OF INVENTION

The present invention relates to a system, method, mobile communication device and one or more computer programs for a monitoring system. In one exemplary form, the monitoring system which monitors vehicles entering and exiting a vehicular parking area.

BACKGROUND

A number of problems exist for monitoring systems. For example, in relation to monitoring systems which monitor the entry and exiting of vehicles for a vehicular parking facility, the most common technique is the use of a ticketing system. In particular, a physical ticket is issued to the driver at the entry point when being granted access to the parking facility. The driver can then present the ticket to a payment machine in order to pay for the time that the vehicle has been parked in the parking facility. The ticket can then be presented to another ticket machine at an exit point to be allowed to leave the parking facility. Such ticketing systems have numerous problems. For example, because of the design of particular vehicles and parking facilities, some drivers find it difficult to collect the ticket from the ticket machine at the entry point or insert a ticket for reading with the ticket reader at the exit point without exiting the vehicle. Generally, the driver may also attempt to hold/find the ticket while driving within the parking facility which can distract the driver and may result in accidents. Furthermore, if the ticket is lost by the driver, the driver is generally required to pay full fare in order to exit the parking facility. Additionally, at busy parking facilities, there can be an extensive queue of drivers at payment machines to pay for their respective parking. Furthermore, at busy parking facilities, there can be a significant queue at the ticket issuing and reading machines due to the time spent by the driver collecting and inserting the ticket.

Some attempts have been made to configure monitoring systems to automatically detect an approaching user's mobile device when at a specified location relative to the entry point or exit point. However, current positioning systems of mobile device's are quite inaccurate or may not be appropriate for the particular problem at hand. For example, Bluetooth beacon systems are generally affected by various changing interference from the environment meaning that the user's mobile phone may detect a beacon signal at varying distances from the entry or exit signal. Other positioning systems such as satellite positioning systems (e.g. GPS) are generally only accurate within 3.5 meters however it is not uncommon that the detected position may be accurate to only within 10 meters. Satellite positioning systems are generally useful in outdoor environments. In areas such as underground carparks, satellite positioning systems may simply not be available or the accuracy will be extremely poor and therefore be inappropriate for determining if user's mobile device is at a specified location relative to the entry point or exit point in order to determine if the user is allowed to enter or exit the restricted area.

Other problems exist for other applications of monitoring systems. For example, a residential/commercial building may have a monitoring system in the form of an access control system for residential parking which can be activated by using a hand operated radio transmitter or a proximity card in order to open a gate, roller door or the like. As some drivers tend to attempt to locate the radio transmitter or proximity card prior to approaching the gate/door whilst driving in order to speed up the access process, the driver tends to become distracted which can lead to accidents. Furthermore, if a new user wishes to access the restricted parking area, a new hand held transmitter or proximity card may need to be ordered, particularly if the access control system is a proprietary system.

In relation to building access control system, users may be required to carry an identification device, such as a proximity card or the like, which can be read by a reading device in order for an access controlled door or the like to be opened. However, a large number of users tend to store their identification device in a bag or wallet which in some instances must be removed in order to be read. This can be frustrating and time consuming for the user. Additionally, as users tend to carry a number of items when travelling through such access controlled doors, it is frustrating that a dedicated device, with no other purpose, needs to be carried with the user when attempting to access the restricted area.

Monitoring systems for detecting when a user's mobile device is located in a particular room or area is extremely difficult to achieve with significant accuracy. Existing systems include Apple iBeacon™ rely cannot control the distance which a signal propagates with any accuracy. Therefore, a mobile device may determine it is within a particular room or area where in fact the signal emitted by the iBeacon™ may have propagated substantially further than intended thereby providing a false positive detection.

There is therefore a need to alleviate one or more of the above-mentioned problems or provide a commercial alternative.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that seeks one advantage or group of advantages as taught herein without necessarily seeking other advantages as may be taught or suggested herein.

In one aspect there is provided a system including:
a plurality of transmitters, each transmitter having associated therewith a reflector antenna configured to substantially reflect signal transmission toward a detection area; and
a mobile device configured to:
receive transmitter signals from at least two transmitters from the plurality of transmitters; and
determine that the mobile device is located within the detection area based on received signal strengths of the at least some of the transmitter signals.

In certain embodiments, each reflector antenna is a corner reflector antenna.

In certain embodiments, the respective reflecting walls of each reflector antenna are walls of a bollard housing the respective transmitter.

In certain embodiments, a dipole driven element of each transmitter is spaced from the corner reflector antenna by a spacing bracket mounted within the respective bollard.

In certain embodiments, each bollard includes a cutout section to enable transmission of the respective transmitter signal by the respective transmitter.

In certain embodiments, each bollard has a protective cover to substantially cover the respective cutout section without substantially inhibiting the transmission of the respective transmitter signal by the respective transmitter toward the detection area.

In certain embodiments, each bollard has upper and lower signal suppression material located above and below the transmitter to substantially suppress diffraction of transmission of the respective transmitter signal in an upward and downward direction.

In certain embodiments, each bollard has a substantially square cross-sectional profile.

In certain embodiments, the plurality of transmitters consists of two transmitters, wherein the plurality of transmitters are spaced apart from each other and the reflector antennas of the transmitters face substantially toward each other to thereby define the detection area in at least some of the area therebetween.

In certain embodiments, the plurality of transmitters consists of three transmitters, wherein the plurality of transmitters are spaced apart from each other in a triangular configuration and the reflector antennas of the plurality of transmitters face substantially toward each other to thereby define the detection area in at least some of the area therebetween.

In certain embodiments, the plurality of transmitters consists of four transmitters, wherein the plurality of transmitters are spaced apart from each other in a quadrilateral configuration and the reflector antennas of the plurality of transmitters face substantially toward each other to thereby define the detection area in at least some of the area therebetween.

In certain embodiments, the plurality of transmitters are Bluetooth devices.

In certain embodiments, the Bluetooth devices are Bluetooth Low Energy (BLE) devices.

In certain embodiments, the determination that the mobile device is located within the detection area is based on a mean value of the received signal strengths.

In certain embodiments, the mean value is one of:
a harmonic mean value; and
a geometric mean value.

In certain embodiments, the mobile device is configured to determine a mask value using the received signal strengths for the least some of the transmitters, wherein the mobile device uses the mean value and the mask value to determine if the mobile device is located in one of a plurality of detection areas associated with the plurality of transmitters.

In certain embodiments, the mobile device is configured to:
determine a first mask value based on a discrepancy between a first mean value of the received signal strength for signals received from a first pair of the transmitters of the plurality of transmitters and a second mean value of the received signal strength for signals received from a second pair of the transmitters of the plurality of transmitters;
determine a second mask value based on a discrepancy between the second mean value the first mean value;
determine if the mobile device is located in a first detection area in the event that one or more first criteria are satisfied based on masking the mean value using the first mask value; and
determine if the mobile device is located in a second detection area in the event that one or more second criteria are satisfied based on masking the mean value using the second mask value.

In certain embodiments, the mobile device is configured to determine that the mobile device is located within the detection area in response to the mobile device determining that the mean value of the received signal strengths is greater than or equal to a signal strength threshold over a threshold period of time.

In certain embodiments, the mobile device is configured to determine that the mobile device is located within the detection area in response to the mobile device determining that the mean value of the received signal strengths is greater than or equal to a first signal strength threshold over a threshold period of time starting when the mean value of the received signal strengths is greater than a second signal strength threshold, wherein the second signal strength threshold is greater than the first signal strength threshold.

In certain embodiments, the mobile device is configured to transfer data indicative of the determination that the mobile device is within the detection area to a monitoring system.

In certain embodiments, the monitoring system includes a controller with an associated communication device, wherein the data indicative of the determination is an access request generated and transferred by the mobile device which is received by the controller via the communication device, wherein the controller is configured to facilitate, based on the request, instructing an access control system to allow the entity to travel through an entry or exit point.

In certain embodiments, the entry or exit points are associated with a vehicular parking facility.

In certain embodiments, at least one of the entry request and the exit request generated by the mobile communication device is indicative of one or more wireless devices which the mobile communication device is currently connected thereto, wherein in the event that the controller receives data indicative of a plurality of substantially simultaneous entry or exit requests received from multiple mobile communication devices, the one or more connected wireless devices indicated by at least one of the entry request or exit request is used to at least partially determine which entry or exit request from the plurality of substantially simultaneous entry or exit requests to process.

In certain embodiments, the mobile communication device is configured to determine, using the received signal strengths of the at least some of the transmitter signals, a positional offset of the mobile device within the detection area, wherein at least one of the entry or exit request is indicative of a positional offset of the mobile device within the detection area, wherein in the event that the controller receives data indicative of a plurality of substantially simultaneous entry or exit requests received from multiple mobile communication devices, the positional offset indicated by at least one of the entry request or exit request is used to at least partially determine which entry or exit request from the plurality of substantially simultaneous entry or exit requests to process.

In a second aspect there is provided a method including:

transmitting, from a plurality of transmitters, transmitter signals, wherein each transmitter has associated therewith a reflector antenna configured to substantially reflect signal transmission toward a detection area; and determine, at a mobile device, that the mobile device is located within the detection area based on received signal strengths of at least two transmitter signals of the plurality of transmitter signals.

In certain embodiments, the determination that the mobile device is located within the detection area is based on a mean value of the received signal strengths.

In certain embodiments, the mean value is one of:
a harmonic mean value; and
a geometric mean value.

In certain embodiments, the method includes the mobile device determining a mask value using the received signal strengths for the least some of the transmitters, wherein the mobile device uses the mean value and the mask value to determine if the mobile device is located in one of a plurality of detection areas associated with the plurality of transmitters.

In certain embodiments, the method includes the mobile device:

determining a first mask value based on a discrepancy between a first mean value of the received signal strength for signals received from a first pair of the transmitters of the plurality of transmitters and a second mean value of the received signal strength for signals received from a second pair of the transmitters of the plurality of transmitters;

determining a second mask value based on a discrepancy between the second mean value the first mean value;

determining if the mobile device is located in a first detection area in the event that one or more first criteria are satisfied based on masking the mean value using the first mask value; and determining if the mobile device is located in a second detection area in the event that one or more second criteria are satisfied based on masking the mean value using the second mask value.

In certain embodiments, the method includes the mobile device determining that the mobile device is located within the detection area in response to the mobile device determining that the mean value of the received signal strengths is greater than or equal to a signal strength threshold over a threshold period of time.

In certain embodiments, the method includes the mobile device determining that the mobile device is located within the detection area in response to the mobile device determining that the mean value of the received signal strengths is greater than or equal to a first signal strength threshold over a threshold period of time starting when the mean value of the received signal strengths is greater than a second signal strength threshold, wherein the second signal strength threshold is greater than the first signal strength threshold.

In certain embodiments, the method includes the mobile device transferring data indicative of the determination that the mobile device is within the detection area to a monitoring system.

In certain embodiments, the monitoring system includes a controller with an associated communication device, wherein the data indicative of the determination is a request generated and transferred by the mobile device which is received by the controller via the communication device, wherein the method includes the controller instructing, based on the request, an access control system to allow the entity to travel through an entry or exit point.

In certain embodiments, the entry or exit point are associated with a vehicular parking facility.

In certain embodiments, at least one of the entry request and the exit request generated by the mobile communication device is indicative of one or more wireless devices which the mobile communication device is currently connected thereto, wherein in the event that the controller receives data indicative of a plurality of substantially simultaneous entry or exit requests received from multiple mobile communication devices, the method includes the controller using the one or more connected wireless devices indicated by at least one of the entry request or exit request to at least partially determine which entry or exit request from the plurality of substantially simultaneous entry or exit requests to process.

In certain embodiments, the mobile communication device is configured to determine, using the received signal strengths of the at least some of the transmitter signals, a positional offset of the mobile device within the detection area, wherein at least one of the entry or exit request is indicative of a positional offset of the mobile device within the detection area, wherein in the event that the controller receives data indicative of a plurality of substantially simultaneous entry or exit requests received from multiple mobile communication devices, the method includes the controller using the positional offset indicated by at least one of the entry request or exit request to at least partially determine which entry or exit request from the plurality of substantially simultaneous entry or exit requests to process.

In a third aspect there is provided a system including:

a plurality of transmitters, each transmitter having associated therewith a reflector antenna configured to substantially reflect signal transmission toward a detection area; and a computer program executable by a mobile device associated with an entity, wherein the mobile device is configured to:

receive transmitter signals from at least two transmitters from the plurality of transmitters; and determine that the mobile device is located within the detection area based on received signal strengths of the at least some of the transmitter signals.

Other aspects and embodiments will be appreciated throughout the detailed description.

BRIEF DESCRIPTION OF THE FIGURES

Example embodiments should become apparent from the following description, which is given by way of example only, of at least one preferred but non-limiting embodiment, described in connection with the accompanying figures.

DETAILED DESCRIPTION OF EXAMPLE EMBODIMENTS

Figure 1:
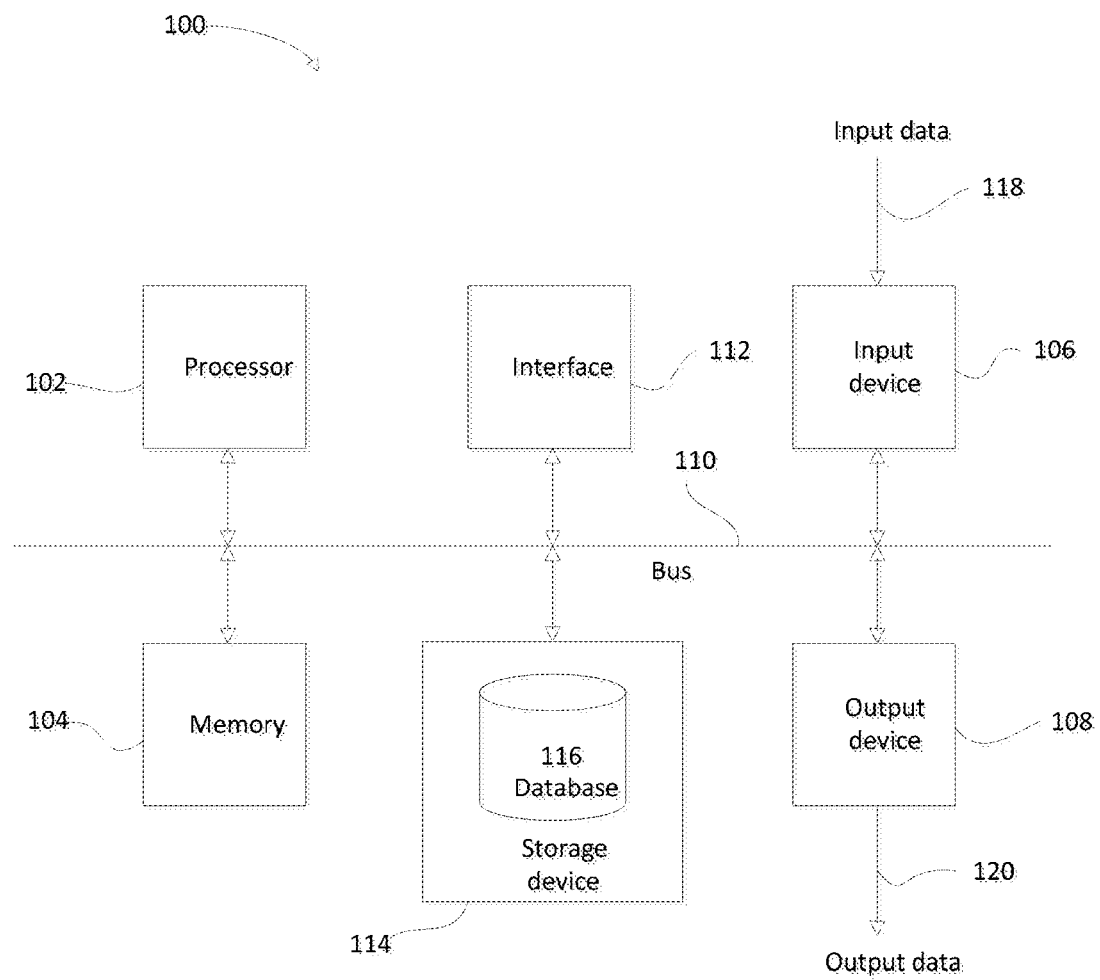
FIG. 1 illustrates a functional block diagram of an example processing device that can be utilized to embody or give effect to a particular embodiment.

The following modes, given by way of example only, are described in order to provide a more precise understanding of the subject matter of a preferred embodiment or embodiments. In the figures, incorporated to illustrate features of an example embodiment, like reference numerals are used to identify like parts throughout the figures.

A particular embodiment of the present invention can be realised using a processing device, an example of which is shown in FIG. 1. In particular, the processing device 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing device 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could include more than one distinct processing device, for example to handle different functions within the processing device 100.

Input device 106 receives input data 118 (such as electronic content data), for example via a network or from a local storage device. Output device 108 produces or generates output data 120 (such as viewable content) and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

Examples of electronic data storage devices 114 can include disk storage, optical discs, such as CD, DVD, Blu-ray Disc, flash memory/memory card (e.g., solid state semiconductor memory), MultiMedia Card, USB sticks or keys, flash drives, Secure Digital (SD) cards, microSD cards, miniSD cards, SDHC cards, miniSDSC cards, solid-state drives, and the like.

In use, the processing device 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. The processor 102 receives instructions as input data 118 via input device 106 and can display processed results or other output to a user by utilising output device 108. More than one input device 106 and/or output device 108 can be provided. It should be appreciated that the processing device 100 may be any form of terminal, PC, laptop, notebook, tablet, smart phone, specialised hardware, or the like.

Figure 2:
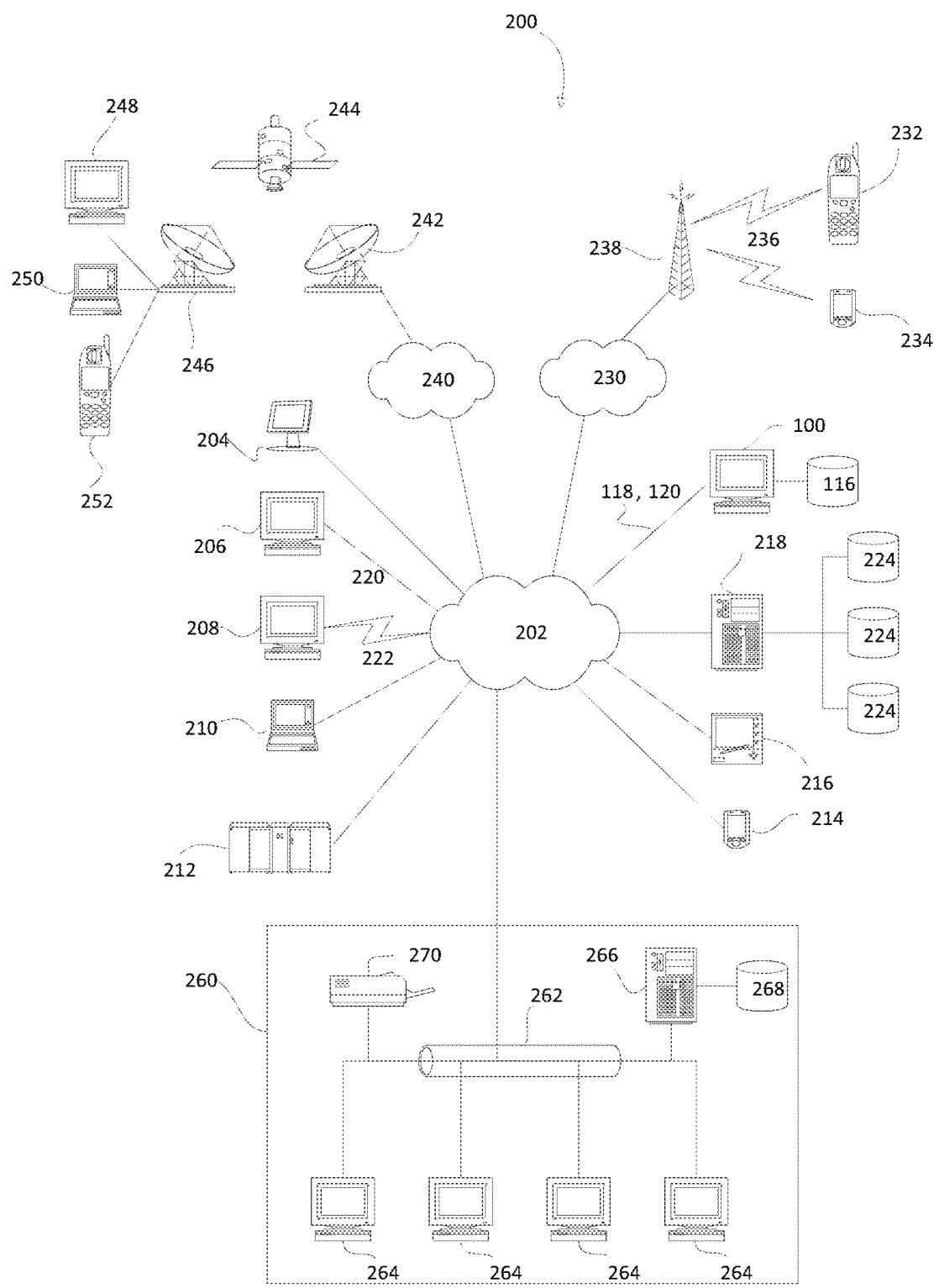
FIG. 2 illustrates an example network infrastructure that can be utilized to embody or give effect to a particular embodiment.

The processing device 100 may be a part of a networked communications system 200, as shown in FIG. 2. Processing device 100 could connect to network 202, for example the Internet or a WAN. Input data 118 and output data 120 could be communicated to other devices via network 202. Other terminals, for example, thin client 204, further processing systems 206 and 208, notebook computer 210, mainframe computer 212, PDA 214, pen-based computer 216, server 218, etc., can be connected to network 202. A large variety of other types of terminals or configurations could be utilized. The transfer of information and/or data over network 202 can be achieved using wired communications means 220 or wireless communications means 222. Server 218 can facilitate the transfer of data between network 202 and one or more databases 224. Server 218 and one or more databases 224 provide an example of an information source.

Other networks may communicate with network 202. For example, telecommunications network 230 could facilitate the transfer of data between network 202 and mobile or cellular telephone 232 or a PDA-type device 234, by utilising wireless communication means 236 and receiving/transmitting station 238. Satellite communications network 240 could communicate with satellite signal receiver 242 which receives data signals from satellite 244 which in turn is in remote communication with satellite signal transmitter 246. Terminals, for example further processing system 248, notebook computer 250 or satellite telephone 252, can thereby communicate with network 202. A local network 260, which for example may be a private network, LAN, etc., may also be connected to network 202. For example, network 202 could be connected with ethernet 262 which connects terminals 264, server 266 which controls the transfer of data to and/or from database 268, and printer 270. Various other types of networks could be utilised.

The processing device 100 is adapted to communicate with other terminals, for example further processing systems 206, 208, by sending and receiving data, 118, 120, to and from the network 202, thereby facilitating possible communication with other components of the networked communications system 200.

Thus, for example, the networks 202, 230, 240 may form part of, or be connected to, the Internet, in which case, the terminals 206, 212, 218, for example, may be web servers, Internet terminals or the like. The networks 202, 230, 240, 260 may be or form part of other communication networks, such as LAN, WAN, ethernet, token ring, FDDI ring, star, etc., networks, or mobile telephone networks, such as GSM, CDMA or 3G, 4G, etc., networks, and may be wholly or partially wired, including for example optical fibre, or wireless networks, depending on a particular implementation.

Figure 3:
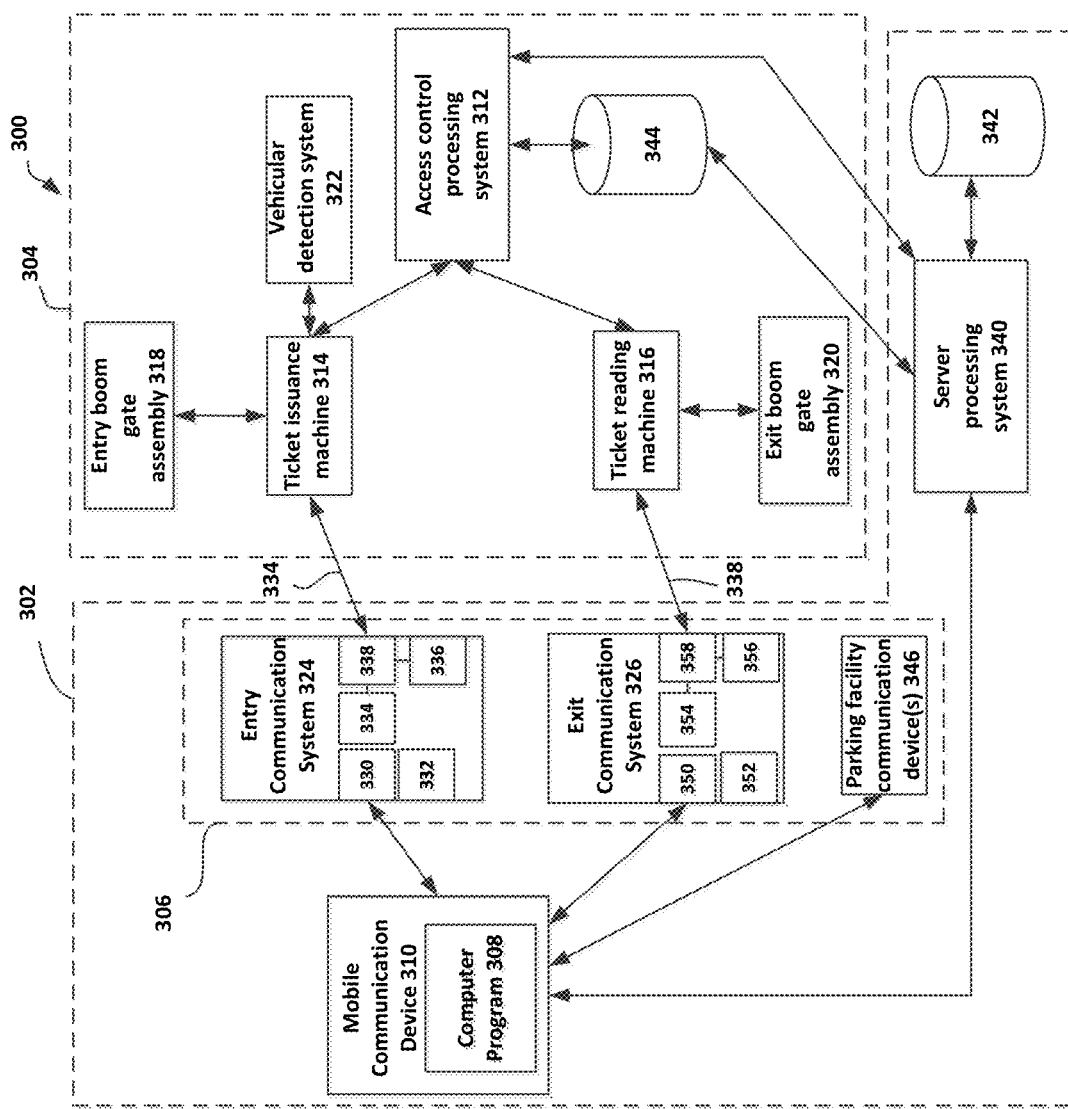
FIG. 3 illustrates a block diagram of an example system for an access control system for a parking facility.

Referring to FIG. 3 there is shown an example system 302 for use with a monitoring system providing in the form of an access control system 304 for a vehicular parking facility such as a vehicular parking station. In one form, the system 302 operates as a virtual ticketing system. The systems 302, 304 operate together to form system 300.

In particular, the system 302 includes a communication system 306 associated with the vehicular parking facility and a computer program 308 executable upon a mobile device such as a mobile communication device 310.

The mobile communication device 310 can be provided in the form of a processing device 100 and more specifically in the form of a smart phone, a tablet processing system or the like. In particular, the mobile communication device 310 generally includes a processor 102, memory 104, an input device 106, an output device 108, and a communication interface 112 coupled together via a bus. The input and output device 106, 108 can be provided in an integrated form such as a touch screen display. In particular embodiments, the mobile communication device 310 can include a camera device. The mobile communication device 310 is generally associated with an entity such as a user which could be a driver or a passenger of the vehicle. The computer program 308 can be provided in the form of a 'mobile app'.

In use, the mobile communication device 310 could be located near the user in the vehicle, in the user's pocket, mounted within the vehicle, or the like. Preferably, the user does not need to interact with the mobile communication device 310 during use in order for communication to occur between the mobile communication device 310 and the communication system 206. Rather, the mobile communication device 310 is configured to automatically operate and communicate with the communication system without user input in order to enter and exit the restricted vehicular parking area.

The access control system 304 of the vehicular parking facility can be a ticket issuance system including an access control processing system 312, an entry controller 314 in the form of a ticket issuance machine at an entry point of the vehicular parking facility, an exit controller 316 in the form of a ticket reading machine at the exit point of the vehicular parking facility, an automated entry and exit assembly 318, 320 (e.g. an automatically controlled boom gate) at the respective entry and exit points, and a vehicular detection system 322. The access control processing system 312 can be provided in the form of processing system 100.

Advantageously, the described system 302 can be retrofitted with an existing access control system 304 that currently issues physical tickets such that an entity has an option to receive authorisation data in the form of a virtual ticket to their respective mobile communication device 310. However, it is possible for the system 300 can be newly designed and installed which includes system 302. For the purposes of clarity, the entity is this example is a user associated with the mobile communication device 310.

Referring more specifically to FIG. 3, the communication system 306 is generally a local communication system that utilises wireless communication. The communication system 306 includes an entry communication system 324 including at least one entry communication device associated with the entry point of the restricted area and an exit communication system 326 including at least one exit communication device associated with the exit point of the restricted area.

In a preferable form, the communication system 306 includes a plurality of entry communication devices associated with the entry point of the restricted area and a plurality of exit communication devices associated with the exit point of the restricted area. As will be described in more detail below, the use of multiple entry and exit communication devices can be advantageous to handle different mobile communication devices which have different communication characteristics (e.g. speed, communication sensitivity, etc.).

More specifically, the entry communication system 324 includes a first entry communication device 334 located a short distance (i.e. 0.5 to 10 metres) prior to the ticket issuance machine 314 and the entry boom gate assembly 318 at the entry point of the parking facility. Similarly, a first exit communication device 354 is located a small distance (i.e. 0.5 to 10 metres) prior to the ticket reading machine 316 and the exit boom gate assembly 320 at the exit point of the parking facility. In one form, the first entry communication device 334 and the first exit communication device 354 are located inside respective bollards. The first entry and exit communication devices 334, 354 are preferably fixed devices. Preferably, the first entry communication device 334 and the first exit communication device 354 communicate use Bluetooth protocol such as Bluetooth Low Energy. The wireless signal transmitted by the first entry and exit communication devices 334, 354 are indicative of a unique device identity/address for the respective communication device.

Figure 5:
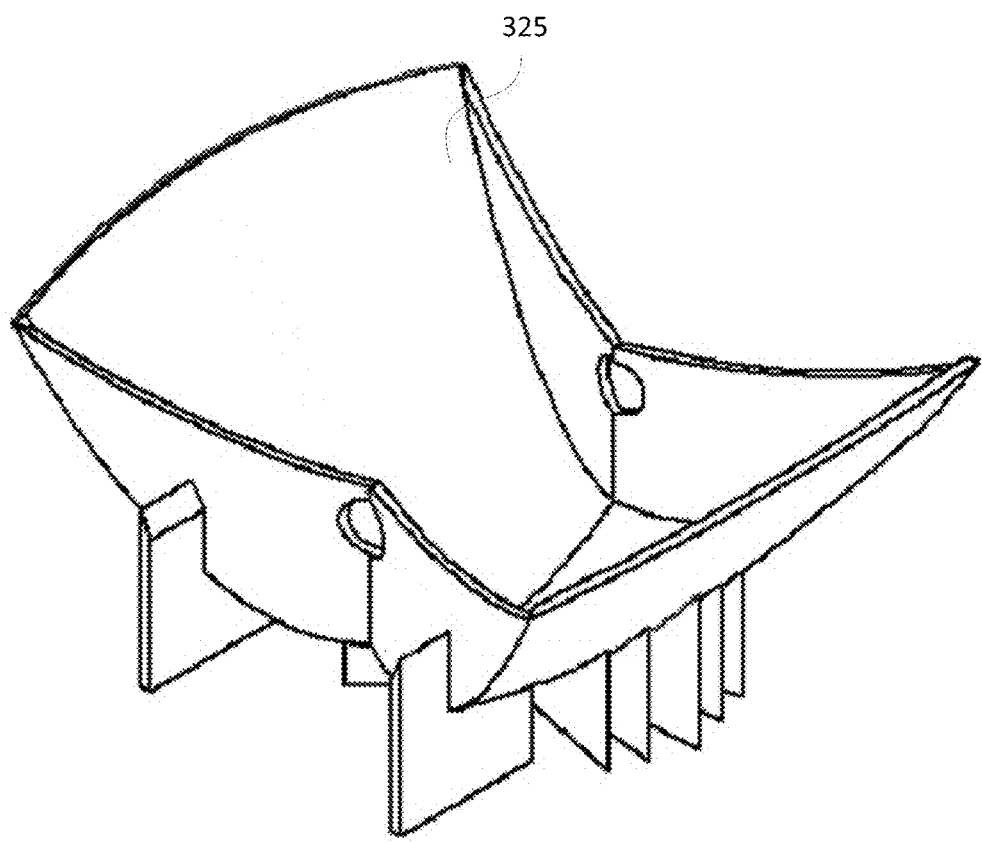
FIG. 5 illustrates an isometric view of an example of an entry or exit communication device body.
Figure 6:
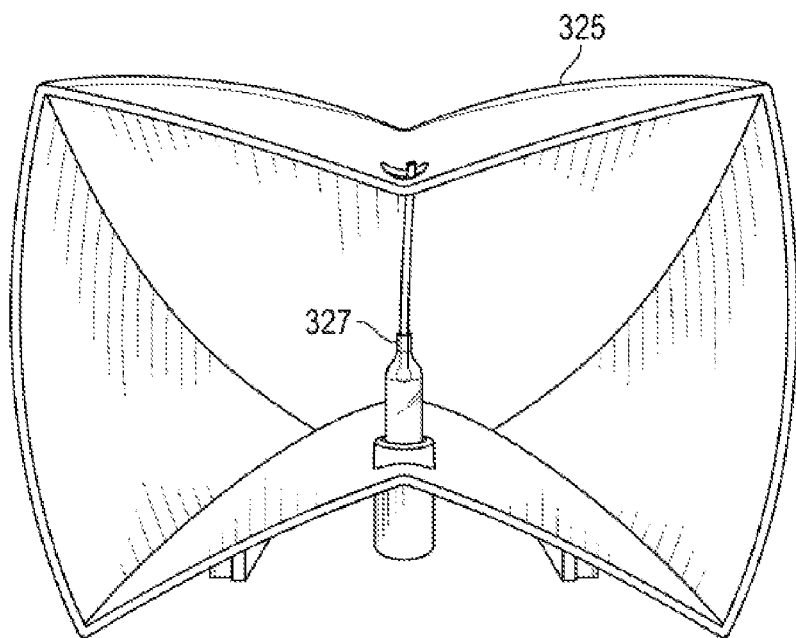
FIG. 6 illustrates a perspective front view of an example of a portion of the entry or exit communication device.
Figure 7:
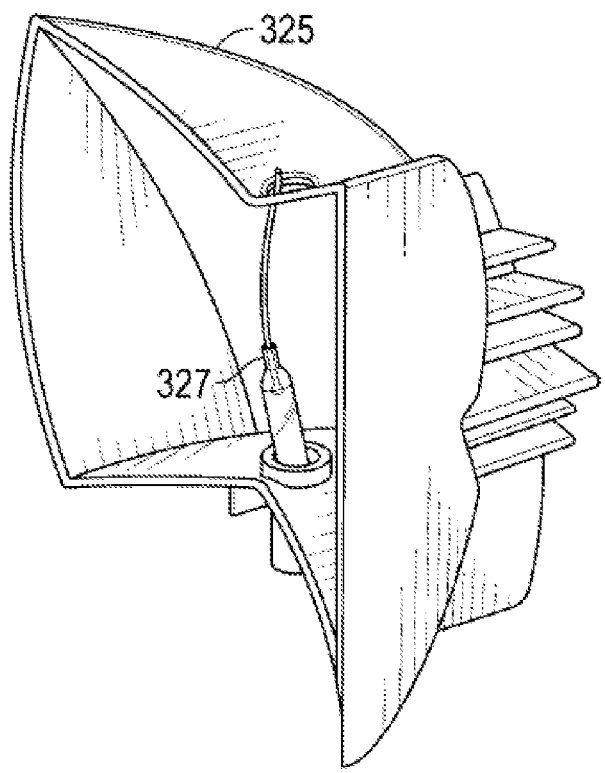
FIG. 7 illustrates a perspective side view of a portion of the entry or exit communication device of FIG. 6.
Figure 8:
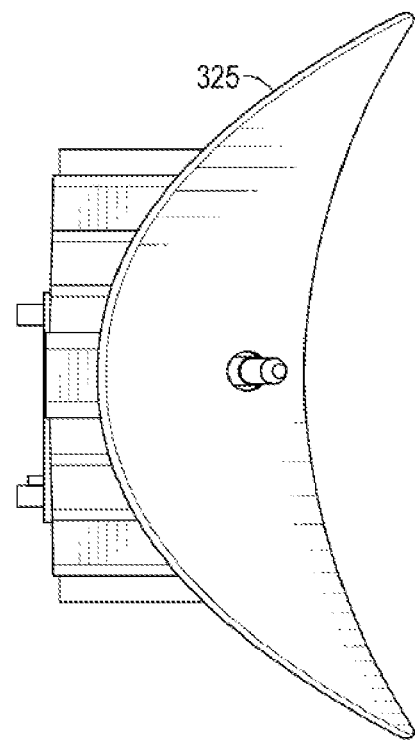
FIG. 8 is an elevated view of a portion of the entry or exit communication device of FIG. 6.
Figure 9:
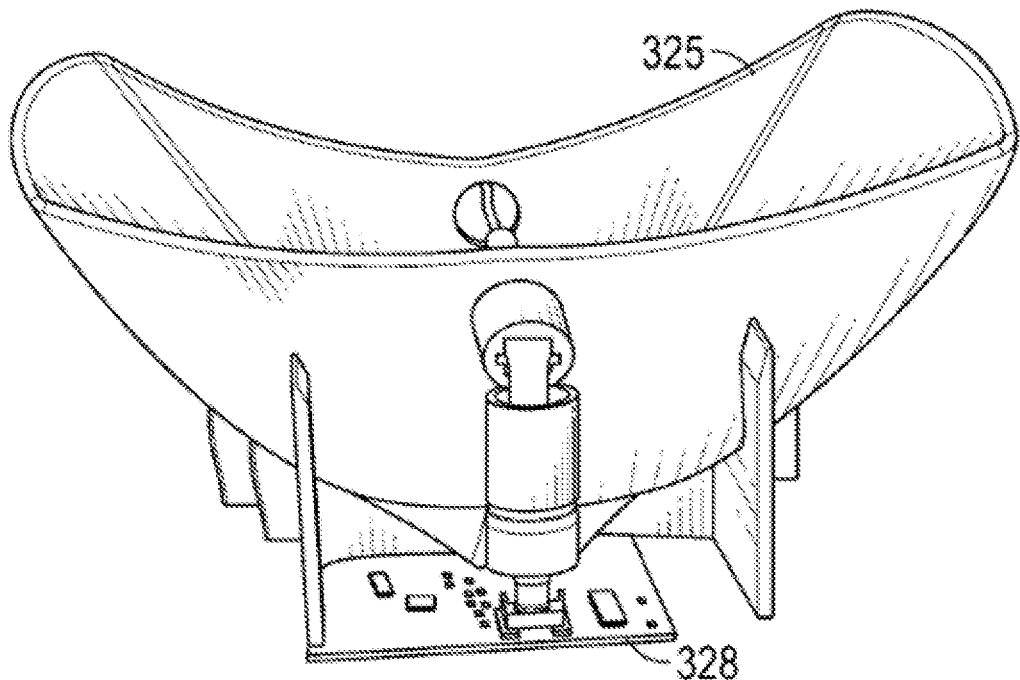
FIG. 9 is a perspective end view of a portion of the entry or exit communication device of FIG. 6.

Referring to FIG. 5 there is shown a communication device body 325 of the first entry communication device 334 or the first exit communication device 354 which has a parabolic internal shaped wall to define a directional antenna. FIGS. 6 to 9 show the communication device body assembled with a microcontroller 328 which is mounted to the rear surface of the communication device body 325. The microcontroller 328 is configured to perform various wireless communication processing. As can be seen in FIGS. 6 to 9, the antenna element 327 which is in electrical communication with the microcontroller 328, is located at a focus point of the parabolic shaped internal wall. The parabolic shaped wall of the communication device body 325 defines a focused transmission region, like a "hotspot", which the mobile communication device 310 is able to detect a strong increase in received signal strength compared to areas outside the focused transmission region. As shown in FIGS. 5 to 9, the directional antenna of the first entry and first exit communication devices 334, 354 is a parabolic antenna which advantageously focuses the transmission of the transmitted signal within a specific region whilst still capturing transmitted signals from the mobile communication device 310 over a broad region. It will be appreciated that a cover can extend between the side edges of the body 325 which is substantially flush with the external wall of the bollard, although for clarity purposes this has not been shown in FIGS. 5 to 9.

In a preferable form, the entry communication system 324 of the communication system 306 can further include a second entry communication device 336 located within or near the ticket issuance machine 318. Furthermore, the exit communication system 326 of the communication system 306 can further include a second exit communication device 356 located within or near the ticket reading machine 316. The second entry and exit communication devices 336, 356 are preferably fixed devices. In a preferable form, the second entry and second exit communication devices 336, 356 are Bluetooth communication devices using Bluetooth Low Energy. The wireless signal transmitted by the second entry and exit communication devices 336, 356 are indicative of a unique device identity/address for the respective communication device. The second entry communication device 336 is part of or coupled to an entry point microcontroller 338, such as a Raspberry Pi microcontroller or the like, located within or near the ticket issuance machine 314. The first entry communication device 334 is also coupled, via a wired medium that extends between the bollard and the ticket issuance machine 314, to the entry point microcontroller 338. Similarly, the second exit communication device 356 is part of or coupled, via a wired medium, to an exit point microcontroller 358, such as a Raspberry Pi microcontroller or the like, located in or near the ticket reading machine 316. The first exit communication device 354 is also part of or coupled to the exit point microcontroller 358 via a wired medium that extends between the bollard and the ticket reading machine 316.

The entry communication system 324 of the communication system 306 preferably further includes a third and fourth entry communication device 330, 332 provided in the form of a first entry transmitter 330 and a second entry transmitter 332. Furthermore, the exit communication system 326 of the communication system 306 further includes a third and fourth exit communication device 350, 352 provided in the form of first exit transmitter 350 and a second exit transmitter 352. The first and second entry and exit transmitters 330, 332, 350, 352 are configured to operate as beacons, each periodically transmitting a unique wireless signal which can be received by an approaching mobile communication device 310. The unique wireless signal can be indicative of a unique identity (such as a universally unique identifier) associated with the respective communication device. The unique wireless signals which can be received by an approaching mobile communication device 310 can be used by the mobile communication device 310 to determine which side of the vehicle (i.e. left or right) the approaching mobile communication device 310 is located. As will be explained in further detail below, determining whether a particular mobile communication device 310 is located on the left or right side of the vehicle 1000 can be used to distinguish between multiple mobile communication devices 310 located in the vehicle 1000 which are substantially simultaneously attempting to communicate with the communication system 306. Additionally, the received wireless signals from the transmitters 330, 332, 350, 352 can be analysed by the approaching mobile communication device 310 to assist with determining when an entry or exit request should be transmitted by the mobile communication device 310.

Figure 10A:
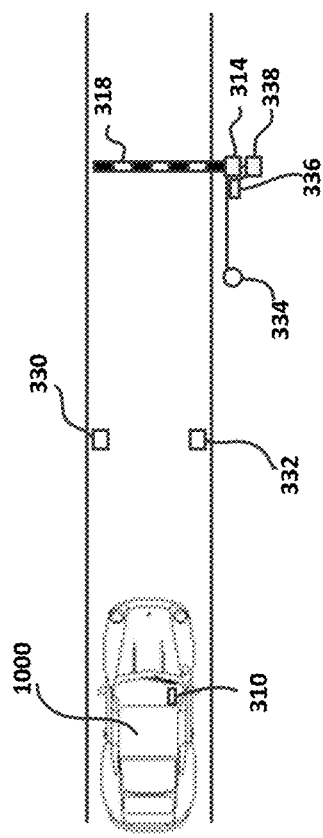
FIGS. 10A to 10C are plan views of a schematic illustrating a vehicle approaching an entry point and being granted access to park within a parking facility using the system of FIG. 3.
Figure 10B:
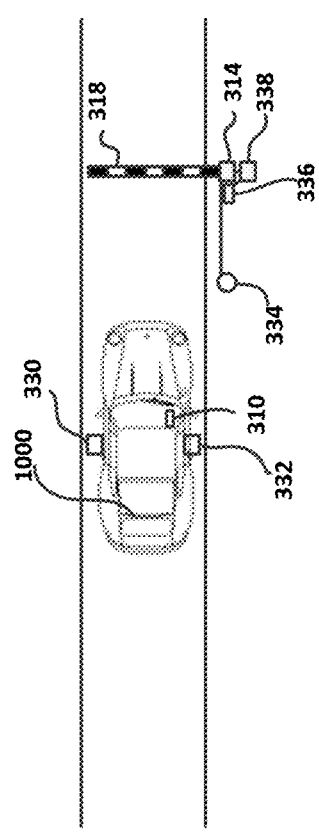
Figure 10C:
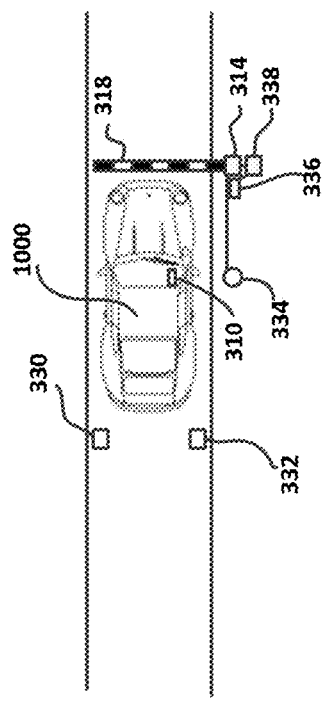

The first and second entry transmitters 330, 332 are generally located adjacent opposing sides of the entry path (i.e. road or driveway) as shown in FIGS. 10A to 10C. In particular, the first and second entry transmitters 330, 332 are spatially offset relative to the centre of the vehicle entry path. In one particular form, the first entry transmitter 330 and second entry transmitter 332 may be mounted/embedded on/in a roof surface, ground surface, or wall surface of the parking facility. Generally, the first and second entry transmitters 330, 332 are aligned substantially orthogonal relative to the travel direction of the vehicle 1000 along the entry vehicle path when passing the first and second entry transmitters 330, 332. In one form, the first and second entry transmitters 330, 332 share a common power source although it is possible for separate power sources.

Figure 11C:
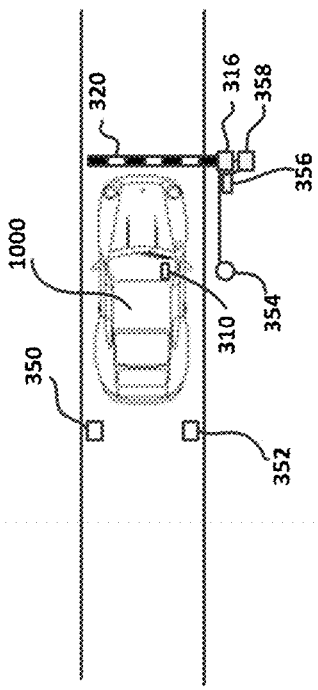
FIGS. 11A to 11C are plan views of a schematic illustrating a vehicle approaching an exit point and being authorised to leave the parking facility using the system of FIG. 3.
Figure 11A:
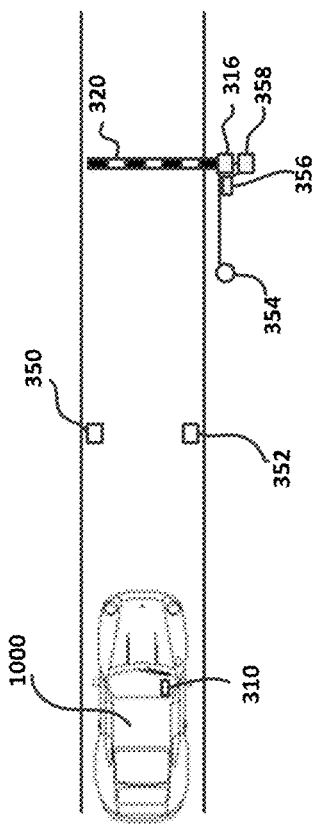
Figure 11B:
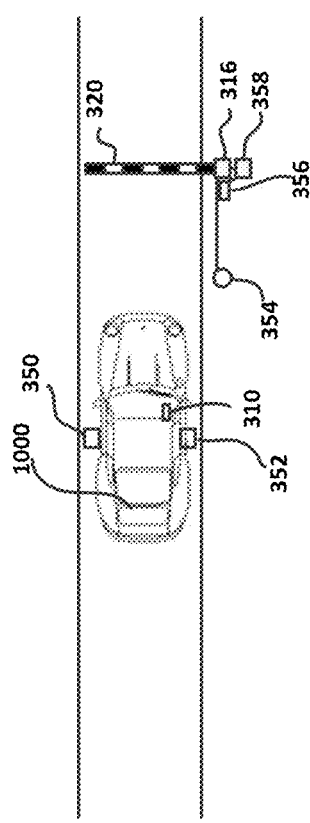

Similarly, the first and second exit transmitters 350, 352 are generally located adjacent opposing sides of the exit path (i.e. road or driveway) as shown in FIGS. 11A to 11C. In particular, the first and second exit transmitters 350, 352 are spatially offset relative to the centre of the vehicle exit path. In one particular form, the first exit transmitter 350 and second exit transmitter 352 may be mounted/embedded on/in a roof surface, ground surface, or wall surface of the parking facility. Generally, the first and second exit transmitters 350, 352 are aligned substantially orthogonal relative to the travel direction of the vehicle 1000 along the exit vehicle path when passing the first and second exit transmitters 350, 352. In one form, the first and second exit transmitters 350, 352 share a common power source although it is possible for separate power sources.

In a general form, the mobile communication device 310 is configured to generate and transfer the entry request in response to receiving a first entry signal from the first entry communication device 334 that satisfies an entry criteria. Additionally, the mobile communication device 310 is configured to generate and transfer the exit request in response to receiving a first exit signal 354 from the first exit communication device that satisfies an exit criteria. In one form, the entry criteria and the exit criteria are based at least partially on the received signal strength of the received first entry signal and the first exit signal respectively.

In more preferable forms, the mobile communication device 310 is configured to generate and transfer the entry request in response to receiving a first entry signal from the first entry communication device 334 and a second entry signal from the second entry communication device 336 which substantially simultaneously satisfy one or more entry criteria. Similarly, in more preferable forms, the mobile communication device 310 is configured to generate and transfer the exit request in response to receiving a first exit signal from the first exit communication device 354 and a second exit signal from the second exit communication device 356 which substantially simultaneously satisfy one or more exit criteria.

Due to a wide variety of locations which the mobile communication device 310 can be located in a vehicle 1000 which can impact upon the received signal strength, and also the varying signal receiving characteristics of a wide variety of mobile communication devices 310, in some instances it may not be possible to predefine the entry criteria and the exit criteria solely dependent upon a predefined threshold received signal strength. Therefore, in a preferable form, the mobile communication device 310 is configured to dynamically determine an entry scale value based on the received signal strength of a plurality of third and/or fourth entry signals received from the first and second entry transmitters 330, 332 such that a predefined entry criteria can be utilised by the mobile communication device 310 to determine when to transfer the entry request using the entry scale value. Similarly, the mobile communication device 310 is configured to dynamically determine an exit scale value based on the received signal strength of a plurality of third and/or fourth exit signals received from the first and second exit transmitters 350, 352 such that a predefined exit criteria can be utilised by the mobile communication device 310 to determine when to transfer the exit request using the exit scale value.

Figure 12:
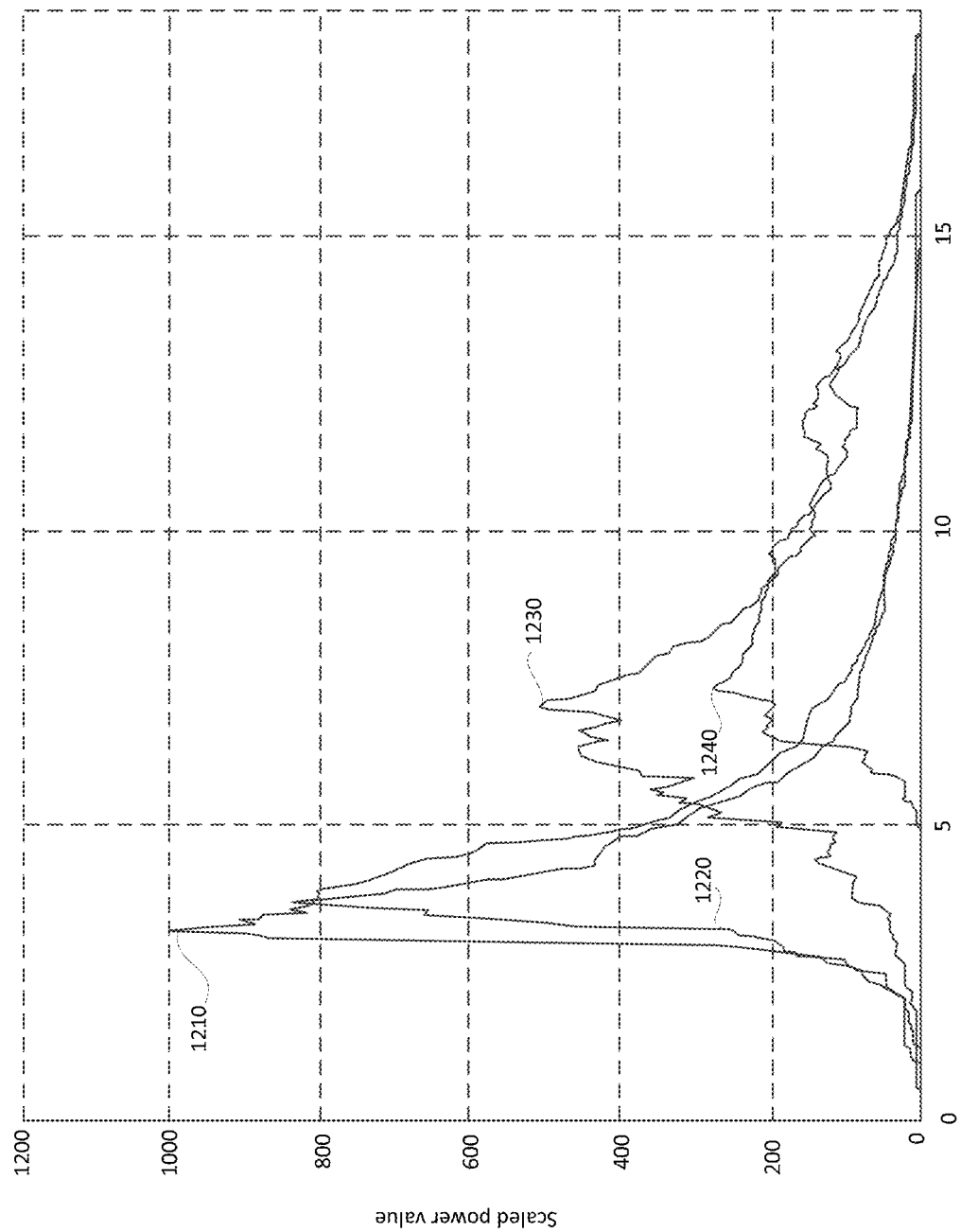
FIG. 12 is graph of scaled power values over time for first, second, third and fourth signals received by the mobile communication device from the communication system of FIG. 3.

More specifically, the mobile communication device 310 is configured to continuously convert the received signal strength for the third and fourth entry signals to received power values. Each power value is determined by the mobile communication device 310 using the received signal strength and configuration data stored in the memory indicative of the transmission characteristics of the first and second entry transmitters 330, 332. The mobile communication device 310 then analyses at least some of the power values (such as a shifting historical window of power values) for the received third and fourth entry signals when approaching the entry point to determine an order of magnitude of the power values being calculated. In particular, the order of magnitude of the received power can vary significantly between various mobile communication devices and the location of the mobile communication device within the vehicle. In one form, the order of magnitude of the power values can be determined based on a peak power value detected for the first or second transmitter 330, 332. In one form, the peak power value may occur when the mobile communication device has just passed the closest point spatially to the first or second entry transmitters 330, 332 as illustrated in FIG. 10B. The length of the shifting historical window can be in memory (such as via configuration data) to take into account variations due to interference and the like. Depending upon the location of the mobile communication device 310 within the vehicle 1000, the peak power value may be identified for either the first or second entry transmitter 330, 332. Once a peak power value has been detected for either the first or second entry transmitter 330, 332 due to a detected downturn in the power of the received third or fourth entry signals, the mobile communication device 310 determines an entry scale value based on the value of the peak power of the received third or fourth entry signals from the first or second entry transmitters 330, 332. The entry scale value can be determined by the mobile communication device 310 such that the peak power value is linearly scaled to have a predefined scaled power value (e.g. 1000—as shown in FIG. 12). The entry scale value is stored in memory of the mobile communication device 310 and later used for determining if/when to transmit an entry request in relation to the received first and second entry signals. In this particular example, the entry request can be received by the second entry communication device 336 of the communication system 306.

The mobile communication device 310 can also determine and compare the peak power values of the first and second entry transmitters 330, 332 to determine which side of the vehicle 1000 (e.g. left or right) the mobile communication device 310 is located. The mobile communication device 310 has stored in memory configuration data, received from a server processing system 340, indicative of which side of the entry path each entry transmitter is located. For example, the first entry transmitter 330 may be located on the left side of the vehicle entry path and the second entry transmitter 332 may be located on the right side of the vehicle entry path. In the event that the highest peak power value between the two entry transmitters 330, 332 is associated with a third signal received from the first entry transmitter 330, the mobile communication device 310 determines that it is located on the left side of the vehicle 1000. Alternatively, in the event that the highest peak power value between the two entry transmitters 330, 332 is associated with a fourth signal received from the second entry transmitter 332, the mobile communication device 310 determines that it is located on the right side of the vehicle 1000. Position data indicative of the particular side of the vehicle that the mobile communication device 310 is located is stored in memory of the mobile communication device 310 and transferred as part of the entry request which can be used by the access control processing system 312 to distinguish between multiple entry requests received substantially simultaneously from multiple mobile communication devices 310 within the same vehicle.

Once the entry scale value has been determined, the mobile communication device 310 is configured to scale the determined power values of first and second entry signals received from the first and second entry communication devices 334, 336.

For each first entry signal that the mobile communication device 310 receives as it approaches toward to the entry point, the mobile communication device 310 determines the received signal strength of the first entry signal and then converts the received signal strength to power. The mobile communication device 310 then scales the power according to the entry scale value and applies a smoothing function to the scaled power value taking into account previously determined scaled power values for at least a portion of any previously received first entry signals. A similar process occurs in relation to each received second entry signal. In particular, each second entry signal that the mobile communication device 310 receives as it approaches toward to the entry point, the mobile communication device 310 determines the received signal strength of the second entry signal and then converts the received signal strength to power. The mobile communication device 310 then scales the power value according to the entry scale value and applies a smoothing function to the scaled power value taking into account previously determined scaled power values for at least a portion of any previously received second signals. The mobile communication device 310 then determines whether the scaled power values for the most recently received samples of the first and second entry signals satisfy one or more entry signal criteria. In response to the one or more entry signal criteria being met, the mobile communication device 310 generates and transmits an entry request. In this example, the entry request is received by the second communication device 356.

More specifically, the mobile communication device dynamically generates a first baseline entry scaled power value after receiving each first entry signal and a second baseline entry scaled power value after receiving each second entry signal. The first and second baseline entry scaled power values may be calculated as the average of the scaled power values received over a threshold period of time or over a threshold number of received signals (e.g. last 50 samples). Thus, it will be appreciated that the baseline changes over time. The mobile communication device 310 has stored in memory a first and second predefined threshold entry growth rate. In one form, the first and second predefined threshold entry growth rate may be defined in the configuration data. In one example, the various growth rates can be expressed as a percentage of growth although other expressions of the growth rate are possible. The mobile communication device 310 determines a first entry growth rate of the current scaled power value of the first entry signal relative to the first baseline entry scaled power value. Furthermore, the mobile communication device 310 determines a second entry growth rate of the current scaled power value of the second entry signal relative to the second baseline entry scaled power value. The mobile communication device 310 then determines whether the first and second entry growth rates meet or exceed the predefined first and second threshold entry growth rates respectively. In one form, the mobile communication device 310 may also determine whether the first and second scaled power values of the most recently received signals meet or exceed a first and second scaled power threshold in order to avoid false positive detections. In the event of a positive determination, the mobile communication device 310 generates and transmits an entry request. In one variation, a plurality of consecutive growth rates may need to meet or exceed the threshold for consecutive scaled power values in order for an entry request to be generated and transferred in order to avoid sudden changes in interference and the like.

In the event that the first and second entry growth rates do not meet or exceed the predefined first and second threshold entry growth rates respectively, the mobile communication device 310 can be configured to check whether consecutive scaled power values for a threshold period of time are greater than a predefined scaled power value threshold. The temporal threshold and the associated predefined scaled power value threshold can be stored in memory of the mobile communication device 310 and can be defined by the configuration data. This failsafe processing can be performed due to unusual circumstances, such as a user handling their mobile communication device mid-approach toward the entry point. For example, in the event that the mobile communication device 310 determines that the scaled power value for the first entry signal has been greater than a first scaled power threshold (e.g. 200) for a threshold period of time (e.g. 4 seconds) and the scaled power value for the second entry signal has been greater than a second scaled power threshold (e.g. 400) for a threshold period of time (e.g. 4 seconds), the mobile communication device 310 determines that one or more entry criteria have been met and then proceeds to generate and transmit an entry request.

A similar process occurs in relation to the first and second exit communication devices. In particular, the mobile communication device 310 is configured to continuously convert the received signal strength for the third and fourth exit signals to received power values. Each power value is determined by the mobile communication device 310 using the received signal strength and predefined data stored in the memory indicative of the transmission characteristics of the first and second exit transmitters 350, 352. The mobile communication device 310 then analyses at least some of the received power values (such as a shifting historical window of power values for the received third and fourth exit signals) to determine an order of magnitude of the power values. In one form, an order of magnitude can be determined based on the magnitude of a peak power value for the first or second exit transmitters 350, 352. In one form, the peak power value may be determined when the mobile communication device 310 has just passed the closest point spatially to the first or second exit transmitters 350, 352 as illustrated in FIG. 11B. The length of the shifting historical window is defined to take into account variations due to interference and the like and can be defined in the configuration data. Depending upon the location of the mobile communication device 310 within the vehicle 1000, the peak power value may be associated with either the first or second exit transmitter 350, 352. Once a peak power value has been detected for either the first or second exit transmitter 350, 352 due to a detected downturn in the power of the received third or fourth exit signals, the mobile communication device 310 determines an exit scale value based on the value of the peak power of the received third or fourth exit signals from the first or second exit transmitters 350, 352. The exit scale value can determined by the mobile communication device 310 such that the peak power value is linearly scaled to have a predefined scaled power value (e.g. 1000). The exit scale value is stored in memory of the mobile communication device 310 and later used for determining if/when to transmit an exit request in response to first and second exit signals.

In some instances, the mobile communication device 310 can also determine and compare the peak power values of the first and second exit transmitters 350, 352 to determine which side of the vehicle 1000 (e.g. left or right) the mobile communication device 310 is located when attempting to exit the restricted area. The mobile communication device 310 has stored in memory configuration data, received from the server processing system 340, indicative of which side of the vehicle exit path each exit transmitter 350, 352 is located. For example, the first exit transmitter 350 may be located on the left side of the vehicle exit path and the second exit transmitter 352 may be located on the right side of the vehicle entry path. In the event that the highest peak power value between the two entry transmitters 350, 352 is associated with a third signal received from the first exit transmitter 330, the mobile communication device 310 determines that it is located on the left side of the vehicle 1000. Alternatively, in the event that the highest peak power value between the two exit transmitters 350, 352 is associated with a fourth signal received from the second exit transmitter 352, the mobile communication device 310 determines that it is located on the right side of the vehicle 1000. Position data indicative of the particular side of the vehicle that the mobile communication device 310 is located is stored in memory of the mobile communication device 310 and provided as part of the entry request which can be used by the access control processing system 312 to distinguish between multiple exit requests received substantially simultaneously from multiple mobile communication devices in the same vehicle 1000.

Once the exit scale value has been determined, the mobile communication device 310 is configured to scale the determined power values of first and second signals received from the first and second entry communication devices.

For each first exit signal that the mobile communication device 310 receives as it approaches toward to the exit point, the mobile communication device 310 determines the received signal strength of the first exit signal and then converts the received signal strength to power. The mobile communication device 310 then scales the power according to the exit scale value and applies a smoothing function to the scaled power value taking into account previously determined scaled power values for at least a portion of any previously received first exit signals. A similar process occurs in relation to each received second exit signal. In particular, for each second exit signal that the mobile communication device 310 receives as it approaches toward to the exit point, the mobile communication device 310 determines the received signal strength of the second exit signal and then converts the received signal strength to power. The mobile communication device 310 then scales the power value according to the exit scale value and applies a smoothing function to the scaled power value taking into account previously determined scaled power values for at least a portion of any previously received second exit signals. The mobile communication device 310 then determines whether the scaled power values for the most recently received first and second exit signals satisfy one or more entry criteria. In response to the one or more exit criteria being met, the mobile communication device 310 generates and transmits an exit request. In this particular example, the exit request can be received by the second exit communication device 356 of the communication system 306.

More specifically, the mobile communication device 301 dynamically generates a first baseline exit scaled power value after receiving each first exit signal and a second baseline exit scaled power value after receiving each second exit signal. The first and second baseline exit scaled power values may be calculated as the average of the scaled power values received over a threshold period of time or over a threshold number of received signals (e.g. last 50 samples). Thus, it will be appreciated that the baseline changes over time. The mobile communication device 310 has stored in memory a first and second predefined threshold exit growth rate. The mobile communication device 310 determines a first exit growth rate of the current scaled power value of the first exit signal relative to the first baseline exit scaled power value. Furthermore, the mobile communication device 310 determines a second exit growth rate of the current scaled power value of the second exit signal relative to the second baseline exit scaled power value. The mobile communication device 310 then determines whether the first and second exit growth rates meet or exceed the predefined first and second threshold exit growth rate respectively. Optionally, the mobile communication device 310 determines whether the scaled power values of the most recently received first and second signals meet or exceed a scaled power threshold. In the event of a positive determination, the mobile communication device 310 then generates and transmits an exit request. As previously discussed in relation to the entry criteria, in one variation a plurality of consecutive growth rates may need to meet or exceed the threshold for consecutive scaled power values in order for an exit request to be generated and transferred in order to avoid sudden changes in interference and the like.

In the event that the first and second exit growth rates do not meet or exceed the predefined first and second threshold exit growth rates respectively, the mobile communication device 310 can be configured to check whether consecutive scaled power values have been determined over a threshold period of time which meet or exceed a predefined scaled power value threshold. The temporal and scaled power value thresholds can be stored in memory of the mobile communication device 310 and can be part of the configuration data. This failsafe processing can be performed due to unusual circumstances, such as a user handling their mobile communication device 310 during the approach toward the exit point. For example, in the event that the mobile communication device 310 determines that the scaled power value for the first exit signal has been greater than a first scaled power threshold (e.g. 200) for a threshold period of time (e.g. 4 seconds) and the scaled power value for the second exit signal has been greater than a second scaled power threshold (e.g. 400) for a threshold period of time (e.g. 4 seconds), the mobile communication device 310 determines that one or more exit signal criteria have been met and then proceeds to generate and transmit the exit request.

In some configurations and as mentioned above, there may instances where multiple mobile communication devices 310 are located in the vehicle 1000 approaching the exit point. However, only one of the mobile communication devices 310 may have stored in memory authorisation data for the respective parking facility. In response to receiving one or more exit signals from the exit communication system 326, each mobile communication device 310 can be configured by the computer program 308 to determine whether any authorisation data is currently stored in memory indicative of the restricted area. In the event that one of the mobile communication devices 310 determines that no authorisation data is stored in the memory, the respective mobile communication device 310 can be configured to ignore the received exit signals. Therefore, in most instances the exit request indicative of the position of the respective mobile communication 310 within the respective vehicle 1000 may not be required. Thus, in some embodiments, only a single exit transmitter may be required in order to allow the mobile communication device 310 to set the exit scale value. However, in some situations the users of two separate mobile communication devices 310, who have been separately granted access to the restricted area, both exit the parking facility together in the same vehicle 1000. In this instance, the position data of the exit request can be used by the access control processing system 312 to distinguish between multiple exit requests to determine which user account the parking session should be associated therewith.

The mobile communication device 310 is preferably configured to use location services and region monitoring of the associated operating system. In particular, one or more geographical regions are registered with the operating system of the mobile communication device 310, wherein each registered geographical region defines a geographical boundary about a respective parking facility. The boundary may be a predefined radius (e.g. 500 metres) from a point of the respective parking facility. Each geographical region which is registered by the computer program 308 has a list of the transmission regions (also referred to as beacon regions) associated with the communication devices 330, 332, 334, 336, 350, 352, 354, 356 of the communication system 306 of the parking facility. The mobile communication device 310 is configured to determine a region crossing event, using the location services of the operating system, when the mobile communication device 310 crosses a defined geographical boundary associated with a respective parking facility. Upon the mobile communication device 310 determining that the mobile communication device 310 has entered the defined geographical region based on location services, the computer program 308 is launched in background environment of the operating system if the computer program 308 is not already loaded in the background environment of the operating system. The mobile communication device 310 is configured to listen for transmitted entry or exit signals associated with one or more of the registered transmission regions (also referred to as beacon regions) associated with communication devices 330, 332, 334, 336, 350, 352, 354, 356 of the respective communication system 306.

The entry point microcontroller 338 includes a data port for connection to the ticket issuance machine 314 via a data cable 334. Similarly, the exit point microcontroller 358 also includes a data port for connection to the ticket receipt machine 316 via a data cable 338. Each data port can be a serial port that connects to the serial port of the ticket issuance/receipt machine 314, 316 via a serial cable 334, 338. It will be appreciated that other types of data cables and data ports can be used. As will be appreciated, the ticket issuance machine 314 and the ticket receipt machine include a controller for issuing and reading tickets respectively.

In relation to the ticket issuance machine 314, the second entry communication device 336 transfers data to the ticket issuance machine 314 via the data cable 334 based upon the received entry request. The data transferred to the ticket issuance machine can be indicative of or include the entry request and additionally a flag or marker indicating that the user is a registered user of the system 302 such that no physical ticket needs to be issued by the ticket issuance machine 314. The ticket issuance machine 314 transfers the entry request to the access control processing system 312 via a local computer network. The access control system can then determine whether access should be granted based on data stored in a data store 340 or based on a determination carried out by server processing system 340 and data store 342. In response to a successful determination that access should be granted to the user, the access control processing system 312 or the server processing system 340 generates authorisation data in response. The authorisation data is then transferred, from the access control processing system 312, to the ticket issuance machine 314 which then forwards the authorisation data to the entry point microcontroller 338 via the data cable 334. The entry point microcontroller 338 then wirelessly transfers, via the second entry communication device 336, the authorisation data to the mobile communication device 310 which is configured to store the authorisation data in memory of the mobile communication device 310. Upon generating/receiving the authorisation data, the access control processing system 312 transfers an entry actuation command to the entry boom gate assembly 318 at the entry point such that the entry boom gate actuates to the open position to allow the user to drive their vehicle into the parking facility. In particular forms, the entry boom gate assembly 318 is electrically coupled to an entry vehicular detection system 322, wherein the boom gate assembly 318 only actuates to the open position in response to receiving the entry actuation command in combination with receiving an electrical signal from the entry vehicular detection system 322 indicating that a vehicle is present at the entry boom gate assembly. In one particular form, the entry vehicular detection system 322 may be provided in the form of a loop detector or the like.

In relation to the ticket reading machine 316 located at the exit point, the second exit communication device 356 transfers the exit request received from the mobile communication device 310 to the ticket reading machine 316 via the data cable 338. The exit request is indicative of the received authorisation data stored in the memory of the mobile communication device 310. It will be appreciated that in some embodiments, the authorisation data can include the typical ticket data stored on a magnetic stripe or encoded data of a traditional parking ticket. However, as will be discussed in relation to various embodiments, the authorisation data can include additional information. The exit request is then transferred to the access control processing system 312 via the computer network. The authorisation data may be on-forwarded to the server processing system 340 in some configurations. The access control processing system 312 or the server processing system 340 determine, based on the received exit request indicative of the authorisation data whether the user is permitted to leave the parking facility. In response to a positive determination, the access control processing system 312 or the server processing system 340 records the exit time in data store 344 or data store 342 and the access control processing system 312 transfers an exit actuation command to the exit boom gate assembly 320 at the exit point via the ticket reading machine 316. The exit boom gate assembly 320 is then actuated to an open position to allow the user to drive their vehicle out of the parking facility.

As shown in FIG. 3 and as already mentioned, the system 302 also includes the server processing system 340 in data communication with an access control processing system 312. The server processing system 340 can be configured by one or more server computer programs. The server processing system 340 includes or is able to access the data store 342 provided in the form of a database including entity records for registered users of the system 302. Users may register to use the system 302 via a website hosted by a web-server associated with the server processing system 340 or via the computer program 308 executing upon the mobile communication device 310.

Upon successful user registration, the server processing system 340 stores in the server database 342 device specific data that ties the user to the mobile communication device 310. The device specific data may include a MAC address of the mobile communication device 310 and device type data. The user record stored in the server database 342 additionally includes a user identity. The user identity can be transferred to the mobile communication device 310 for storage in the memory of the mobile communication device 310. Alternatively, the user identity can be presented to the user such that it can be input when required in future interactions with the computer program 308.

Each user record in the data store 342 additionally includes financial data indicative of a financial account that can be debited by the server processing system 340 in response to parking fees being incurred from the access control system 304 of the parking facility. In particular, once the user leaves the parking facility, the access control processing system 312 generates an electronic invoice that is transferred to the server processing system 340 via a communication network such as a Wide Area Network (WAN) like the Internet. The server processing system 340 then automatically debits the corresponding user account in accordance with the invoiced amount. A service fee may additionally be charged by the operator of the system 302 to the user's account.

Upon successful user registration to use the system 302, the server processing system 340 additionally generates key data that is associated with the user record for the user. The key data is stored in the server database 342. In addition, the key data is transferred to the mobile communication device 310 via a communication network, wherein the mobile communication device 310 stores the key data in memory. The key data includes key pairs, where each key pair includes a single use entry key and a corresponding single use exit key. The mobile communication device 310 generates the entry request to include one of the entry keys associated with the user. The access control processing system 312 queries a registered entity database 344 accessible to the access control processing system 312 to determine whether the indicated entry key is valid. The mobile communication device 310 also generates the exit request to include the corresponding exit key associated with the user. The access control processing system 312 queries the registered entity database 344 to determine whether the indicated exit key is valid. Periodically, the server processing system 340 updates the data stored in the registered entity database 344 with new key data and new user identities to enable the access control processing system 312 to verify the validity of received entry and exit requests.

When the entry communication system 324 receives an entry request, the entry request can also be indicative of the user identity and a hashed user identity. The computer program 308 of the mobile communication device 310 is configured to obtain the user identity from memory or via user input and hash the user identity using device specific information associated with the mobile communication device 310 such as the MAC address and the device type of the mobile communication device 310. The entry request is forwarded to the access control system 304 for verification using the registered entity database 344. The registered entity database 344 has stored therein user records each including the respective user identity, device specific information for the respective user's mobile communication device 310, and key pairs associated with the respective user. The access control processing system 312 performs the same hashing function upon the user identity using the device specific information and compares the generated hashed user identity to the received hashed user identity indicated by the entry request. The access control processing system 312 also determines whether the entry key is associated with the respective user indicated by the received user identity. In response to successful comparisons, the access control processing system 312 determines that the received entry request is valid and generates the authorisation data for transfer to the ticket issuance machine 314 which is eventually on-forwarded to the mobile communication device 310. Although this validation process has been described as being performed by the access control processing system 312, it is alternatively possible for the server processing system 340 to perform this validation process. In the event that the access control processing system 312 or the server processing system 340 determines that the received entry request is not valid based on the results of the comparison, the access control processing system 312 transfers a failure signal back to the ticket issuance machine 314 that issues a physical ticket as per normal operation. When a successful verification is determined by the access control processing system 312, the access control processing system 312 updates the registered entity database 344 to indicate that the received entry key has been used such that this respective entry key can no longer be used again.

When the exit communication system 326 receives an exit request, the exit request can be indicative of an exit key corresponding to the previously presented entry key when entering the parking facility, the user identity and the hashed user identity. The access control processing system 312 can perform the same hashing process and comparison as described above. Additionally, the access control processing system 312 can also determine whether the exit key is associated with the user in the database and also whether the exit key corresponds to the previously presented entry key when entering the parking facility. In alternative arrangements, the server processing system 344 can perform this validation process. In response to successful comparisons, the access control processing system 312 determines or receives data indicate that the received exit request is valid and transfers the exit actuation command back to ticket reading machine 316 to actuate the opening of the exit boom gate assembly 320 to allow the user to exit their vehicle out of the parking facility.

Due to the single-use nature of the key pairs, the mobile communication device 310 under control of the computer program 308 can issue a key pair replenishment request to the server processing system 340 which is transferred via a communication network, wherein the server processing system 340 generates a plurality of new key pairs which are then transferred back to the mobile communication device 310 for storage. The key pair replenishment request can be transferred automatically by the computer program 308 when a threshold limit of key pairs has been reached. Alternatively, the key pair replenishment request can be sent via user interaction with the computer program 308. A copy of the key pairs that were issued are also stored in the server database 342 of the server processing system 340. Additionally, a copy of the new key pairs are updated to the registered entity database 344 accessible by the access control processing system 312. Each time that an entry or exit key is used for an entry or exit request, the mobile communication device 310 flags or marks the key pair, or alternatively purges the respective key pair once used such that it is no longer reused.

In particular embodiments, the computer program 308 controls the mobile communication device 310 to generate the entry and exit request to be indicative of one or more wireless devices that the mobile communication device 310 is currently connected thereto. In the event that the communication system 306 receives data indicative of substantially simultaneous entry or exit requests from multiple mobile communication devices 310, the communication system 306 can use the data indicative of the one or more connected wireless devices as indicated by the entry or exit requests to determine which user account to associate with the parking session. In particular, the entry or exit request of the mobile communication device 310 may be indicative of a particular mobile communication device 310 that is connected to a hands-free communication system which could be a hands-free communication system of the vehicle or a separate device such as a Bluetooth headset. Effectively, a mobile communication device 310 that is connected to other wireless devices is considered to have priority over other mobile communication devices 310 and thus the entry request received from this mobile communication device 310 should be processed such that the parking sessions is associated with the respective user account.

Additionally or alternatively, the computer program 308 controls the mobile communication device 310 to generate the entry and exit request to be indicative of a relative position of the mobile communication device 310 within the vehicle based on the received signal strength or scaled power value of the third or fourth entry or exit signals. In particular, due to the mobile communication device 310 having stored in local memory configuration data indicative of the configuration of the communication system 306 for the parking facility, the received signal strength or scaled power value for the third and fourth entry or exit signals can indicate whether the mobile communication device 310 is located on the left or right side of the vehicle 1000. For example, referring to FIG. 12 there is shown a plot of the scaled power values generated by a mobile communication device 310 based on received entry signals from the first entry communication device 334 (line 1230), second entry communication device 338 (line 1240), first entry transmitter 330 (line 1220) mounted on the left side of the vehicle path and second entry transmitter 332 (line 1210) mounted on the right side of the vehicle path. In this example, the second entry transmitter 332 mounted on the right side of the vehicle path has the higher scaled power value in FIG. 12, wherein the computer program configures the mobile communication device 310 to generate the entry request to include side data indicative of the right side of the vehicle. In the event that the communication system 306 receives substantially simultaneous access or exit requests from multiple mobile communication devices 310, the access control processing system 312 can use the relative location of the mobile communication device 310 to determine which user account to associate with the parking session. In one form and in countries where a driver is located on the right hand side of the vehicle, priority is given to an entry and exit request that indicates a relative location of the right side of the vehicle. It will be appreciated that in countries where the driver is located on the left side of the vehicle, priority is given to an entry or exit request indicating a left location.

In another form, the mobile communication device 310 generates the entry and exit request to be indicative of one or more timestamps associated with entry or exit signals, wherein the one or more timestamps can be used as a means to determine whether the user is located in the front or the back of the vehicle. This information together with the information as to whether a user is located on the left or right side of the vehicle can be used to indicate a quadrant of the vehicle that the mobile communication device 310 is located. For example, the quadrants may include front-left, front-right, rear-left and rear-right. The access control processing system 312 can use the quadrants to determine which mobile communication device 310 is likely to be associated with the driver of the vehicle. For example, in countries where the driver sits in the front-right portion of the vehicle, the access control processing system gives priority to entry requests received from mobile communication device 310 that indicate a front-right relative location within the vehicle.

In certain situations, it may not be clear which mobile communication device 310 is to be associated with the parking session when substantially simultaneous entry requests are received from the same vehicle 1000. As a result, temporary authorisation data may be issued to the mobile communication devices 310 associated with the substantially simultaneous entry requests. A confirmation notification may then be transferred by the server processing system 340 to the each mobile communication device 310. The received confirmation notification presented by computer program 308 requests user confirmation as to which mobile communication device 310 is to be associated with the parking session. In response to a user of one of the mobile communication devices 310 responding to the confirmation notification indicating that the respective mobile communication device 310 is to be associated with the parking session, the server processing system and/or the access control processing system 312 update the stored data in data store(s) 342, 344. The access control processing system 312 and/or the server processing system 340 generate authorisation data to replace the temporary authorisation data which is then transferred to the confirming mobile communication device 310 for storage in memory.

In one form, the parking facility may be associated with various commercial shops, stores and facilities that offer to validate of the user's parking. For example, it is common that a cinema associated with a parking facility may validate the customer's ticket such that the customer does not need to pay for parking. In this regard, the mobile communication device 310 can be operated under control of the computer program 308 to obtain a parking validation code and transfer the authorisation data indicative of the validation code to the exit communication device 326 for processing by the access control system 304. In particular, a receipt may be issued to the user who is a customer of a business associated with parking facility, wherein the receipt may include machine-readable indicia such as a bar code or QR code. The computer program 308 allows the user to capture a photograph of the machine-readable indicia that is subsequently interpreted to determine the parking validation code. The parking validation code can be combined with the already stored authorisation data, such that when the authorisation data is transferred to the exit communication device 326 upon approaching the exit point of the parking facility, the access control system 304 can process the ticket in accordance with the validation code.

The system 302 can additionally include a plurality of parking facility communication devices 346 located throughout the parking facility. Each parking facility communication device 346 can broadcast navigation information that can be received by the mobile communication device 310 within a broadcast proximity of the communication device 346 and present navigation information to the user. In one form, the navigation information may be presented audibly.

Figure 4:
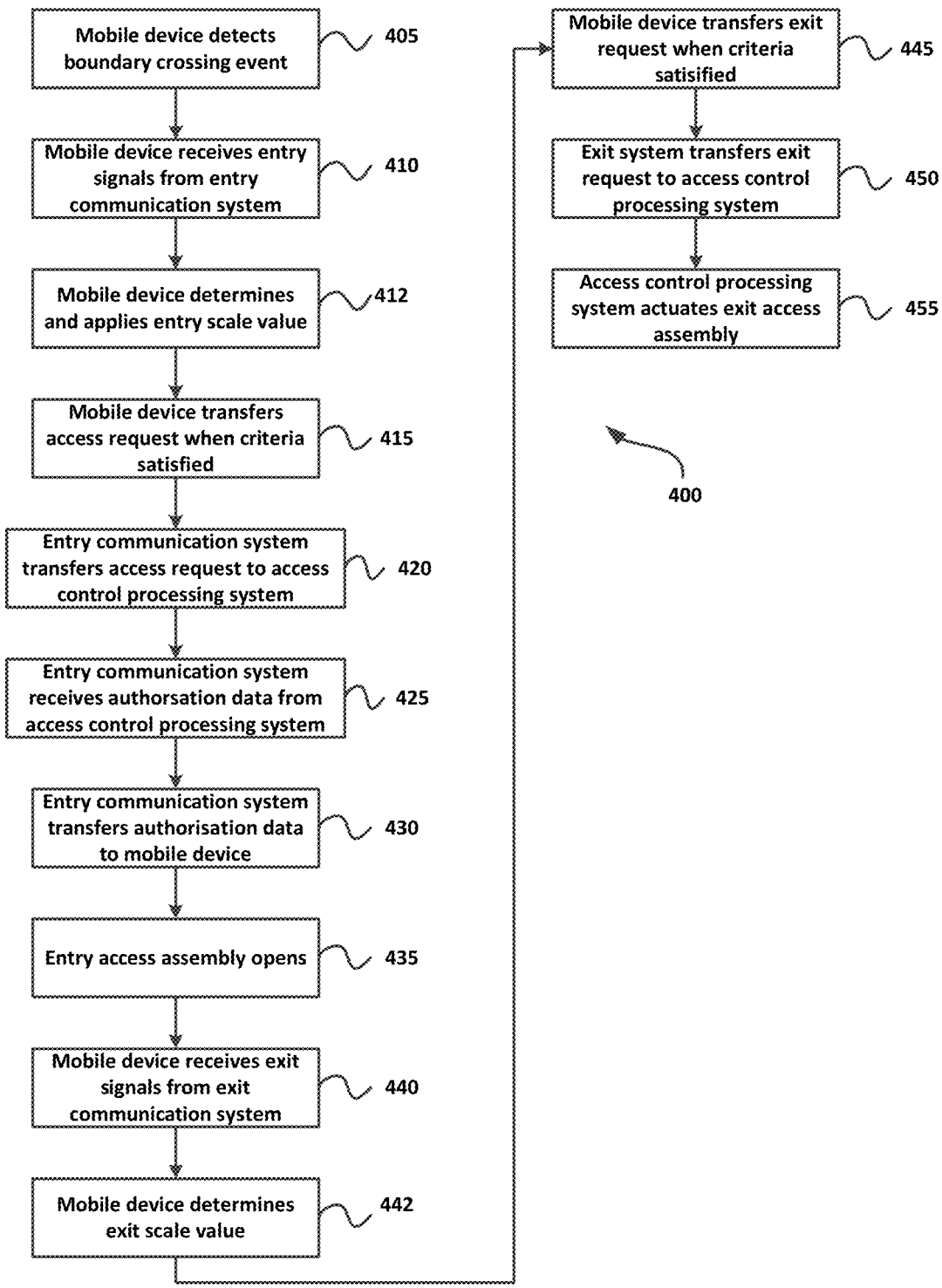
FIG. 4 illustrates a flowchart representing a method performed by the system of FIG. 3.

Referring to FIG. 4 there is shown a flowchart representing a method performed by the various components of the system 302 and the access control system 304 of the vehicular parking facility.

In particular, at step 405, the method 400 includes the mobile communication device detecting a boundary crossing event. The mobile communication device begins to monitor for a list of registered transmission regions of the communication system 306 in response to the detected boundary crossing event. Additionally, the computer program 308 is launched in the background environment of the operating system of the mobile communication device 310 in the event it is not already.

As the user approaches an entry point of the vehicular parking facility, step 410 of the method 400 includes the mobile communication device 310 under control of the computer program 308 receiving entry signals from entry communication system 324 of the communication system 306 which are associated with the monitored region.

At step 412, the method includes the mobile communication device determining an entry scale value, based on a detected peak power value of one of the entry communication devices of the entry communication system 324, to scale the power values of received entry signals.

At step 415, the method 400 includes the mobile communication device 310 generating and transferring, to the second entry communication device 338, an entry request in response to one or more received entry signals satisfying one or more entry criteria. In a preferable form, the entry request is generated and transferred in an automated manner without user intervention (i.e. without the user holding the mobile communication device and without operating the mobile communication device).

At step 420, the method includes the second entry communication device 336 transferring the received entry request to the access control system 304 via the ticket issuance machine 314. More specifically, the entry communication device 336 communicates with the ticket issuance machine 314 via the data cable. The ticket issuance machine 314 then transfers the entry request to the access control processing system 312 via a computer network such as a Local Area Network (LAN).

At step 425, the method 400 includes the second entry communication device 336 receiving authorisation data generated by the access control system 304 via the ticket issuance machine. In particular, the access control processing system 312 generates the authorisation data that is transferred to the ticket issuance machine 314 via the computer network which in turn transfers the authorisation data to the second entry communication device 336 of the entry point microcontroller 338 and the interconnecting data cable 338. The authorisation data is stored in a database 344 accessible by the access control processing system 312.

At step 430, the method 400 includes the second entry communication device 336 wirelessly transferring the authorisation data to the mobile communication device 310 of the user for storage in memory of the mobile communication device 310 as a form of virtual ticket.

At step 435, the method 400 includes the access control processing system 312 instructing the ticket issuance machine 314 to actuate the entry boom gate assembly 318 to move to an open position.

As the user approaches an exit point of the vehicular parking facility, step 440 of the method 400 includes the mobile communication device 310 under control of the computer program 308 receiving exit signals from at least some of the exit communication devices of the communication system 306 which are associated with the monitored region.

At step 442, the method 400 includes the mobile communication device determining an exit scale value, based on a detected peak power value of one of the communication devices of the exit communication system 326, to scale the power values of received exit signals.

At step 445, the method 400 includes the user's mobile communication device 310 transferring an exit request indicative of the authorisation data to the exit communication system 326 in response to one or more received exit signals satisfying one or more exit criteria. In a preferable form, the exit request is generated and transferred in an automated manner without user intervention (i.e. without the user holding the mobile communication device and without operating with the mobile communication device). The exit request is indicative of at least the authorisation data in this example.

At step 450, the method 400 includes the second exit communication device 356 transferring the exit request to the access control processing system 312 and the ticket reading machine 316. In particular, the second exit communication device 326 of the exit point microcontroller 358 transfers the exit request to the ticket reading machine 316 via the data cable 338. The ticket-reading machine 316 then transfers the exit request to the access control processing system 312 via the LAN.

At step 455, the method 400 includes the access control processing system 312 transferring an exit actuation command to the ticket-reading machine 316 such that the exit boom gate assembly 320 is opened to allow the user to drive their vehicle out of the exit point of the vehicular parking facility.

The computer program 308 executing upon the mobile communication device 310 can be opened by the user to display a user interface that can be present various information to the user or allow the user to request various functions to be performed. For example, the user can be presented with information regarding the entry time into the parking facility which is stored as part of the authorisation data. Furthermore, a temporal indication of the amount of time available to remain parked in the parking facility can be presented. In addition, the user can transfer the authorisation data to a different registered user, wherein the authorisation data is transferred to the server processing system 340 and relayed to another mobile communication device 310 associated with the nominated registered user. In addition, the server processing system 340 communicates the transfer to the access control processing system 312 such that different key data is used when authenticating the exit request.

Furthermore, the user can request via the computer program 308 payment of parking fees via an alternate financial account. In addition, the user can review a transaction history. Furthermore, the user can tag specific transactions with tags (i.e. work expense, personal expense, etc.). Additionally, the user can request printing of a physical ticket via the computer program 308, wherein a code is generated which can be input by the user at a ticket payment machine associated with the parking facility such that a physical ticket is printed which has associated therewith the authorisation data. Furthermore, the user can request that the computer program 308 be disabled from generating entry requests and exit requests until re-enabled. This feature can be selected to ensure that the correct mobile communication device 310 is issued the authorisation data in the event multiple mobile communication devices 310 are located in the vehicle.

In particular embodiments, the user may interact with the computer program 308 to place a booking on a car park in the parking facility. The mobile communication device 310 communicates with the server processing system 340 to place a booking. The server processing system provides marker data indicative of the booking having been placed with the access control system of the selected parking facility. When the entry request is generated by the mobile communication device 310, the entry request is indicative of the marker. The access control processing system 312 can use this marker to calculate the final invoice which is sent to the server processing system 340. It will be appreciated that similar markers can be requested via the computer program 308 from the server processing system 340 for various types of tariffs.

In an optional form, an alternate mobile communication device can be utilised which is permanently fixed within the vehicle 1000. For example, the mobile communication device can be provided in the form of a microcontroller that is permanently associated with the vehicle.

It will be appreciated from the above description that multiple users using multiple mobile communication devices can be registered to use the system 302. Additionally, it will be appreciated that the mobile communication devices 310 can be used for multiple restricted areas (i.e. multiple parking facilities). It will also be appreciated that multiple parking facilities may be retrofitted for use with the system 302.

It will be appreciated that in certain arrangements, it may not be necessary to operate a boom gate to allow a user to enter or exit the restricted area. However, it may be preferable in this arrangement for the system to include a feedback device at each access point, such as an electrical light which can be actuated, to indicate successful communication between the mobile communication device 310 and the access control system 304. For example, the system may include an entry electrical light which can be actuated to display a red light when a mobile communication device 310 of an approaching vehicle has not been issued with authorisation data. Upon authorisation data being successfully transmitted, the entry electrical light can be actuated to display a green light. Similarly, an exit electrical light can be provided and actuated to indicate when authorisation data has been successfully received from the mobile communication device 310 and processed.

It will be appreciated that in order to compensate for various manufacturers of mobile communication devices, the communication system 306 can be configured to include a plurality of communication devices at an access point. This thereby allows a scale value to be determined based on one of the communication devices in order to then scale the signals received from the second communication device to determine whether a threshold scaled power growth rate has been met or exceeded to cause the entry/exit request to be generated. Therefore, it is possible to implement the system to only include two communication devices, rather than the four communication devices as described in previous examples. For example, if the relative position of the mobile communication device 310 is not necessarily required, it could be possible to implement the system 300 to include a first communication device provided in the form of a entry/exit transmitter (e.g. beacon) transmits a first wireless signal to the mobile communication device 310 when approaching the access point in order to allow a determination of the scale value, and a second communication device (e.g. entry/exit communication device 336, 356 or 334, 354) located closer to the access point assembly (i.e. boom gate) in order to allow the mobile communication device to determine, based on the growth rate of the scaled power values, when it is located substantially close the access point assembly such that an entry/exit request can be transmitted at the appropriate time. Alternatively, in situations where transmitters cannot be used, the wireless signals received from the first entry/exit communication device 334, 354 could be used to determine the scale value and the scaled power values derived from the received wireless signals from the second entry/exit communication device 336, 356 could be used to determine when an entry/exit request should be transmitted.

In some embodiments, it may be possible to limit the wide spectrum of wireless reception characteristics for a plurality of mobile communication devices used by a plurality of users for the access control system (i.e. employees of an employer who use a employee car park may all be issued with the same type mobile communication device) to access the restricted area. Therefore, scaling of the received power may not be necessary. In these circumstances, it is possible to use a single communication device at each access point and to analyse the growth rate of the power of the entry/exit signal to determine when an entry/exit request should be issued.

In embodiments where a vehicle 1000 approaches an entry or exit point of the restricted area and multiple mobile communication devices are within the vehicle 1000, each mobile communication device 310 can communicate with the remaining mobile communication devices 310 within the vehicle 1000 in order for each mobile communication device to determine which single mobile communication device is to send the entry or exit request. This configuration avoids multiple entry or exit requests being transferred. In one form, the multiple mobile communication devices 310 can communicate locally with each other using short range wireless communication such as Bluetooth Low Energy. In some situations where the multiple mobile communication devices 310 include an alternative wireless communication device which is not used for receiving the entry or exit signals from the communication system 306, the multiple mobile communication devices 310 will perform a handshaking process and communicate using the alternative wireless communication protocol. This can be advantageous given that a significant processing load may already be handled by the Bluetooth communication device of the mobile communication device. For example, the handshaking process (which may initially be conducted using Bluetooth) may determine that each mobile communication device can communicate using NFC (Near Field Communication). Wireless communication between the mobile communication devices 310 within the vehicle 1000 can then be conducted using the NFC devices of the mobile communication devices 310. Each mobile communication device can wirelessly transmit data regarding the entry or exit signals being received. For example, the data being communication can include timestamps when particular entry or exit signals are received, the scaled power values of entry or exit signals being received, raw power values of signals being received, and/or received signal strength of signals being received. Each mobile communication device 310 is configured by the computer program 308 to determine, based on the data received from the other mobile communication device 310 as well as the entry and exit signals received by the respective mobile communication device 310, whether the respective mobile communication device 310 is associated with the driver. As the same analysis should be conducted in each mobile communication device 310, only one of the mobile communication devices will determine it is associated with the driver which is then configured to issue the entry or exit request.

It will be appreciated that for communication devices which utilise Bluetooth Low Energy, the entry and exit signals can be BLE advertisements which can include the unique device identity (such as a universally unique identifier) of the respective communication device.

In previous examples where the mobile communication device 310 attempts to transmit an entry or exit request to the second entry or exit communication device 336, 356, the communication can be conducted utilising Bluetooth Low Energy. In one embodiment, the mobile communication device 310 attempts to establish a communication session with the second communication device 336, 356 coupled to/integrated with the entry/exit point microcontroller 338, 358 when transmitting the entry or exit request. Generally the communication session in an anonymous connection, wherein the second communication device 336, 356 can only conduct one communication session at any particular time. Once the entry/exit access assembly (e.g. boom gate) 318, 320 is actuated to allow the user to enter or exit the restricted area, the communication session eventually ends due to the mobile communication device 310 moving out of range such that the second entry or exit communication device 336, 356 is free to establish a new communication connection with the mobile communication device 310 of the next vehicle 1000 in the entry/exit queue.

In some instances, it is possible that a mobile communication device 310 of vehicle 1000 which has passed through the entry/exit point assembly 318, 320 maintains the wireless communication session for too long which overlaps with a point in time when a different mobile communication device 310 located in the next vehicle in the entry/exit queue attempts to transfer an entry/exit request. In this situation, the mobile communication device 310 of the next vehicle 1000 will be unable to identify the second communication device 336, 356 as being available for connection due to the maintained communication session with the mobile communication device 310 of the earlier vehicle 1000. However, the scanning operation will detect the first entry communication device 334, 354 as being available for a communication connection which operates as a failsafe in such instances. Therefore, the mobile communication device 310 of the later vehicle 1000 establishes a communication connection with the first entry/exit communication device 334, 354 which then forwards the entry/exit request to the entry/exit point microcontroller 338, 358. In the event that an entry request has been received by the first entry communication device 334, the entry point microcontroller 338 transfers the generated authorisation data to the first communication device 334 which is then forwarded to the connected mobile communication device 310 for storage. The entry point microcontroller 338 then actuates the entry boom gate assembly 318 via the ticket issuance machine 314 as per normal. In the event that an exit request has been received by the first exit communication device 354, the first mobile communication device 310 transfers the authorisation data to the exit point microcontroller 358 which is then processed by the access control processing system 312. Upon successful validation and processing, the exit point microcontroller 358 communicates with the ticket reading machine 316 to actuate the exit boom gate assembly 320.

Figure 13:
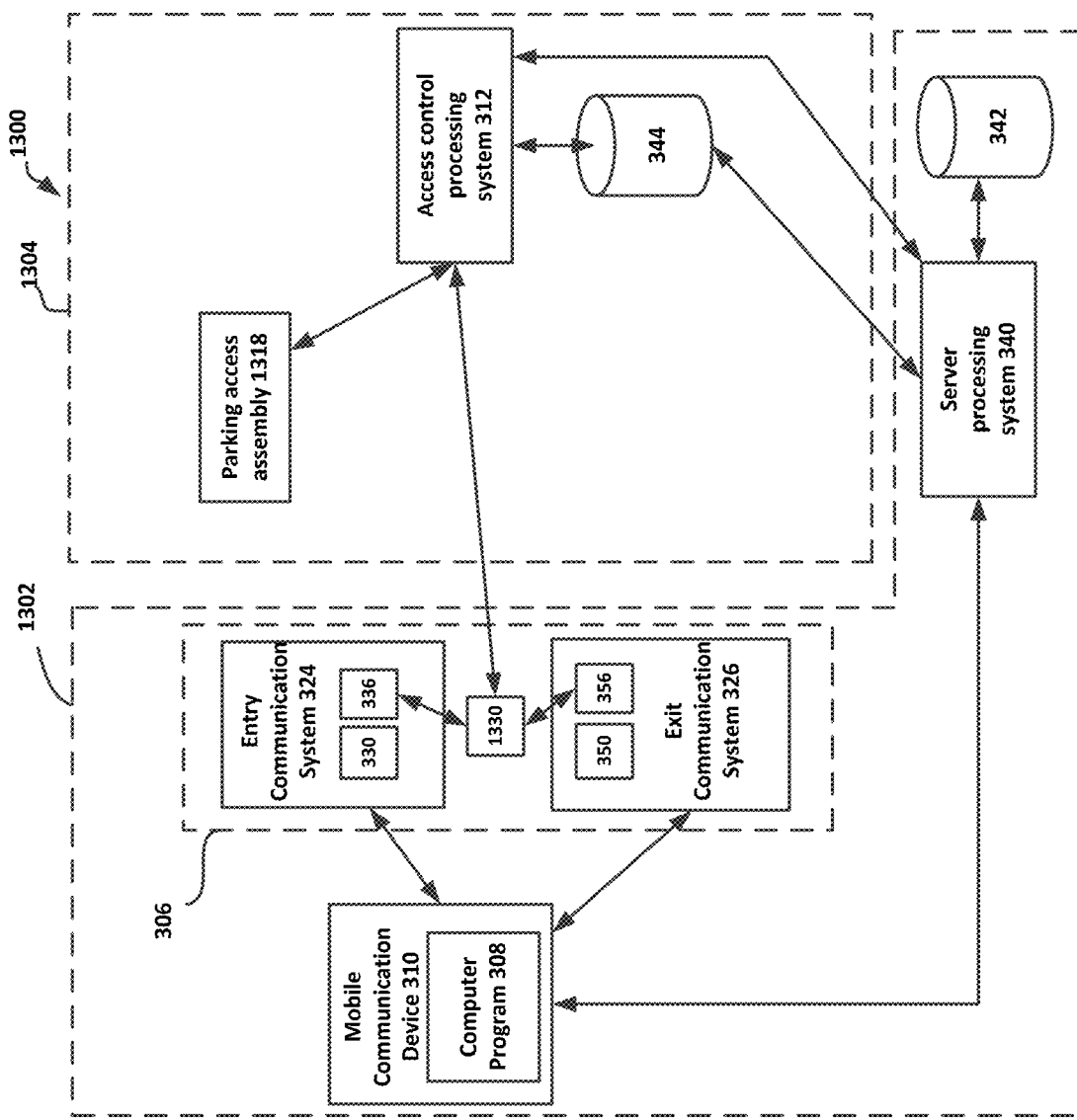
FIG. 13 illustrates a block diagram of an example system for an access control system for a residential/commercial parking area.

Referring to FIG. 13 there is shown a further system 1302 for use with a monitoring system provided in the form of an access control system 1304 for a residential/commercial parking area. For the purposes of clarity, like reference numerals are used between FIGS. 3 and 13 to identify like parts that function similarly. The systems 1302, 1304 operate together to form system 1300.

In particular, the system 1302 includes the entry communication system 324 including a plurality of entry communication devices 330, 336 and an exit communication system 326 including a plurality of exit communication devices 350, 356. As generally the same access point is used for both entering and exiting the residential/commercial parking area, the communication system 306 can include a single access point microcontroller 1330 which is in communication with at least one of the entry communication devices 336 and at least one of the exit communication devices 356. The access point microcontroller 1330 is in communication with the access control processing system 312. The access control processing system 312 is electrically connected to a parking access assembly 1318 which can include assemblies such as access controlled gates, roller doors, and the like. The access control processing system 312 can also be in data communication with the server processing system 340 having access to the data store 342. It will be appreciated that for less sophisticated access control processing systems 312, the server processing system 340 may not be in data communication with the access control processing system 312.

The system 1302 operates in a similar manner to that of system 300. When a driver of a vehicle approaches the access point to enter the residential/commercial parking area, an entry signal from an entry transmitter 330 can be received by the mobile communication device 310. The peak power value for the entry transmitter 330 is used to determine an entry scale value. Another entry signal is received by the mobile communication device 310 from the entry communication device 336. The mobile communication device performs the same processing as that described above wherein in the event that at least some of the one or more entry criteria have been satisfied, the mobile communication device 310 transmits the entry request which is received by entry point communication device 336 and transferred to the access control processing system 312 via the access point microcontroller 1330. The access control processing system 312 then determines whether the entry request is valid as previously described. In the event of successful validation, the access control processing system 312 electrically controls the parking access assembly 1318 to allow the user to drive into the residential/commercial parking area.

A similar process occurs when a driver of a vehicle 1000 approaches the access point to exit the residential/commercial parking area, an exit signal from an exit transmitter 350 can be received by the mobile communication device 310. The peak power value for the exit transmitter 350 is used to determine an exit scale value. Another exit signal is received by the mobile communication device 310 from the exit communication device 356. The mobile communication device performs the same processing as that described above wherein in the event that at least some of the one or more exit criteria have been satisfied, the mobile communication device 310 transmits the exit request which is received by exit point communication device 356 and transferred to the access control processing system 312 via the access point microcontroller 1330. The access control processing system 312 then determines whether the exit request is valid. Unlike the ticketing system described previously, the exit request may not need to be indicative of authorisation data, but merely uniquely and securely identifies the user to allow exiting through the access point. Therefore, exit requests can be processed similarly to an entry requests. In the event of successful validation, the access control processing system 312 electrically controls the parking access assembly 1418 to allow the user to drive out of the residential/commercial parking area.

It will be appreciated that the system 1302 can be configured similarly to a ticket based system as described in relation to system 302. Furthermore, it will be appreciated that in some residential/commercial parking areas, entry within the residential/commercial parking area is restricted, but no exit request needs to be transmitted in order to exit the residential/commercial parking area. For example, a vehicular detection device such as that described earlier may be used to detect that a vehicle wishes to exit the residential/commercial parking area. In this regard, the exit communication system 326 of system 1302 is not required for this type of arrangement.

Figure 14:
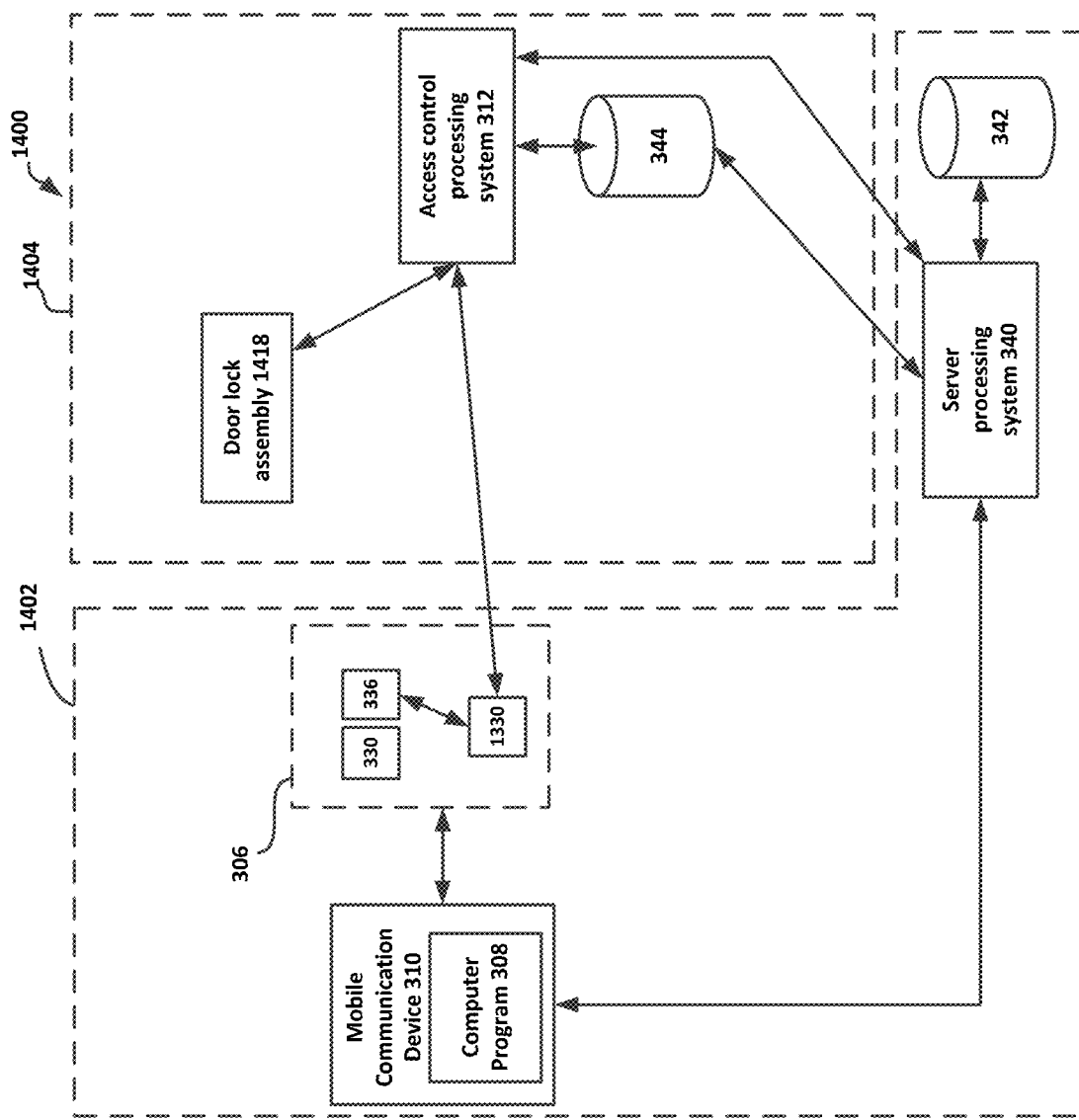
FIG. 14 illustrates a block diagram of an example system for an access control system for a building access system.

Referring to FIG. 14 there is shown a further system diagram of a system 1402 for use with a monitoring system provided in the form of an access control system 1404 for doors of a building. Systems 1402 and 1404 operate together to form system 1400. For the purposes of clarity, like reference numerals are used between FIGS. 3 and 14 to identify like parts that function similarly. In particular, the system 1402 includes a communication system 306 including a plurality of communication devices 330, 336. The communication system 306 also includes an access point microcontroller 1330 which is in communication with at least one of the communication devices 330, 336. The access point microcontroller 1330 is in communication with the access control processing system 312. The access control processing system 312 is electrically connected to a door lock access assembly 1418. The access control processing system 312 can also be in data communication with the server processing system 340 having access to the data store 342. It will be appreciated that for less sophisticated access control processing systems 312, the server processing system 340 may not be in data communication with the access control processing system 312. It will be appreciated that the system 1402 is configured such that the user is only required to issue an entry request to travel through the doorway in a first direction, wherein the door can be opened without the issuance of an access request when travelling through the doorway in the opposite direction.

The system 1402 operates in a similar manner to that of system 302. Generally, a user is carrying the mobile communication device 310 with them in some way (i.e. in their pocket, in their hand, etc). When the user walks toward the door in a direction which requires an entry request to be issued to access a restricted area of a building, an entry signal from an entry transmitter 330 can be received by the mobile communication device 310. The peak power value for the entry transmitter 330 is used to determine an entry scale value. Another entry signal is received by the mobile communication device 310 from the entry communication device 336. The mobile communication device 336 performs the same processing as that described above wherein in the event that at least some of the one or more entry criteria have been satisfied, the mobile communication device 310 transmits the entry request which is received by communication device 336 and transferred to the access control processing system 312 via the access point microcontroller 1330. The access control processing system 312 then determines whether the entry request is valid and the user is authorised as previously described. In the event of successful validation and authorisation, the access control processing system 312 electrically controls the door lock assembly 1418 to allow the user to open the door and walk through the door way to access the restricted area of the building.

As discussed above, the mobile communication device 310 can receive configuration data from the server processing system 340. The server processing system 340 may be a cloud server. The configuration data can include data regarding the configuration of one or more communication systems 306 associated with one or more restricted areas. In particular, the configuration data can include unique device identities (such as a universally unique identifier, MAC addresses, etc) for each entry and exit communication device and the associated identity of the restricted area (i.e. identity of the parking facilities or the like), calibration data such as transmission characteristics of each entry and exit communication device and the side of a vehicle path each communication device is located. The computer program 308 can configure the mobile communication device 310 to obtain updated configuration data from time to time. The configuration data may be pushed to or pulled by the mobile communication device 310 from the cloud server 340. Therefore, in the event that a particular communication system 306 is reconfigured thereby altering the various transmission characteristics of the particular communication system 306 for a restricted area, the configuration data can be altered at the cloud server 340, wherein each mobile communication device 310 obtains the altered configuration data in a timely manner (e.g. within 6 hours).

Figure 15:
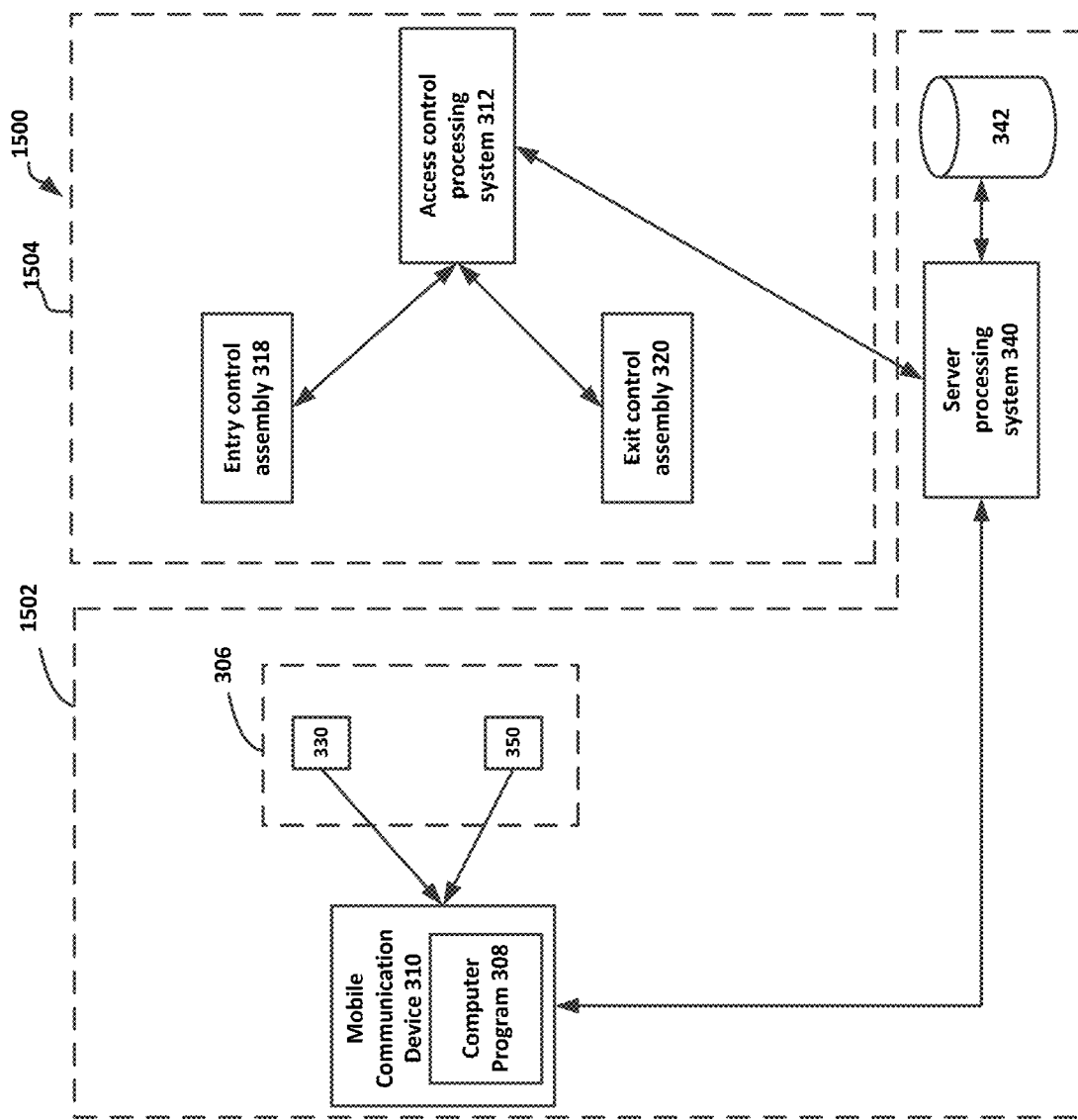
FIG. 15 illustrates a block diagram of a further example system for an access control system.

The systems 302, 1302, 1402 are advantageous as the mobile communication device 310 transmits the entry/exit request using a short range wireless communication network to the local communication system 306. Thus, the user does not require Internet access to be able to enter or exit the restricted area. However, in a variation on systems 302, 1302, 1402 the entry request and exit request can be alternatively transferred via a WAN, such as the Internet, to the server processing system 340 for processing. An example of this system arrangement 1502 is shown in FIG. 15. It will be appreciated that some restricted areas (e.g. underground parking facilities) may not be appropriate for such a configuration. However, for areas which are appropriate where the mobile communication device 310 is able to access the Internet using mobile communication services, the server processing system 340 can be configured to process the received entry or exit request based on the data stored in the data store 342 to determine the validity of the request. In response to positive validation, the server processing system 340 can transfer a command to the access control processing system 312 of the access control system 1504 to actuate the respective entry/exit control assembly 318, 320 (i.e. boom gate or the like) to allow the user to enter or exit the restricted area. In some instances the entry/exit control assembly 318/320 may be more sophisticated and can receive data directly from the server processing system 340. The systems 1502 and 1504 operate together to form system 1500.

Figure 16A:
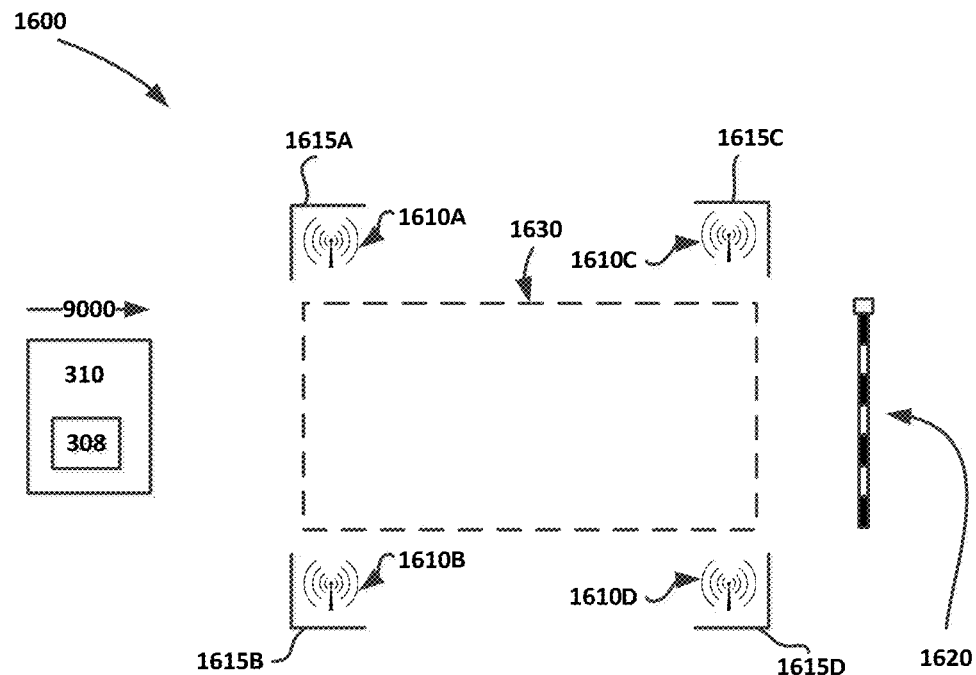
FIGS. 16A and 16B illustrate a block diagram of a further example system for an access control system.
Figure 16B:
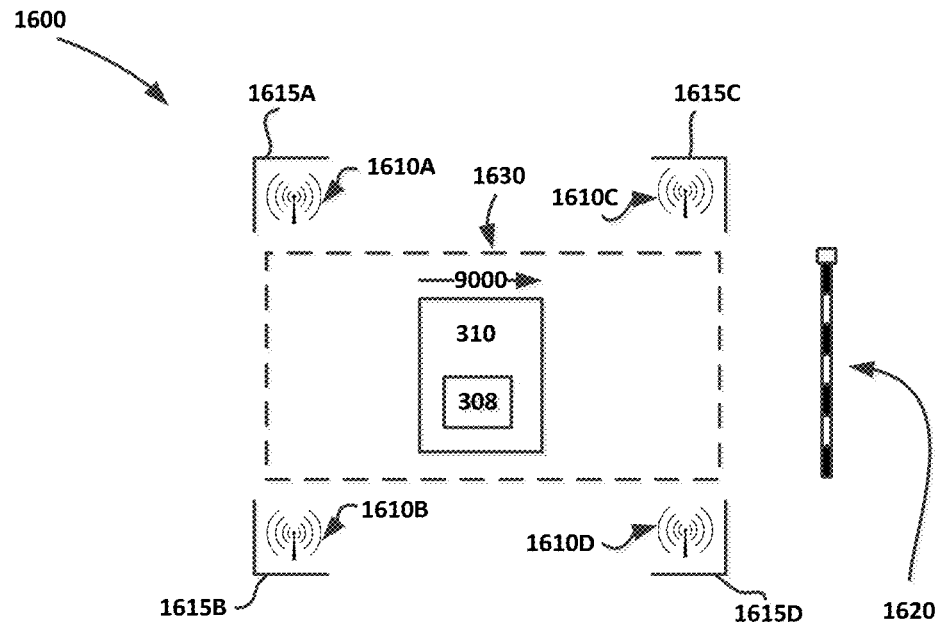

Referring to FIGS. 16A and 16B there is shown an example of a further system 1600. In particular, the system 1600 includes a plurality of transmitters 1610A, 1610B, 1610C, 1610D and a mobile device 310 provided in the form of a mobile communication device 310 configured by a computer program 308. Reference number 1610 is used to refer to any of the transmitters 1610A, 1610B, 1610C, 1610D. Each transmitter 1610 has associated therewith a reflector antenna 1615 (i.e. transmitter 1610A has associated therewith a reflector antenna 1615A, transmitter 1610B has associated therewith a reflector antenna 1615B, transmitter 1610C has associated therewith a reflector antenna 1615C, and transmitter 1610D has associated therewith a reflector antenna 1615D). Each reflector antenna 1615 is configured to substantially reflect signal transmission toward a detection area 1630 which is located between the transmitters. It will be appreciated that whilst the example system in FIGS. 16A and 16B include four transmitters, it is possible to implement the system 1600 using two or more transmitters 1600.

The computer program 308 is an executable program stored in memory of the mobile communication device 310. The mobile communication device 310 can be associated with an entity such as a user. The mobile communication device 310 is configured by the computer program 308 to receive transmitter signals from two or more transmitters 1610 of the plurality of transmitters 1610 when the entity approaches or is within the detection area 1630. The mobile communication device 310 is configured by the computer program 308 to determine, based on at least two of the transmitter signals from the plurality of transmitters, whether the mobile communication device 310 is located in the detection area 1630. In one form, as a result of a positive determination, the mobile communication device 310 is configured to generate and transfer data to a monitoring system to indicate the detection.

In one form, the monitoring system 1600 may be an access control system for an entry or exit point such as an entry or exit point of a vehicular parking facility. In this embodiment, the data transferred to the access control system may be a request to travel through the entry or exit point 1620 based on the received signals. In one form, the request is based on a result of a comparison of a mean value to a threshold, where the mean value is calculated by the mobile communication device 310 based on at least two of the transmitter signals received from at least some of the transmitters 1610. In one form, the mean value is indicative of a mean received signal strength value which may be expressed in dBm, mW or the like, or may be unitless. Similarly, the threshold may be expressed in dBm, mW or the like, or may be unitless.

Preferably, the mobile communication device 310 calculates the mean value and then compares this to a threshold stored in memory of the mobile communication device 310. Preferably, the mobile communication device 310 determines whether the mean value is greater than or equal to the threshold. In one form, the mean value is a harmonic mean. In another form, the mean value is a geometric mean.

In one form, the request to travel through the entry or exit point is transmitted in response to the mobile communication device 310 determining that the mean value of the received signal strengths is greater than or equal to the signal strength threshold over a threshold period of time. More specifically, the request to travel through the entry or exit point is transmitted in response to the mobile communication device 310 determining that the mean value of the received signal strengths is greater than or equal to a first signal strength threshold over a threshold period of time starting when the mean value of the received signal strengths is greater than a second signal strength threshold. In this case, the second signal strength threshold is greater than the first signal strength threshold. Both thresholds can be stored in memory of the mobile communication device 310 and can be received as part of the configuration data as discussed in previous example. This configuration attempts to overcome problems in the sensitivity of the system where there may be changes in the received signal strength for a very short period of time due to a variety of factors.

Referring to FIG. 16A, it can be seen that the mobile communication device 310 is approaching the entry/exit point 1620 in direction 9000. However, as can be seen in FIG. 16A, the mobile communication device 310 is located substantially outside the detection area 1630. In particular, reflector antennas 1615A and 1615B suppress signal transmission of the transmitter signals in a direction behind the respective reflector antennas 1615A, 1615B. Whilst transmitter signals are likely to be received by the mobile communication device 310 from transmitters 1610C and 1610D, these transmitters 1610C and 1610D are further away from the mobile communication device 310 and when the mean value is calculated taking into account the suppressed transmissions received from 1610A and 1610B, the mean value will be substantially less than the threshold which defines the detection area 1630. As such, no request is generated or transferred by the mobile communication device 310 in this situation shown in FIG. 3A and thus the entity has not been provided access to travel through the entry/exit point controlled by the access control system 304.

Referring to FIG. 16B, the mobile communication device 310 has continued to move in direction 9000 toward the entry/exit point 1620. However, in FIG. 16B, the mobile communication device 310 is located within the detection zone 1630 defined by the mean threshold value. The mobile communication device 310 calculates the mean value based upon the received signal strength, such as RSSI values, of the transmitter signals received from the transmitters 1610A, 1610B, 1610C and 1610D. As the received transmitter signals will have a higher signal strength within the detection zone 1630 due to the reflector antennas 1615, the mean value is substantially greater than the mean value calculated outside the detection area 1630. When the mobile communication device 310 compares the mean value to the threshold in the situation depicted in FIG. 16B, the mean value is greater than or equal to the threshold. As a result of this comparison, the mobile communication device 310 generates or transfers a request thereby requesting permission for the entity to travel through the entry/exit point controlled by the access control system 304. Based on the access request, the access control system 304 can actuate an access control assembly 318, 320 to allow the entity to travel through the entry/exit point 1620 which in this case may be a gate, a barrier or the like.

It will be appreciated that the rectangular representation of the detection area 1630 in FIGS. 16A and 16B is merely illustrative for the purposes of clarity. However, as will be shown with further results, the use of the reflector antennas 1615 associated with the transmitters 1610 and the calculation of a mean value of the received transmitter signals enable a substantially clear boundary or perimeter of the detection area 1630 where the mobile communication device 310 can generate and transfer a request to travel through the associated entry/exit point 1630. More specifically, the use of the reflector antennas creates a substantial rate of change in the mean received signal strength for the signals, thereby allowing for the threshold to be set in memory of the mobile communication device 310 to determine when it is located in the detection area 1630. It will be appreciated that the mean value of the received transmitter signals within the boundary of the detection area 1630 are higher than the threshold set to define the boundary of the detection area 1630.

Figure 17A:
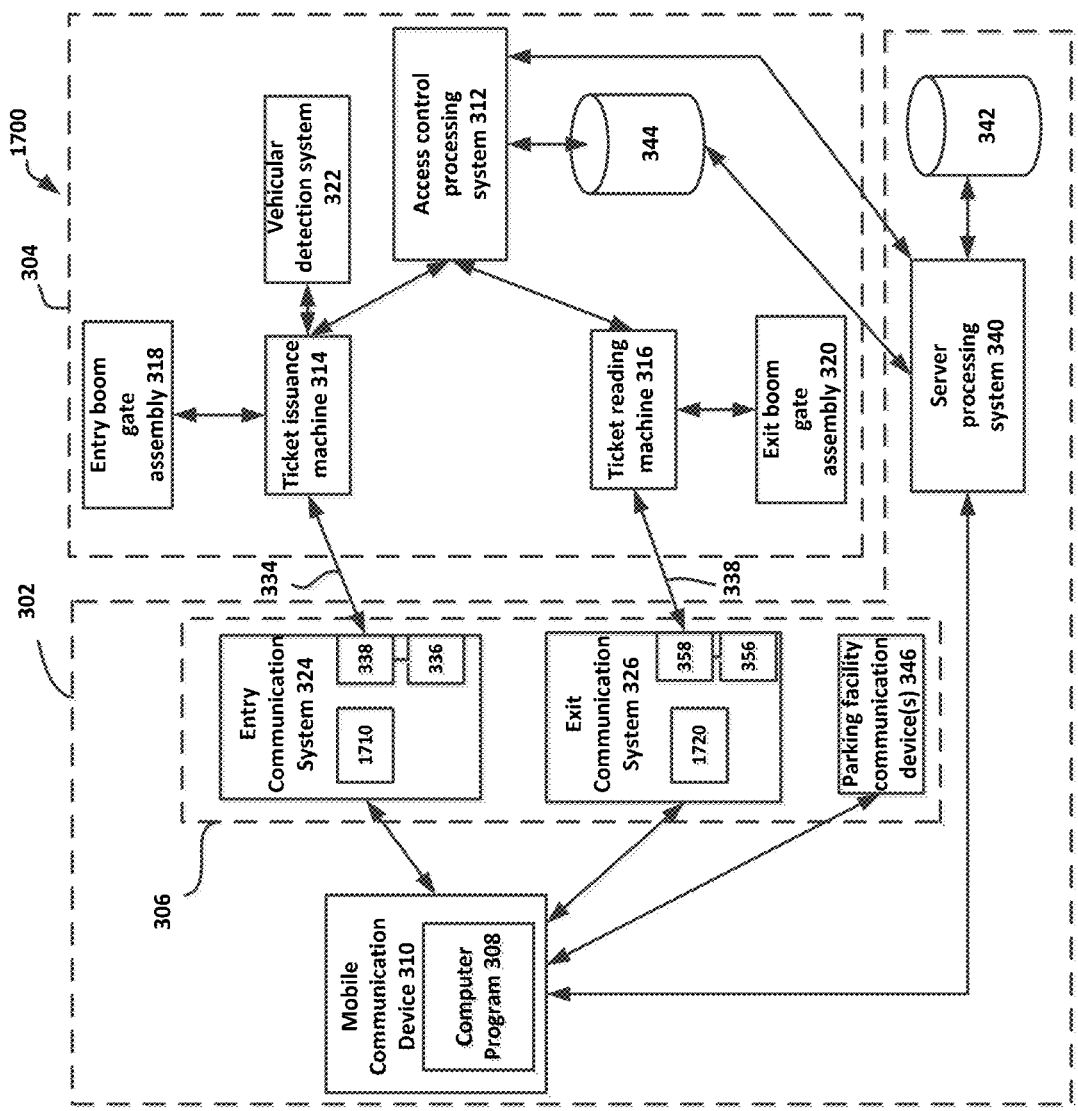
FIG. 17A illustrates a block diagram of a further example system for an access control system for a vehicular parking area.

Referring to FIG. 17A there is shown a block diagram of an example system 1700 for a monitoring system provided in the form of an access control system for a parking facility. In particular, the system 1700 is a modification of system 300 described earlier. Common reference numeral have been used for common components between system 300 and system 1700 in order to avoid duplicating the functional description of the common components. Therefore, prior description relating the common components is incorporated into the description of system 1700. The entry communication system 324 includes entry transmitters 1710 including a plurality of transmitters 1610. The exit communication system 326 similarly includes exit transmitters 1720 including a plurality of transmitters 1610.

The operation of system 1700 will now be described with reference to method 1750 represented by the flowchart of FIG. 17B.

In particular, at step 1752, the method 1750 includes the mobile communication device 310 detecting a boundary crossing event. For example, a local based push notification can be generated by the mobile communication device 310 in response to a boundary crossing event. The mobile communication device 310 begins to monitor for a list of registered transmission regions of the communication system 306 in response to the detected boundary crossing event. Additionally, the computer program 308 is launched in the background environment of the operating system of the mobile communication device 310 in the event it is not already.

As the user approaches an entry point of the vehicular parking facility, step 1754 of the method 1750 includes the mobile communication device 310 under control of the computer program 308 receiving entry transmitter signals from entry transmitters 1710 of the entry communication system 324 of the communication system 306 which are associated with the monitored region.

At step 1756, the method 1750 includes the mobile communication device 310 determining a mean value of the received signal strength based on the received entry transmitter signals and comparing the mean value to the threshold. In particular, as discussed earlier the mean value can be a harmonic mean of the received signal strength for the received signals from the entry transmitters 1610. In some circumstances, the mean value can be calculated as a geometric mean of the received signal strength. In experiments, harmonic mean has been found to achieve a more discernible boundary for the detection area.

In the event that the entry criteria is satisfied whereby the mean value is greater than or equal to the first threshold defining the detection area, the method 1750 continues to proceed to step 1758. Otherwise, in the event that the mean value does not satisfy the criteria (i.e. less than or equal to the first threshold), the method proceeds back to step 1754 whilst the entity associated with the mobile communication device 310 continues to approach the entry point 1630. However, in some embodiments, in the event that the entry criteria is satisfied, the mobile communication device 310 can further continue to calculate the mean value for received samples of the signals received from the transmitters 1610 and determine that a further entry criteria is satisfied whereby the mean value does drop below or equal to a second threshold value for a threshold period of time. The second threshold value can be less than the first threshold value. In the event that the second criteria is satisfied, the method proceeds to step 1758.

At step 1758, the method 1750 includes the mobile communication device 310 generating and transferring, to an entry point microcontroller 338 via communication device 336, an entry request in response to the mean value being greater than or equal to the threshold. In a preferable form, the entry request is generated and transferred in an automated manner without user intervention (i.e. without the user holding the mobile communication device 310 and without operating the mobile communication device 310).

At step 1760, the method 1750 includes the entry point microcontroller 338 transferring the received entry request to the access control system 304 via the ticket issuance machine 314. More specifically, the entry point microcontroller 338 communicates with the ticket issuance machine 314 via the data cable 334. The ticket issuance machine 314 then transfers the entry request to the access control processing system 312 via a computer network such as a Local Area Network (LAN).

At step 1762, the method 1750 includes the entry point microcontroller 338 receiving, via the communication device 336 and the ticket issuance machine 314, authorisation data generated by the access control system 304. In particular, the access control processing system 312 generates the authorisation data that is transferred to the ticket issuance machine 314 via the computer network which in turn transfers the authorisation data to the communication device 336 of the entry point microcontroller 338 and the interconnecting data cable 334. The authorisation data is stored in the database 344 accessible by the access control processing system 312.

At step 1764, the method 1750 includes the communication device 336 associated with the entry point microcontroller 338 wirelessly transferring the authorisation data to the mobile communication device 310 of the user for storage in memory of the mobile communication device 310 as a form of virtual ticket.

At step 1766, the method 1750 includes the access control processing system 312 instructing the ticket issuance machine 314 to actuate the entry gate assembly 318 to move to an open position.

As the user approaches an exit point of the vehicular parking facility, step 1768 of the method 1750 includes the mobile communication device 310 under control of the computer program 308 receiving exit transmitter signals from at least some of the exit communication devices of the communication system 306 which are associated with the monitored region.

At step 1770, the method 1750 includes the mobile communication device 310 determining a mean value based on the received signal strength of the exit transmitter signals from the exit transmitters 1610 and comparing the mean value to a threshold. In particular, as discussed earlier the mean value can be a harmonic mean. In some circumstances, the mean value can be calculated as a geometric mean. In experiments, harmonic mean has been found to achieve a more discernible boundary for the detection area.

In the event that the mean value satisfies the exit criteria (i.e. mean value greater than or equal to the threshold defining the detection area for the exit point), the method 1750 continues to proceed to step 1772. Otherwise, in the event that the mean value does not satisfy the exit threshold (i.e. mean value less than or equal to the threshold defining the detection area for the exit point), the method 1750 proceeds back to step 1768 whilst the entity associated with the mobile communication device 310 continues to approach the exit point 1630. However, in some embodiments, the mobile communication device 310 can further continue to calculate the mean value for received samples of the signals received from the transmitters 1610 over time and determine that each mean value does drop below or equal to a second threshold value for a threshold period of time. The second threshold value can be less than the first threshold value. In the event that a second entry criteria is satisfied whereby the mean values that were calculated after the first criteria was satisfied were greater than the second threshold value for the threshold time period, the method proceeds to step 1772.

At step 1772, the method 1750 includes the user's mobile communication device 310 transferring an exit request indicative of the authorisation data to the exit communication system 356 in response to the mean value satisfying one or more exit criteria. In a preferable form, the exit request is generated and transferred in an automated manner without user intervention (i.e. without the user holding the mobile communication device and without operating with the mobile communication device). The exit request is indicative of at least the authorisation data in this example.

At step 1774, the method 1750 includes the communication device 356 transferring the exit request to the access control processing system 312 and the ticket reading machine 316. In particular, the exit communication device 356 of the exit point microcontroller 358 transfers the exit request to the ticket reading machine 316 via the data cable 338. The ticket-reading machine 316 then transfers the exit request to the access control processing system 312 via the LAN.

At step 1776, the method 1750 includes the access control processing system 312 transferring an exit actuation command to the ticket-reading machine 316 such that the exit boom gate assembly 320 is opened to allow the user to drive their vehicle out of the exit point of the vehicular parking facility.

As discussed above, the mobile communication device 310 can receive configuration data from the server processing system 340. The server processing system 340 may be a cloud server. The configuration data can include data regarding the one or more thresholds for a plurality of entry/access points. The computer program 308 can configure the mobile communication device 310 to obtain updated configuration data from time to time. The configuration data may be pushed to or pulled by the mobile communication device 310 from the cloud server 340. Therefore, in the event that a particular communication system 306 is reconfigured thereby altering the various transmission characteristics of the particular communication system 306 for a restricted area, the configuration data can be altered at the cloud server 340, wherein each mobile communication device 310 obtains the altered configuration data in a timely manner (e.g. within 6 hours). Different types of configuration data may be stored by the cloud server 340 for various mobile communication device types and models. For example, the cloud server may have a first type of configuration data for a first mobile communication device type (e.g. Apple iPhone™), a second type of configuration data for a second mobile communication device type (e.g. Samsung mobile phones and the similar styled phones), and a third type of configuration data for other mobile communication device types (e.g. Motorola mobile phones and the like). Thus, the cloud server is configured to determine the type of the mobile communication device 310 and provide the corresponding type of configuration data to the respective mobile communication device 310. The configuration data can be provided in the form of a database.

Figure 18:
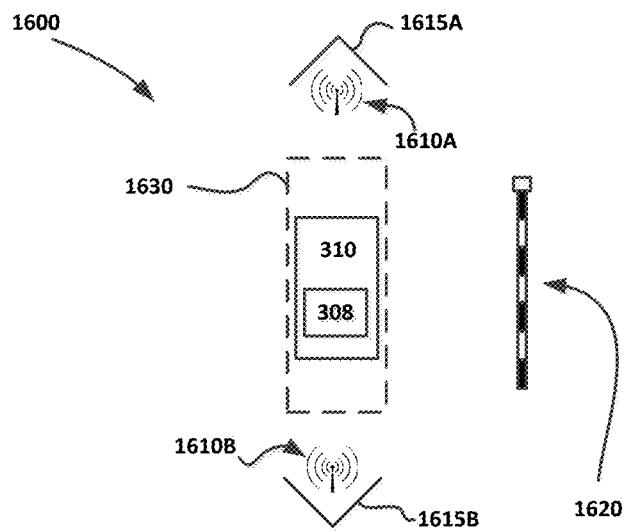
FIG. 18 illustrates a plan view of an alternate transmitter arrangement for a system to operate with an access control system.

Referring to FIG. 18 there is shown an alternate arrangement of transmitters 1610A, 1610B. Unlike examples shown in FIGS. 16A and 16B, the transmitter arrangement only includes two transmitters 1610A and 1610B. As can be seen in FIG. 18, the plurality of transmitters 1610A, 1610B are spaced apart from each other and the reflector antennas 1615A, 1615B associated with the transmitters 1610A, 1610B face substantially toward each other to thereby define the detection area 1630 in at least some of the area therebetween.

In particular arrangements, each reflector antenna 1615 is a corner reflector antenna which generally includes reflecting walls which are orthogonal to each other. In these arrangements, each transmitter is spaced about a half wavelength from a respective corner of the respective corner reflector antenna and wherein respective reflecting walls of the respective corner reflector antenna are equal to or greater than the wavelength. In particular arrangements, the transmitters 1610 are preferably Bluetooth devices such as Bluetooth low energy transmitters. Therefore, given the operating frequency of such Bluetooth devices, a dipole driven element 1901 of the transmitter is located approximately 6.25 cm from the corner of the corner reflector antenna. In this example the reflector walls have a sheet profile in the sense that the reflector walls have no gaps or holes (like a screen), thus inhibiting transmission behind the reflector walls relative to the dipole 1901.

Figure 19:
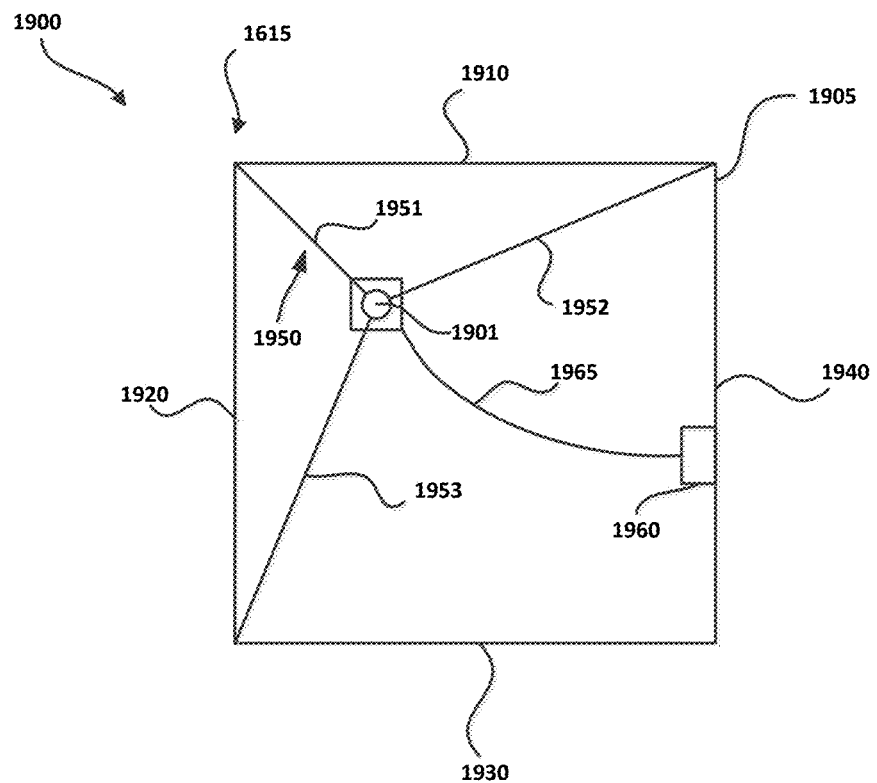
FIG. 19 illustrates a cross-sectional view of an example transmitter assembly including a bollard and a transmitter.
Figure 20:
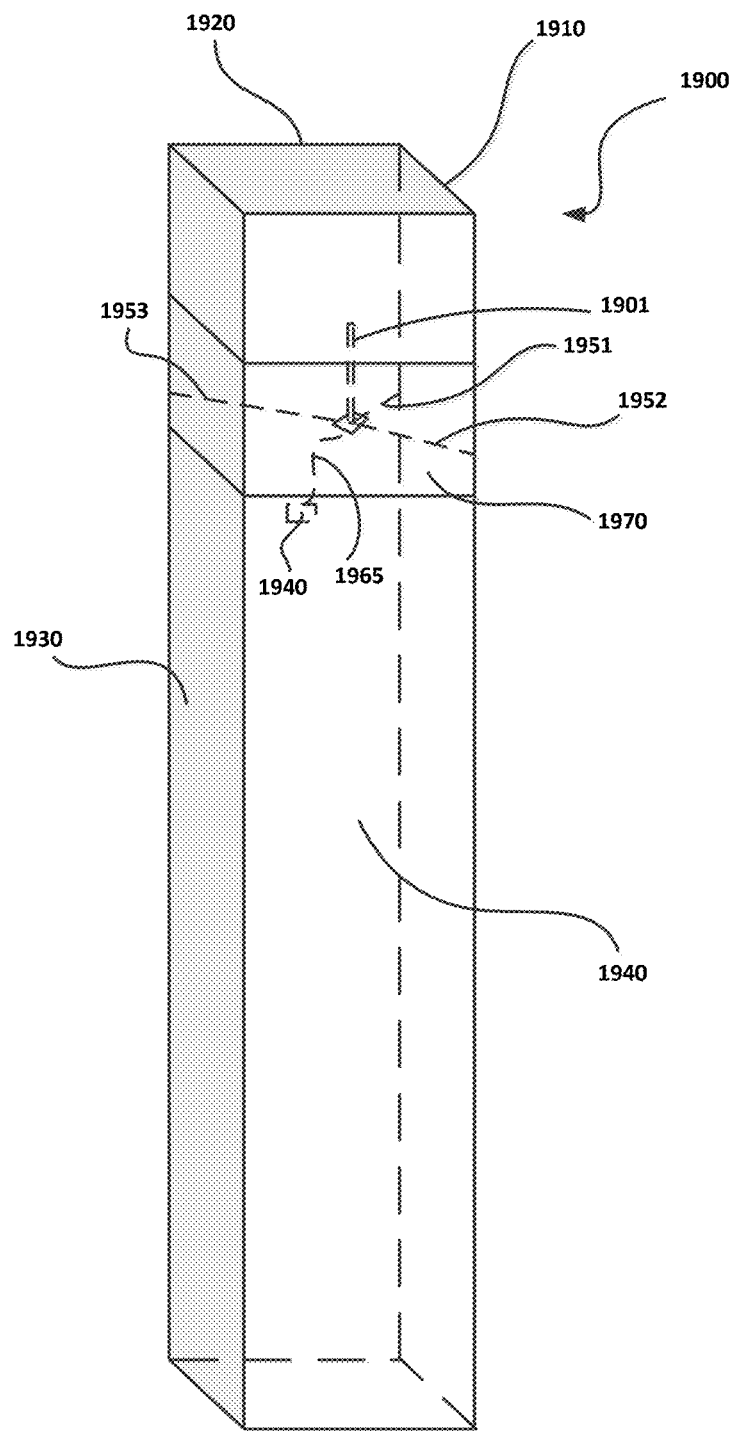
FIG. 20 illustrates a semi transparent projected view of the transmitter assembly of FIG. 19.

Referring to FIGS. 19 and 20, the transmitter and reflector antenna can together form a transmitter assembly 1900 provided in the form of a bollard 1905. The reflecting walls of each reflector antenna 1615 are two orthogonal walls 1910, 1920 of a bollard housing the respective transmitter.

As can be seen in FIGS. 19 and 20, the bollard 1905 has a substantially square cross-sectional profile. A dipole driven element 1901 of each transmitter is spaced from the corner reflector antenna 1615 by a spacing bracket 1950 mounted within the respective bollard 1905. In particular, spacing bracket members 1951, 1952 and 1953 extend from walls 1910, 1920 and the corner of the corner reflector antenna 1615 to locate the dipole driven element 1901 of the transmitter 1610 in free space the required distance from the corner. In experiments conducted with Bluetooth devices, the horizontal length of the orthogonal walls 1910, 1920 of the bollard which form the reflecting walls of the reflector antenna 1615 have been greater than or equal to approximately 12.5 cm (i.e. about one wavelength for Bluetooth devices) and preferably about 15 cm.

As can be seen in FIGS. 19 and 20, the transmitter assembly 1900 can include an electrical power source 1940 which is electrically coupled via an electrical wire 1965 to the transmitter 1610. In the examples shown in FIGS. 19 and 20, the electrical power source 1940 may be a battery which is mounted to the wall 1940 which is not part of the reflector antenna 1615 and clear of the window 1970. It will be appreciated that it is possible for other power sources to be used, such as mains power or the like.

Referring to FIG. 20, each bollard 1905 includes a cutout section defining a window 1970 to enable transmission of the respective transmitter signals by the respective transmitter 1610. Each bollard 1905 has a protective cover to substantially cover the respective cutout section defining the window 1970 without substantially inhibiting the transmission of the respective transmitter signal by the respective transmitter 1610 toward the detection area.

Each bollard can include an upper and lower signal suppression material located above and below the transmitter to substantially suppress diffraction of transmission of the respective transmitter signal in an upward and downward direction. For example, an upper and lower reflective plate may be provided thereby defining a cheese antenna.

As shown in FIGS. 16A and 16B, the transmitter arrangement can include four transmitters 1610 arranged in a quadrilateral arrangement. The transmitters can be spaced a sufficient distance to allow for the entity to enter the detection area 1630 via and between neighboring transmitters 1610. As also discussed in relation to FIG. 18, it is also possible to provide a transmitter arrangement including two transmitters 1610. It is also possible to provide three transmitters 1610, wherein the three transmitters are spaced apart from each other in a triangular configuration and the reflector antennas 1615 face substantially toward each other to thereby define the detection area in at least some of the area therebetween. This triangular transmitter arrangement can occur when one of the transmitters 1610 stops operating.

Figure 17B:
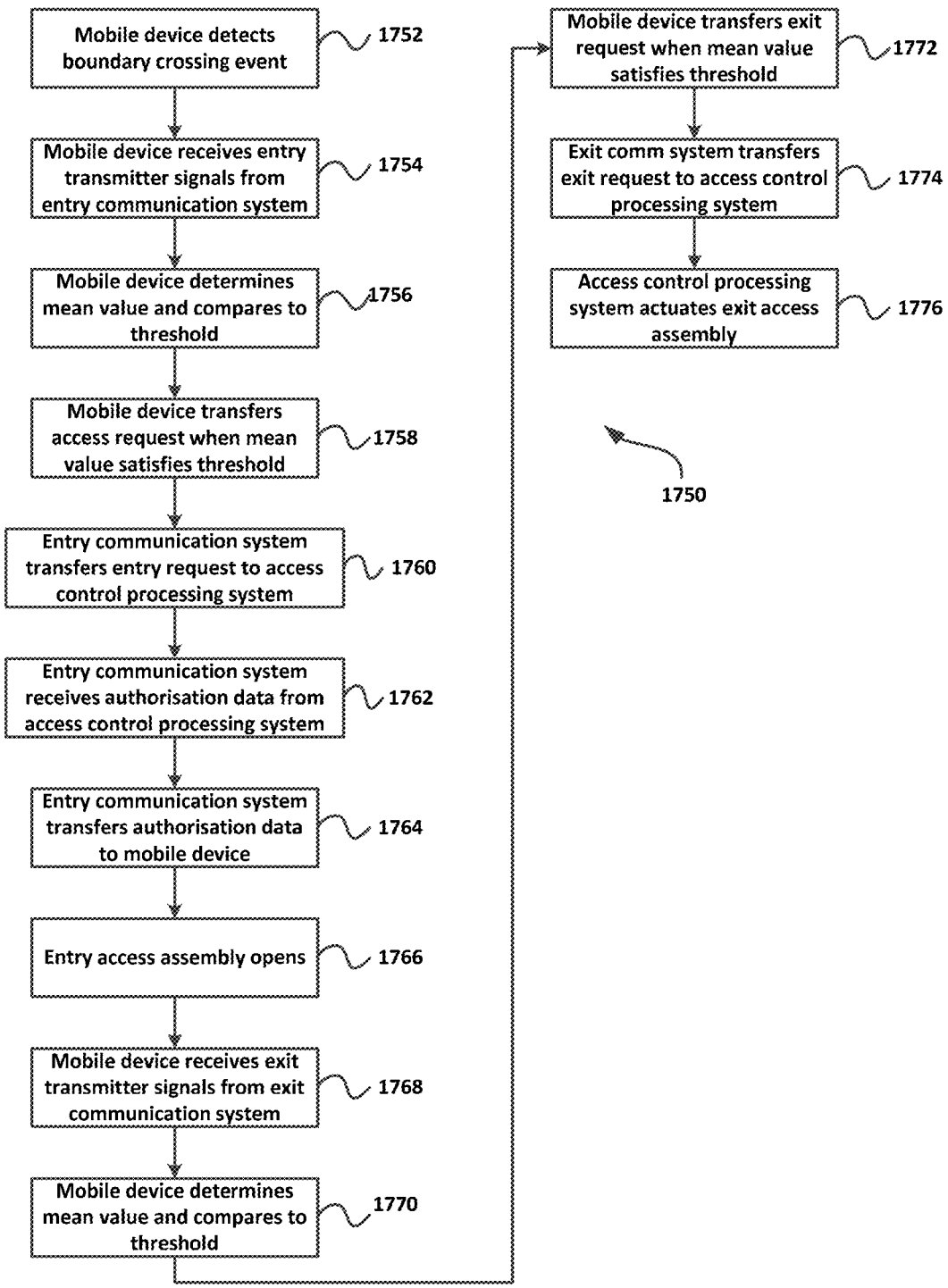
FIG. 17B illustrates a flow chart representing a method performed by the system of FIG. 17A.

In the example discussed in relation to FIGS. 17A and 17B, the entry or exit request is received by the communication device 336, 356 associated with the entry or exit microcontroller 338, 358 which allows for the system to be operational in situations, such as underground vehicular parking facilities, where the mobile communication device 310 may be unable to utilise a mobile telecommunication network to connect to the Internet and the like. However, in situations the system is operational in an area where a mobile telecommunication network can be accessed by the mobile communication device 310, the entry or exit request can be transferred to the access control processing system 312 via the mobile telecommunication network associated with the mobile communication device 310. Upon receiving the entry or exit request, the access control processing system 312 can instruct the entry or exit microcontroller 338, 358 to actuate the respective access control assembly 318, 320. The authorisation data may be transferred by the access control processing system 312 via a computer network which is received by the mobile communication device 310 via the mobile telecommunication network. Thus, in this arrangement, communication between the mobile communication device 310 and the access control processing system 312 does not need to be relayed via the entry/exit microcontroller 338, 358.

During installation of the transmitter arrangement, an installer can walk near the expected boundary of the detection area whilst holding the installation mobile communication device whilst viewing the mean received signal strength values being calculated and displayed to the installer. Additionally a log may be recorded by the installation mobile communication device. At the point where there is a substantial rate of change in the mean value recorded at the boundary, the mean value is recorded. Mean values are recorded at different locations (i.e. front edge, back edge, left side edge, right side edge) of the detection area. The threshold is then calculated as the average of the mean values as shown below by Equation 1.

$$RSSI_{Threshold} = \frac{RSSI_{edge1} + RSSI_{edge2} + RSSI_{edge3} + RSSI_{edge4}}{4} \quad \text{Equation 1}$$

The determined threshold can then be stored as part of the configuration data managed by the cloud server 340 which can be distributed to the one or more mobile communication devices 310 of the system. The installer may have different types of installation mobile communication devices which represent common types of mobile communication devices used by users. As such, the process can be repeated for the remaining installation mobile communication devices to capture relevant configuration data for these types of mobile communication devices which have different antenna designs.

Simulation results discussed in relation to FIGS. 21 to 34 relate to a transmitter arrangements where transmitters are separated by 3.5 meters. For example, in a four transmitter arrangement, the transmitters 1610 are arranged in a square configuration where the distance between neighbouring transmitters is 3.5 metres. In a three transmitter arrangement, one of the transmitters of the four transmitter arrangement is switched off. In a two transmitter arrangement, two neighbouring transmitters are switched off such that the remaining two transmitters are spaced apart by 3.5 metres.

Figure 22:
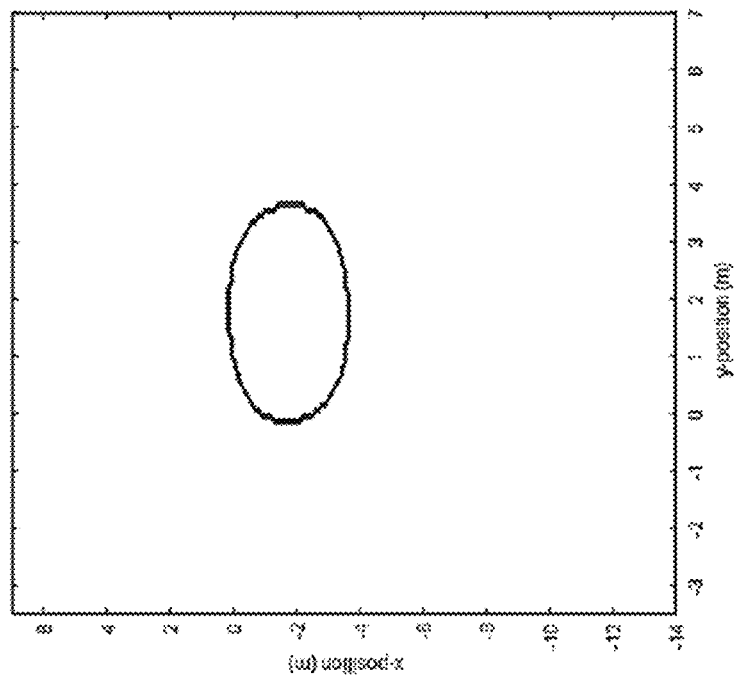
FIG. 22 illustrates a two dimensional plot of the boundary of the detection area for the simulated transmitter configuration of FIG. 21.
Figure 21:
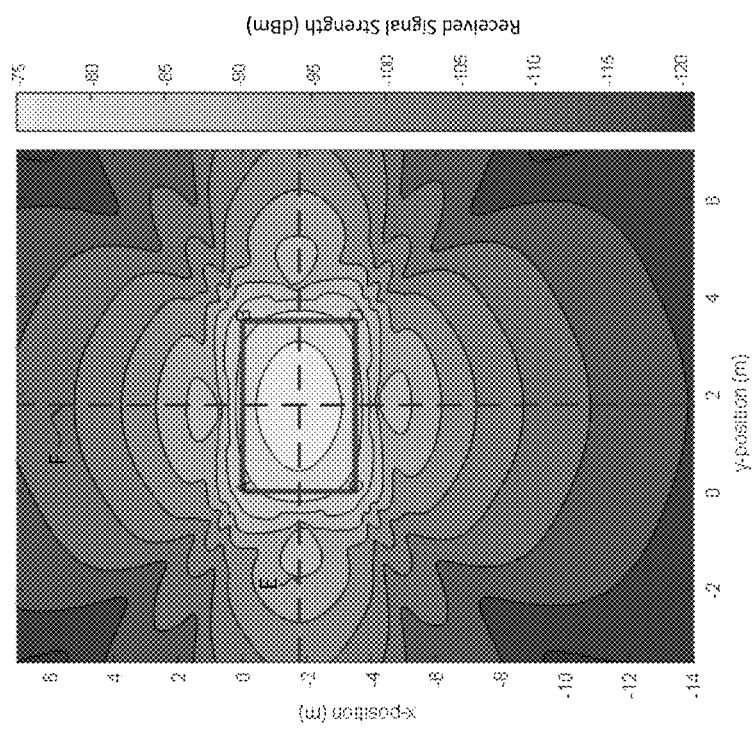
FIG. 21 illustrates a contour plot showing the calculated harmonic mean value at various positions for a simulation of a four transmitter configuration without noise and a superimposed ideal boundary of the detection area.
Figure 24:
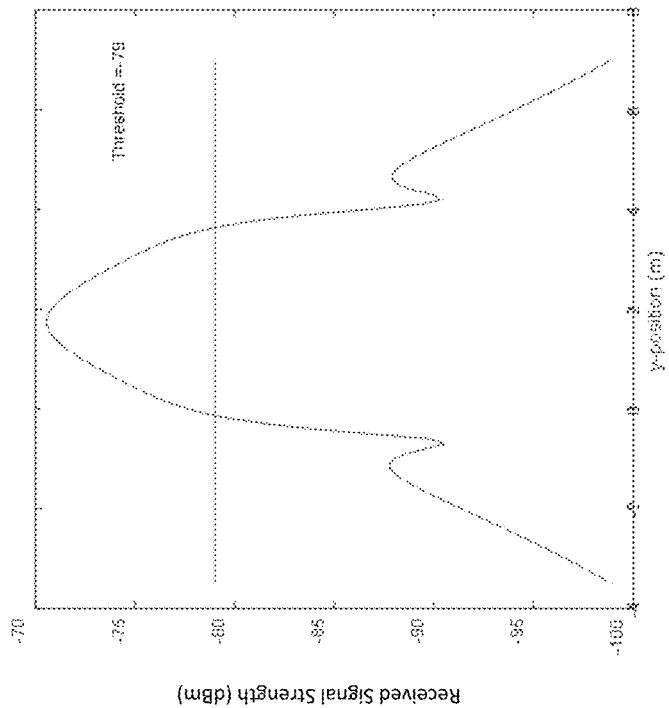
FIG. 24 is a graph of the calculated harmonic mean value at positions along line F for the simulated transmitter configuration of FIG. 21.
Figure 23:
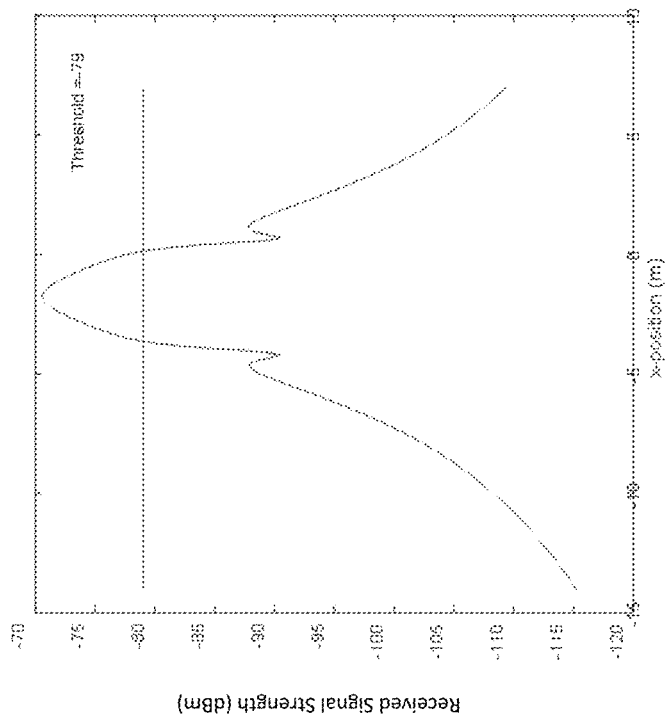
FIG. 23 is a graph of the calculated harmonic mean value at positions along line E for the simulated transmitter configuration of FIG. 21.
Figure 26:
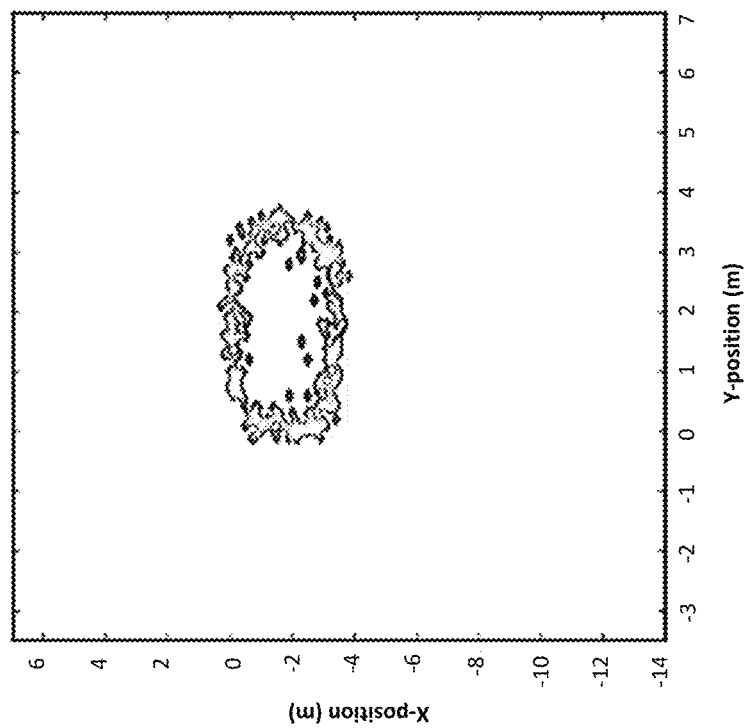
FIG. 26 a two dimensional plot of the detection area for the simulated transmitter configuration of FIG. 25.
Figure 25:
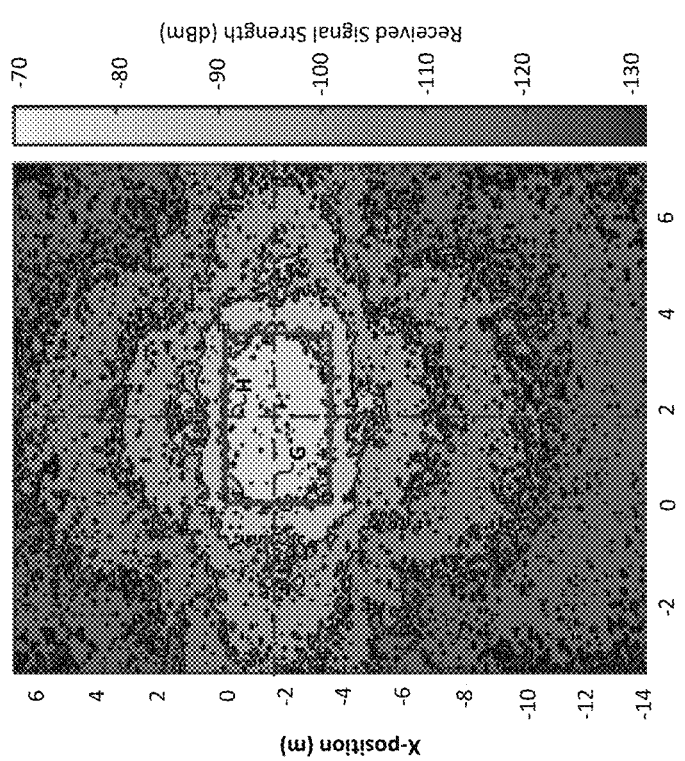
FIG. 25 illustrates a contour plot showing the calculated harmonic mean value for a simulation of a four transmitter configuration with noise and a superimposed ideal boundary of the detection area.
Figure 28:
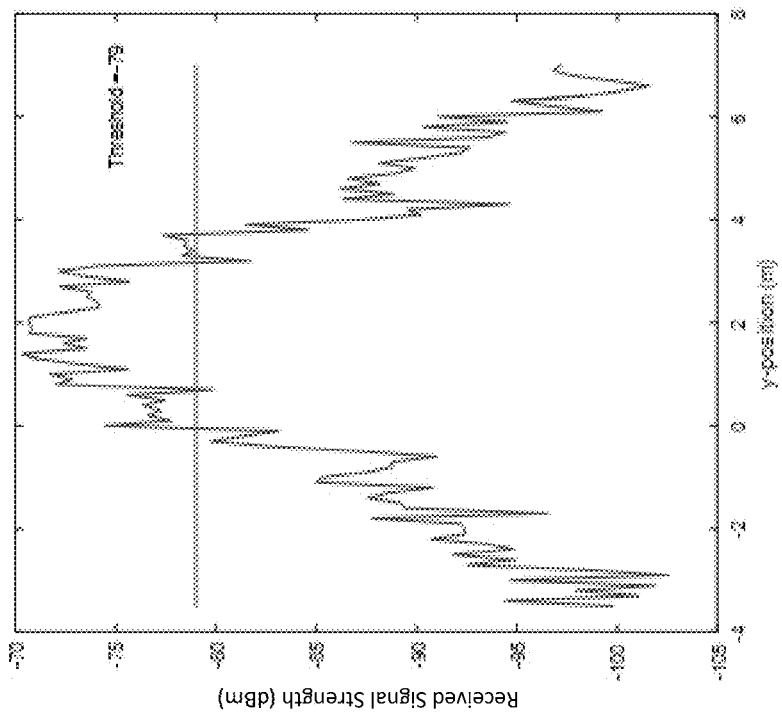
FIG. 28 is a graph of the calculated harmonic mean value at positions along line H for the simulated transmitter configuration of FIG. 25.
Figure 27:
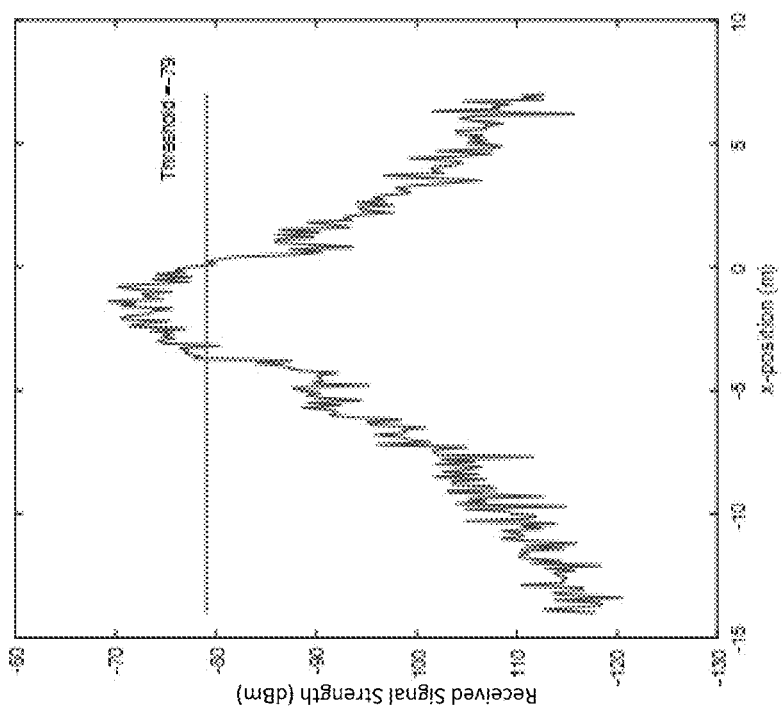
FIG. 27 is a graph of the calculated harmonic mean value at positions along line G for the simulated transmitter configuration of FIG. 25.

Referring to FIG. 21 there is shown a contour plot of a simulation of the calculated harmonic mean value for an area adjacent an entry/exit point. The simulation includes no noise. The contour plot also has superimposed thereon an ideal boundary of the detection area. Based on the harmonic mean value, a threshold harmonic mean value can be selected which in this example is set to −79 dBm to define a detection area shown in FIG. 22. As shown in FIG. 22, with the selection of a −79 dBm harmonic mean threshold results in the detection area covering 3.7 metres in the x and y axes. FIGS. 23 and 24 show graphs of the calculated harmonic mean values in the x and y axes of the area adjacent the entry/exit point along lines E, F shown in FIG. 21. FIGS. 23 and 24 clearly show that there is a substantial increase in the harmonic mean value and the rate of change thereof when approaching the boundary of the detection zone which thereby allows the selection and setting of an appropriate harmonic mean threshold to enable the mobile communication device 310 determine when it is within the detection area 1630.

Referring to FIGS. 25, 26, 27 and 28 there is shown similar contour plots to those of FIGS. 21, 22, 23 and 24 but for the simulated transmitter arrangement including noise. As can be seen in these contour plots, a clear detection area can be defined based on the selection of an appropriate harmonic mean threshold, despite the noise, which again in this example was selected to be −79 dBm. Due to the noise applied to the simulation, the detection area covers a region extending 4.1 metres in the x axis and 3.8 metres in the y axis for the area adjacent the entry/exit point.

Figure 30:
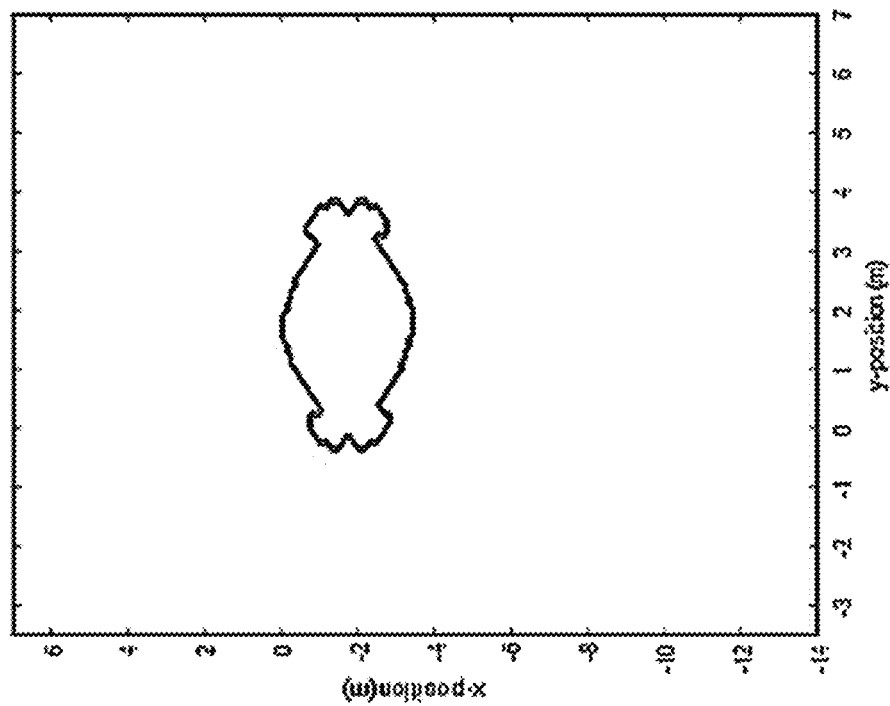
FIG. 30 is a two dimensional plot of the boundary of the detection area for the simulated transmitter configuration of FIG. 29.
Figure 29:
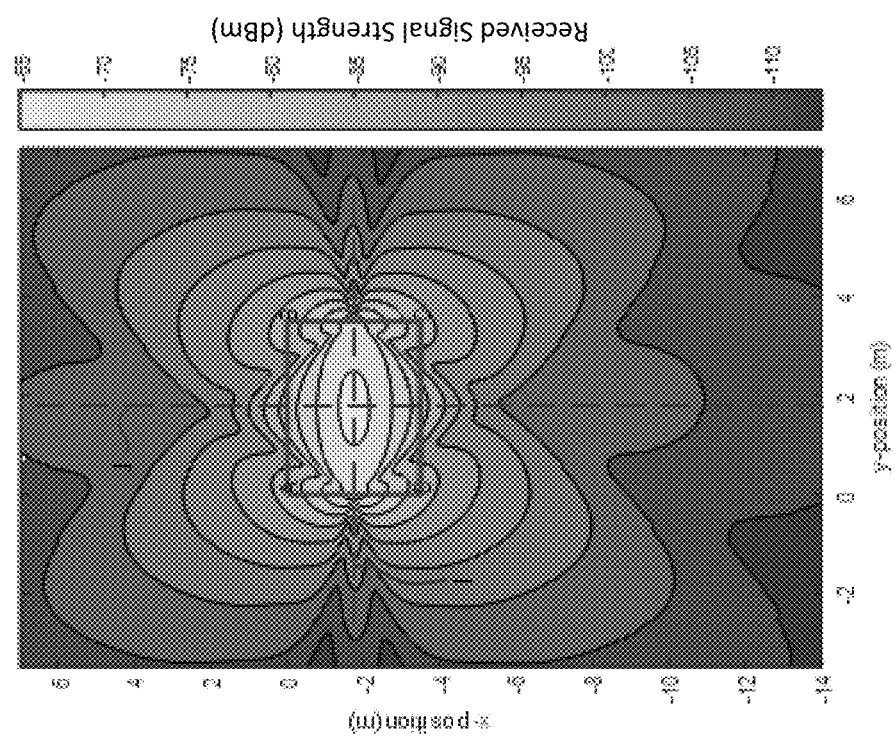
FIG. 29 is a contour plot representation showing the calculated harmonic mean value for a simulation of a two transmitter configuration without noise and a superimposed ideal boundary of the detection area.
Figure 32:
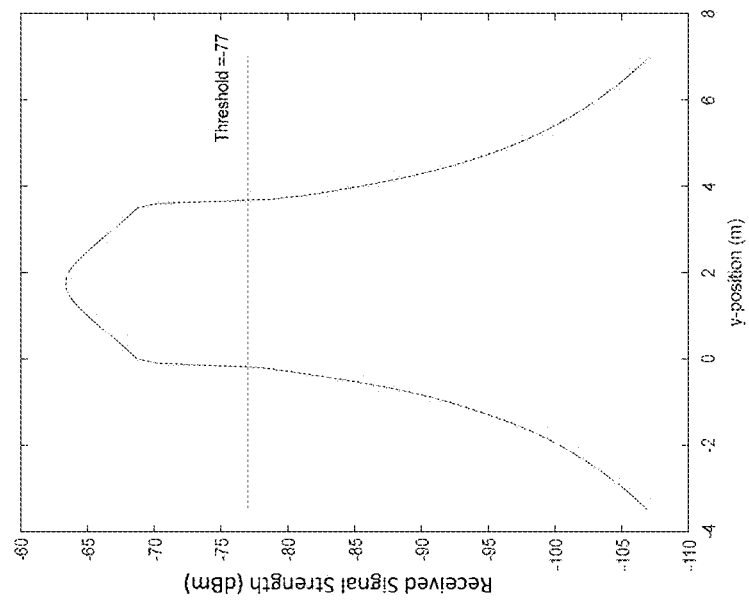
FIG. 32 is a graph of the calculated harmonic mean value at positions along line J for the simulated transmitter configuration of FIG. 29.
Figure 31:
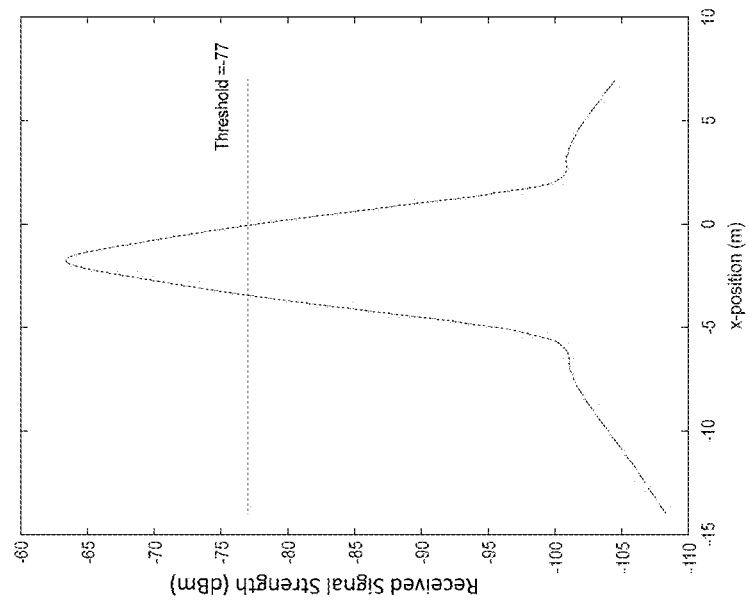
FIG. 31 is a graph of the calculated harmonic mean value at positions along line I for the simulated transmitter configuration of FIG. 29.

Referring to FIGS. 29, 30, 31 and 32 similar contour plot to those of FIGS. 21, 22, 23 and 24 but for a simulated transmitter arrangement, without noise, having only two transmitters as discussed and depicted in FIG. 18. Again, as can be seen in FIG. 30, with the selection of an appropriate harmonic mean threshold, a distinct detection area can be defined. FIGS. 31 and 32 clearly show that the harmonic mean value increases substantially at the boundary of the detection area as defined by the selected harmonic mean threshold. In this example, the harmonic mean threshold is set to −77 dBm which defines a detection area which extends 3.4 metres in the x axis and 4.1 metres in the y axis.

Figure 33:
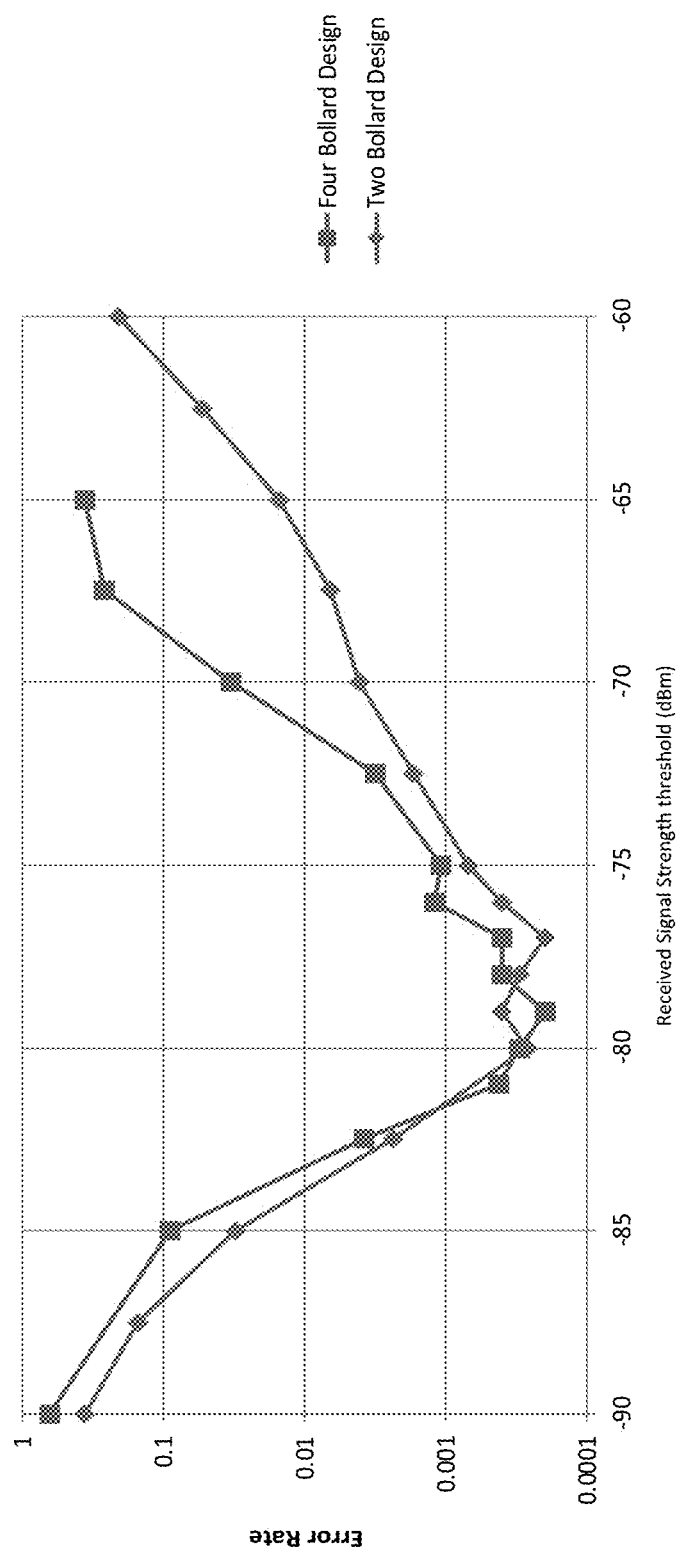
FIG. 33 is a graph showing a plot of error rates for various harmonic mean value thresholds for a two and four transmitter configuration.

FIG. 33 depicts a graph plotting the error rate for various selected harmonic mean thresholds for the simulated four transmitter and two transmitter arrangements. The error rates were calculated using a simulation of the mobile communication device 310 travelling through each detection area at various random speeds and using random communication transitions and using different mean thresholds. As can be seen in FIG. 33, a similar error rate (i.e. less than 0.001) can be achieved with differently selected harmonic mean thresholds. As can also be seen, substantially low error rates can be achieved using the multi transmitter arrangements disclosed.

Figure 34:
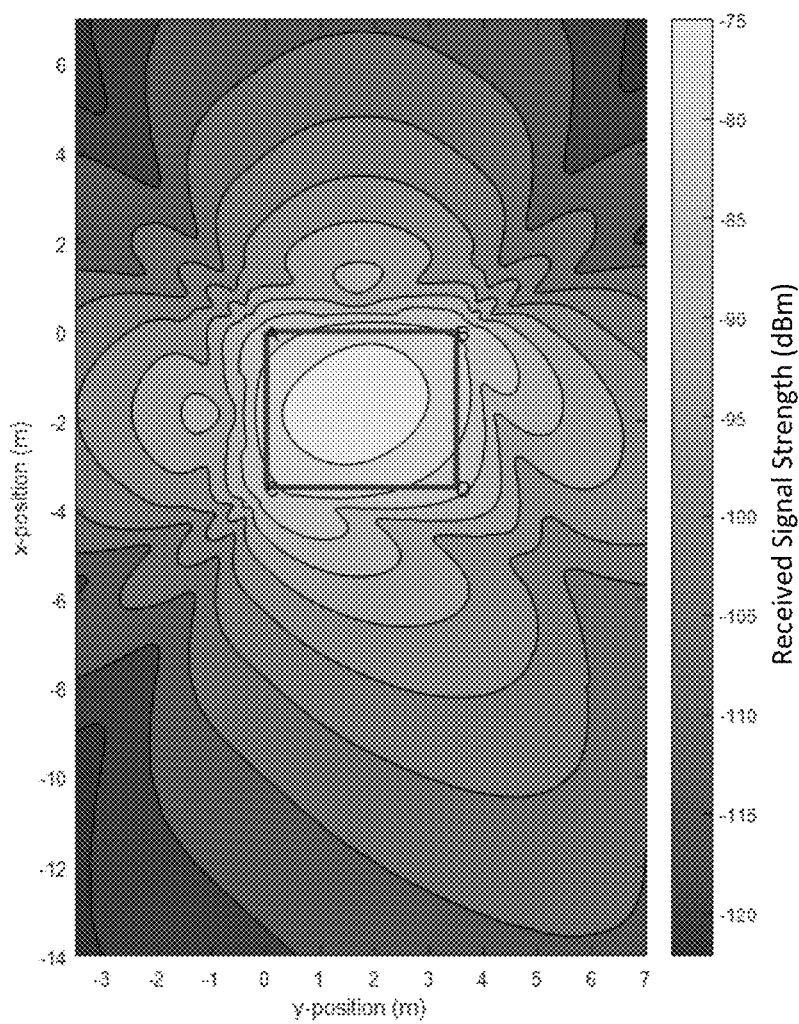
FIG. 34 is a contour plot representation showing the calculated harmonic mean RSSI for a simulation of a three transmitter configuration without noise and a superimposed ideal boundary of the detection area.

FIG. 34 shows a contour plot of the calculated harmonic mean value over an area adjacent an entry/exit point using a simulation of a triangular spaced configuration of transmitters 1610. In particular, one of the transmitters 1610 of the four transmitter configuration has been turned off and the harmonic mean value has been calculated over the region. As can be seen from the contour plot of FIG. 34, a transmitter arrangement including three transmitters 1610 arranged in a triangular configuration can be used if an appropriately selected harmonic mean threshold is used to define a clear boundary for the detection area.

Figure 35:
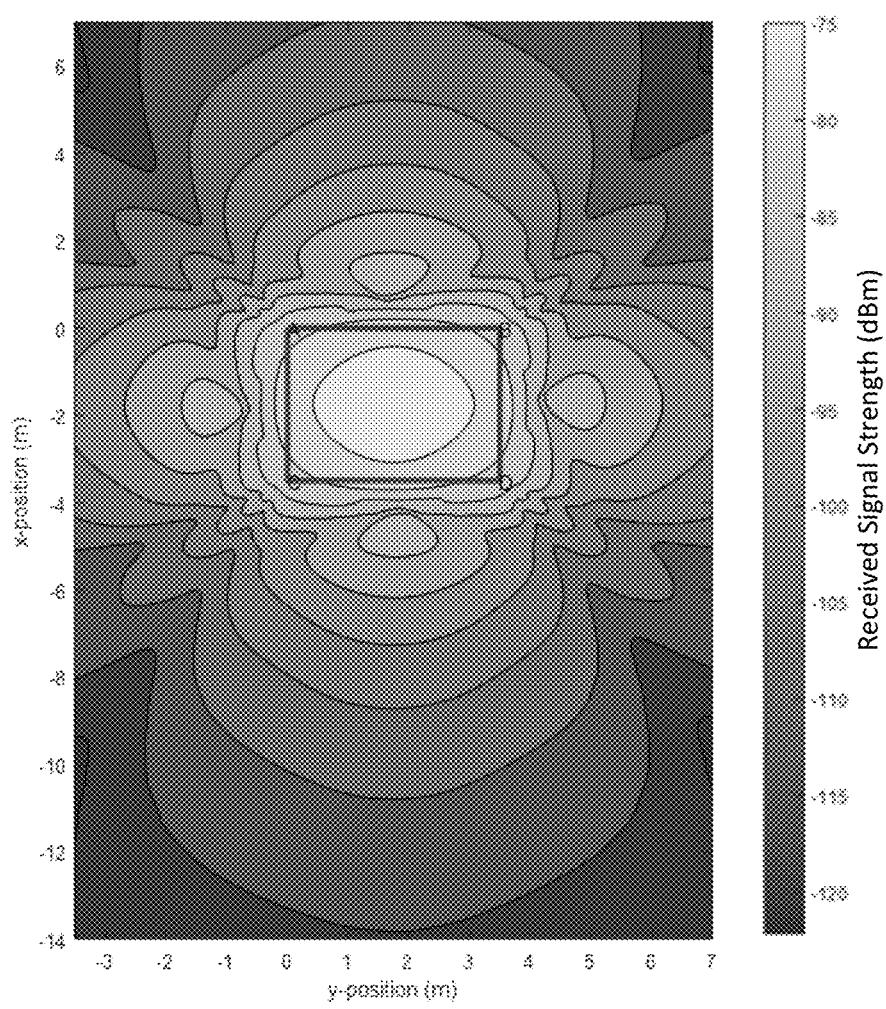
FIG. 35 is a contour plot representation showing the calculated geometric mean value for a simulation of a four transmitter configuration without noise and a superimposed ideal boundary of the detection area.

FIG. 35 shows a contour plot of the calculated geometric mean value over the same area adjacent an entry/exit point using the same simulated quadrilateral spaced configuration of transmitters 1610 as used for FIG. 21. When the contour plots of FIGS. 35 and 21 are compared, it can be seen that the geometric mean can also be calculated by the mobile communication device 310 and that the mean threshold can be set to an appropriate geometric mean threshold to thereby define a boundary of the detection area. However, it will be appreciated from a comparison of FIGS. 21 and 35 that it has been found more preferable to use the harmonic mean value.

It will be appreciated that the transmitter arrangements 1610 for enabling the mobile communication device 310 to automatically determine that it's location is within a defined detection area are highly advantageous. In particular, due to the use of a mean RSSI threshold effectively defining a relatively contained detection area, it is possible to locate multiple transmitter arrangement in an area. For example, a vehicular parking facility may have multiple entry and exit points located near each other. Utilising the above described techniques, the contained detection areas can be defined such as to not leak or overlap into adjacent areas such as a neighbouring pathway with a respective transmitter arrangement and detection area. This advantage is unique as it is highly difficult to achieve this level of accuracy with current implementations, such as the Apple iBeacon which does not have the level of control regarding the defined regions which the mobile communication device will perform an automated action in response to receiving a beacon signal.

In another variation, it is possible for the mobile communication device 310 to determine a plurality of mean values for adjacent transmitters 1610. For example, a first mean value can be determined for transmitters 1615A and 1615B, and then a second mean value can be determined for transmitters 1615C and 1615D. The mobile communication device 310 can then determine a discrepancy value of the first and second mean values. The mobile communication device can then compare the discrepancy to a discrepancy range stored in memory. In the event that the discrepancy falls within the range, the mobile communication device 310 determines that the entry/exit request can be transferred accordingly. In an additional or alternative form, a first diagonal transmitter pair mean value can be determined for transmitters 1615A and 1615D, and then a second diagonal transmitter pair mean value can be determined for transmitters 1615B and 1615C. The mobile communication device 310 can then determine a diagonal pair discrepancy value of the first and second diagonal transmitter pair mean values. The mobile communication device can then compare the diagonal pair discrepancy value to a diagonal pair discrepancy range stored in memory. In the event that the diagonal pair discrepancy value falls within the range, the mobile communication device 310 determines that the entry/exit request can be transferred accordingly. Optionally, both discrepancy values must fall within the respective ranges in order for the entry/exit request to be transferred.

In a further variation, a time series of discrepancy values can be used to determine a travel path through the detection area.

Figure 36:
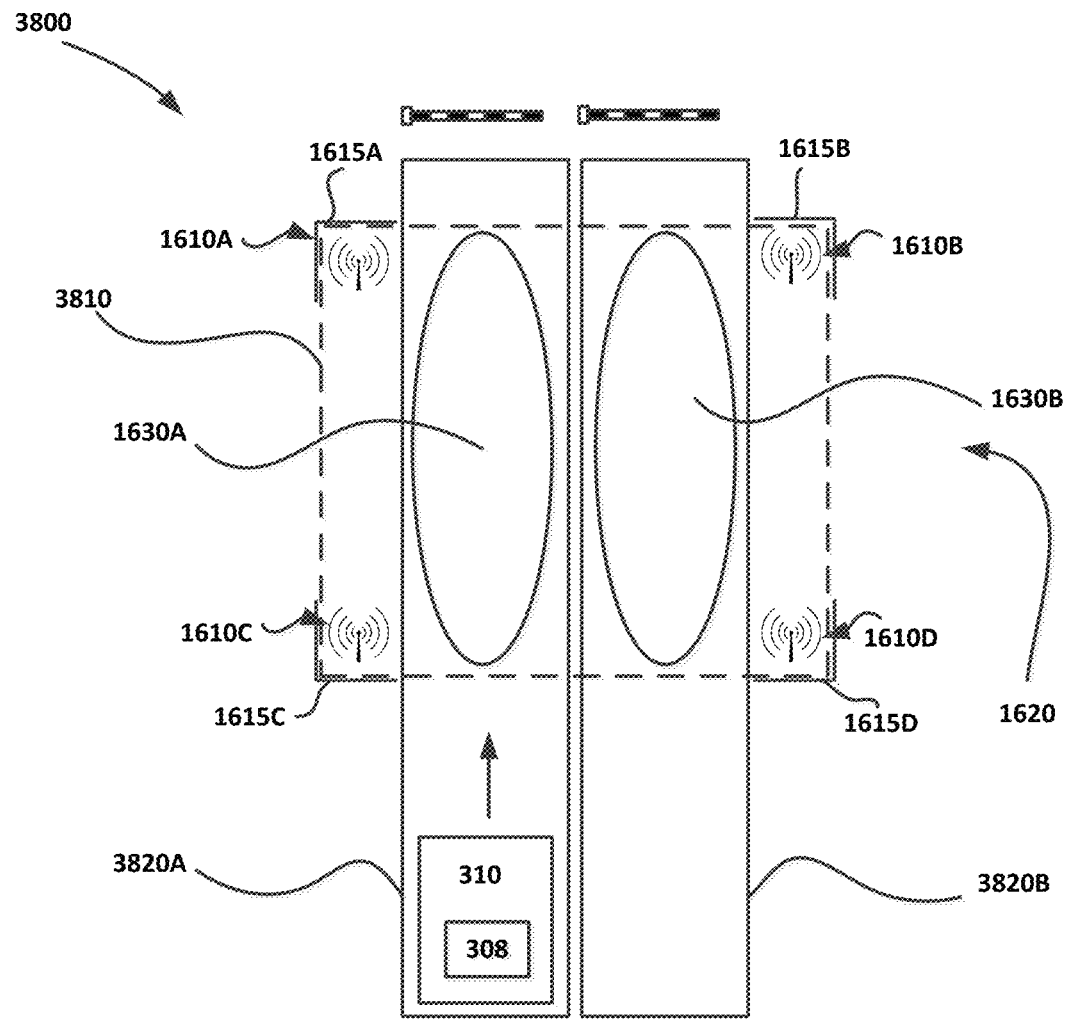
FIG. 36 illustrates a plan view of an example alternate transmitter arrangement for a system to operate with an access control system, wherein the mobile communication device is located outside both detection areas.
Figure 37:
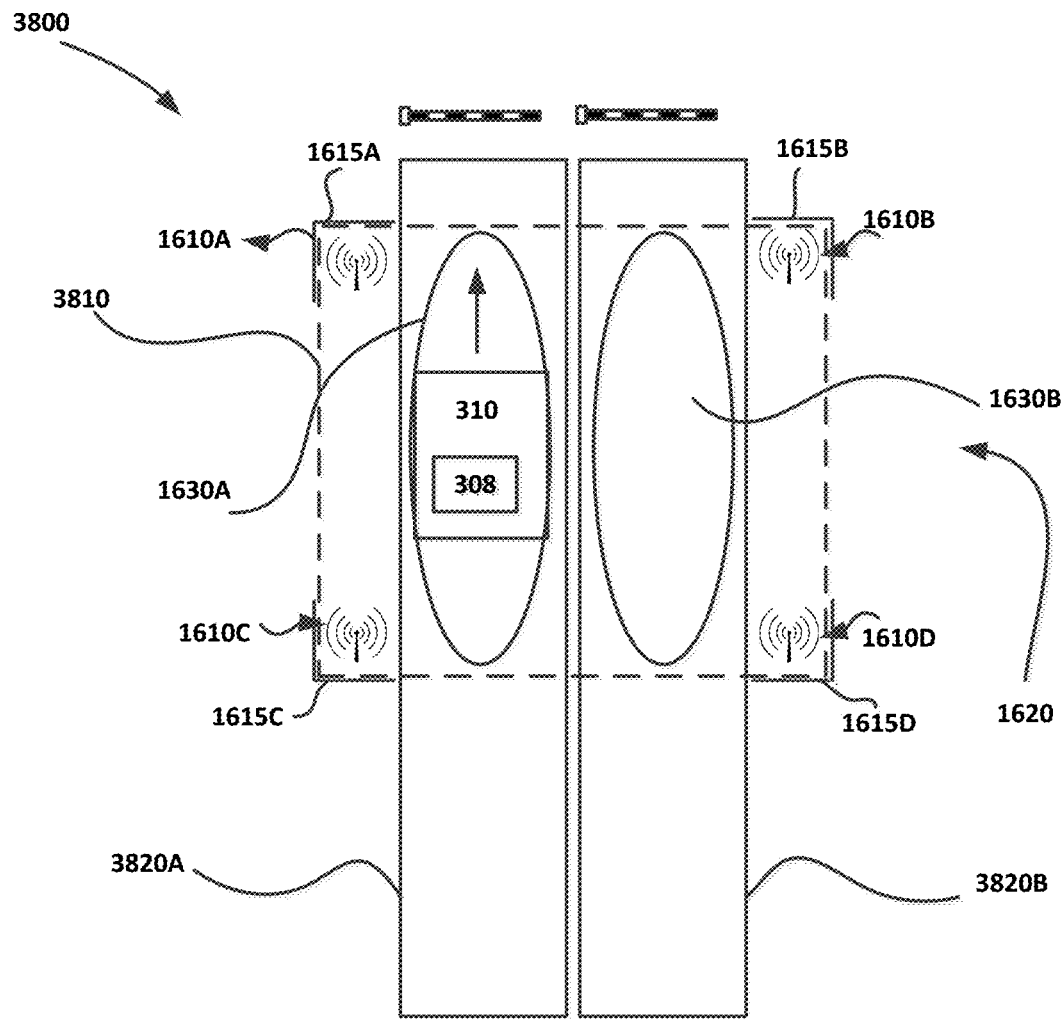
FIG. 37 illustrates a plan view of the alternate transmitter arrangement of FIG. 36, wherein the mobile communication device is located within a left detection area.

Referring to FIGS. 36 and 37 there is shown a further example transmitter arrangement 3800 for two entry points provided for two lanes 3820A, 3820B for vehicles. Each entry point has an associated entry point assembly 304A, 304B. The transmitters 1610A, 1610B, 1610C, 1610D utilise reflector antennas 1615A, 1615B, 1615C, 1615D as discussed above. In this example, a signal processing technique can be performed by mobile communication device 310 in the left or right lane to determine if an entry request should be transferred based on the signals received from the four transmitters 1610A, 1610B, 1610C, 1610D. In particular, the mobile communication device 310 determines a mask value based on the received signal strength of the transmitter signals and then determines a mean value of the received signal strength of the transmitter signals, wherein the mean value has been masked by the mask value. The masked mean value can then be used to determine if one or more criteria have been satisfied to indicate that the mobile communication device 310 is located in a detection area associated with a particular lane 3820A, 3820B, wherein distinct and different detection areas 1630A, 1630B are defined within the common transmitting area 3810 for the transmitters 1610A, 1610B, 1610C, 1610D.

More specifically, the masked mean value can be used to determine whether the mobile communication device 310 for a vehicle is located within a left portion or a right portion of a perimeter 3810 defined by the transmitters 1610A, 1610B, 1610C, 1610D transmitting across the two lanes 3820A, 3820B. Thus, instead of installing four transmitters per vehicular lane at each entry or exit point to define a detection area for a single lane, the four transmitters 1610A, 1610B, 1610C, 1610D may be shared for two neighbouring lanes 3820A, 3820B at two neighbouring entry/exit points, wherein the above signal processing using the mask value can be used by a mobile communication device 310 to determine whether the mobile communication device is located in a left or right lane. Therefore, in some circumstances only half the transmitters 1610 may need to be installed for a particular entry or exit area where multiple lanes are provided. Furthermore, this arrangement of the transmitters may be necessary in circumstances where there may be physical constraints for installing transmitters 1610 between neighbouring vehicular lanes. As shown in FIG. 38A, the mobile communication device 310 would not be detected as being located in either the left or right detection areas 1630A, 1630B. However, in FIG. 38B as the vehicle associated with the mobile communication device 310 approaches the entry point, the mobile communication device using the above described signal processing technique determines that it is located within the left detection area 1630A.

Figure 38:
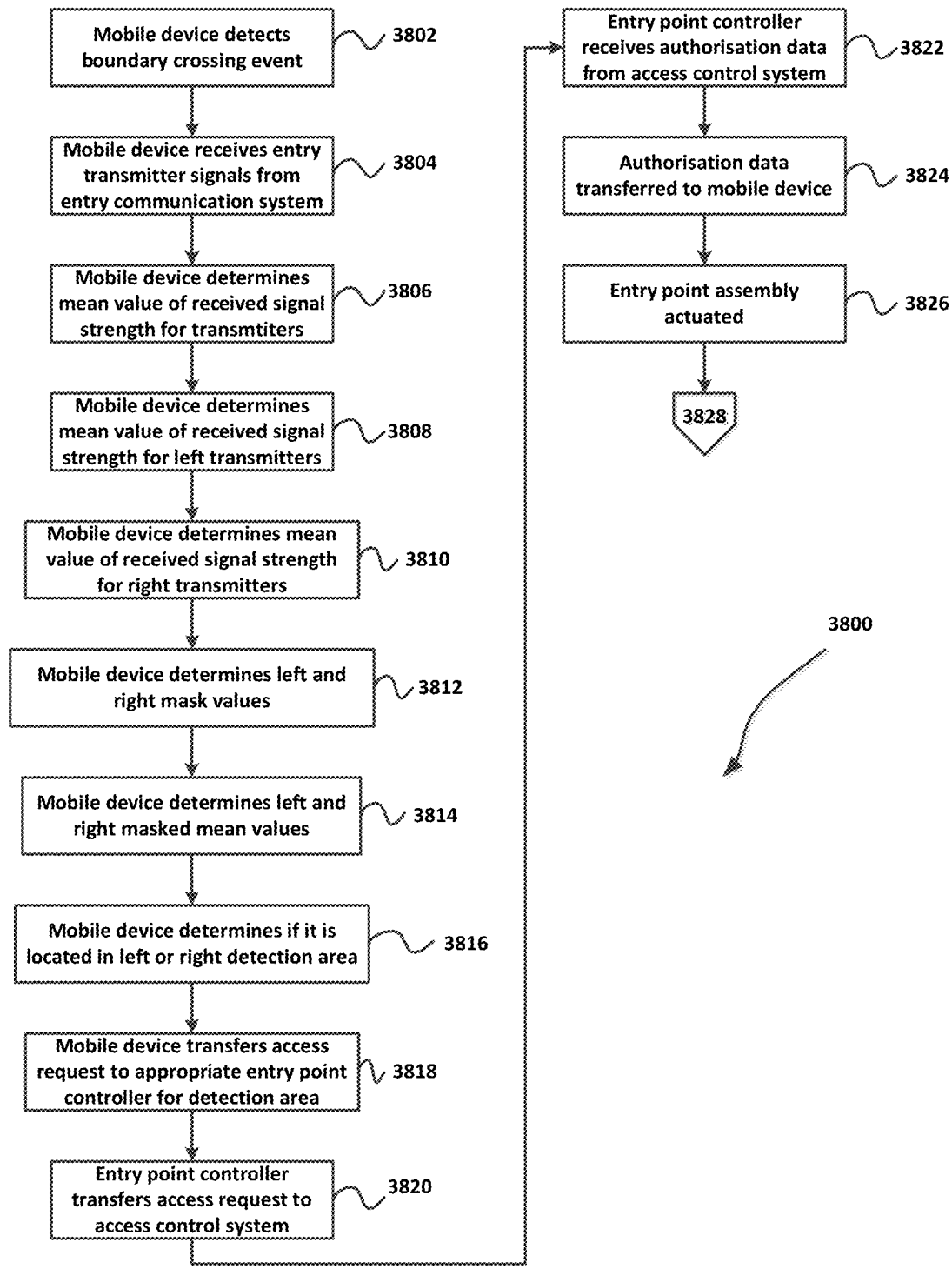
FIGS. 38 and 39 illustrate a flow chart representing a method performed by a system including the mobile communication device and access control system for the alternate transmitter arrangement of FIGS. 36 and 37.
Figure 39:
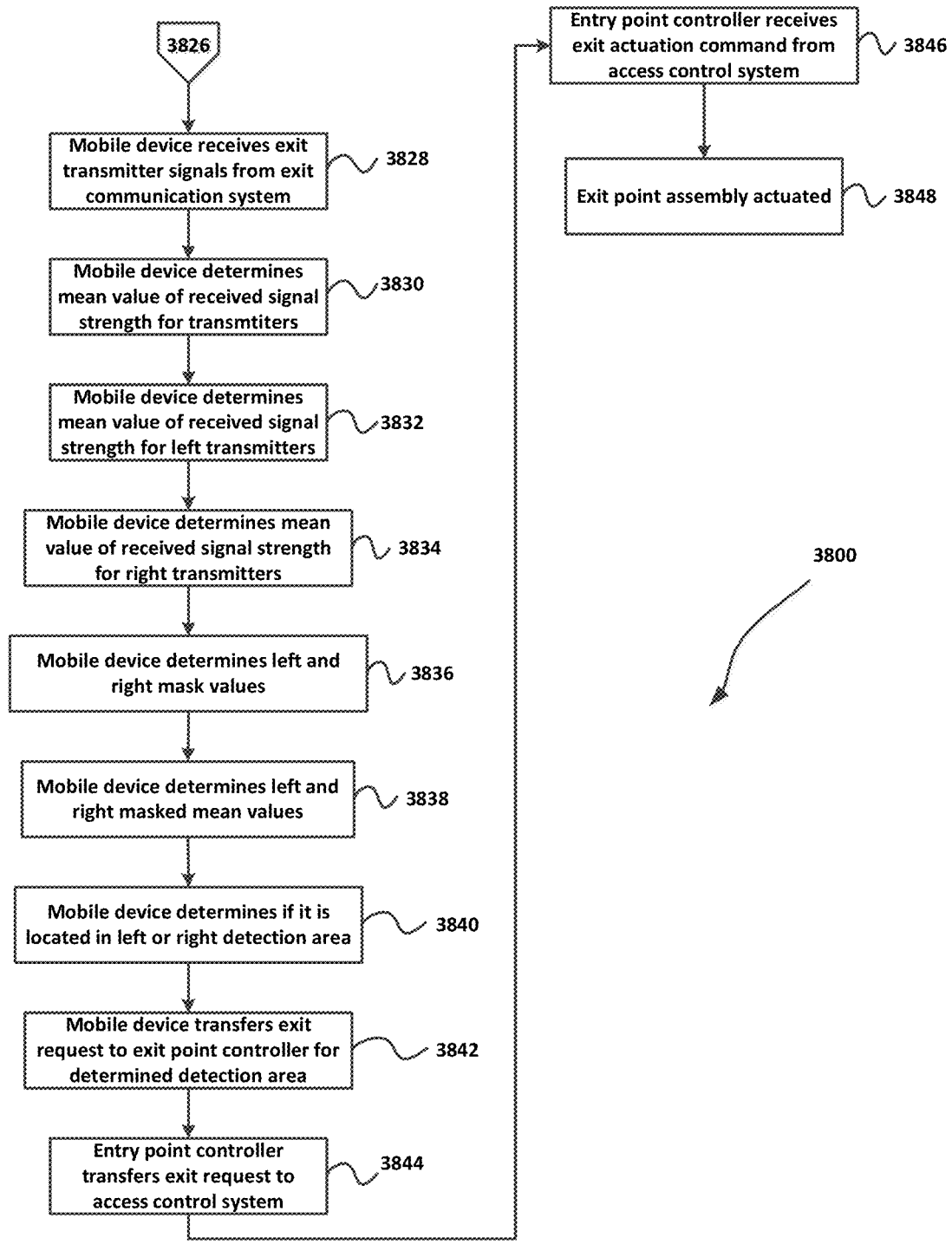

Referring to FIGS. 38 and 39 there is shown a flow chart representing a method 3900 of performing the signal processing discussed in relation to FIGS. 36 and 37. Method 3800 will be described initially with reference to the transmitter arrangement of FIG. 36 and FIG. 37 operating at entry points and then later operating at exit points. This transmitter arrangement can be used in relation to the system described in relation to FIG. 17A. It will be appreciated that the terms "left" and "right" are being used throughout the description of these examples for the purposes of clarity, thus the examples are not limited to specific left and right configurations and the terms "first" and "second" can be interchanged for the terms "left" and "right" respectively throughout these examples for a more general example.

In particular, step 3802 of the method 3800 is performed in the same manner of as step 1752.

As the user approaches an entry point of the vehicular parking facility, step 3804 of the method 3800 is performed in the same manner as step 1754.

At step 3806, the method 3800 includes the mobile communication device 310 determining a mean value indicative of the received signal strength based on the received entry transmitter signals. In one particular form, the mean value may be a harmonic mean value. Other mean values can be determined.

At step 3808, the method 3800 includes the mobile communication device 310 determining a mean value indicative of the received signal strength for signals received from a left pair of the transmitters. In the transmitter arrangement shown in FIGS. 36 and 37, this may be transmitters 1610A and 1610C. In one particular form, the mean value may be a harmonic mean value. Other mean values can be determined.

At step 3810, the method 3800 includes the mobile communication device 310 determining a mean value indicative of the received signal strength for signals received from a right pair of the transmitters. In the transmitter arrangement shown in FIGS. 36 and 37, this may be transmitters 1610B and 1610D. In one particular form, the mean value may be a harmonic mean value. Other mean values can be determined.

At step 3812, the method 3800 includes the mobile communication device 310 determining left and right mask values based on the mean values for the left and right pairs of transmitters. Specifically, each mask value is determined as a value that ranges between 0 and 1. In a particular form, in the event that a left mask value is to be calculated for use in determining if the mobile communication device is located in the left lane as shown in FIGS. 36 and 37, Equation 2 below can be used:

$$mask_L(i) = \frac{10\log_{10}(mean_L) - 10\log_{10}(mean_R)}{0.5 \times FBR} + 0.5 \qquad \text{Equation 2}$$

where:
  $mask_L(i)$ is the left mask value for a sample.
  $mean_L(i)$ is the mean value (mW) for a sample of the left transmitters.
  $mean_R(i)$ is the mean value (mW) for a sample of the right transmitters.
  FBR is the front to back ratio (dB) for the antenna of the transmitters.

In the event that a right mask value is to be calculated, Equation 3 can be used as shown below:

$$mask_R(i) = \frac{10\log_{10}(mean_R(i)) - 10\log_{10}(mean_L(i))}{0.5 \times FBR} + 0.5 \qquad \text{Equation 3}$$

where:
  $mask_R(i)$ is the left mask value for a sample.
  The '0.5' which appears in the denominator of Equations 2 and 3 is used to square the mask value such that there is a clear distinction between the segments of the detection area. It will be appreciated that this value is merely exemplary and that depending upon the circumstances this value can be increased or decreased in order to more clearly define the boundary of the detection area. The value 0.5 which is added to the initial portion of Equations 2 and 3 results in the mask value ranging between 0 and 1.

At step 3814, the method 3800 includes the mobile communication device 310 determining a left and right masked mean value using the mean value and the left and right mask values respectively. In one form, the masked mean value may be expressed in dBm. Therefore, the left and right masked mean values expressed in dBm may be calculated according to Equation 4 and 5 respectively:

$$mean_{L,masked}(i) = 10\log_{10}(mean_{L,R}(i)) \times mean_L(i) \qquad \text{Equation 4}$$

$$mean_{R,masked}(i) = 10\log_{10}(mean_{L,R}(i)) \times mean_R(i) \qquad \text{Equation 5}$$

where:
  $mean_{L,masked}(i)$ is the left masked mean value for a sample.
  $mean_{R,masked}(i)$ is the right masked mean value for a sample.
  $mean_{L,R}(i)$ is the mean value (mW) for a sample received from the left and right transmitters.

At step 3816, the method 3800 includes the mobile communication device 310 using the left and right masked mean values to determine if one or more criteria have been satisfied to indicate that mobile communication device 310 is located within a left or right detection area. For example, the left masked mean value may be compared to a left lane threshold to determine if the mobile communication device 310 is located in the detection area 1630A associated with the left lane. More specifically, in the event that the left masked mean value is greater than the threshold stored in memory of the mobile communication device 310, the mobile communication device 310 determines that the mobile communication device 310 is located in the detection area 1630A for the left lane. Similarly, the right masked mean value may be compared by the mobile communication device 310 to a right lane threshold stored in memory of the mobile communication device 310 to determine if the mobile communication device 310 is located in the detection area associated with the right lane. More specifically, in the event that the right masked mean value is greater than the threshold, the mobile communication device 310 determines that the mobile communication device 310 is located in the detection area 1630B for the right lane.

In the event that the left or right masked mean values satisfy (i.e. greater than or equal to) the respective threshold defining the respective left or right detection areas 1630A, 1630B, the method 3900 continues to proceed to step 3845. Otherwise, in the event that both the left and right masked mean values do not satisfy (i.e. less than or equal to) the respective thresholds, the method 3900 proceeds back to step 3804 whilst the entity associated with the mobile communication device 310 continues to approach an entry point 1630.

At step 3818, the method 3800 includes the mobile communication device 310 generating and transferring, to an entry point microcontroller 338 associated with the respective lane for the vehicle and via communication device 336, an entry request in response to one of the masked mean values satisfying the threshold. In a preferable form, the entry request is generated and transferred in an automated manner without user intervention (i.e. without the user holding the mobile communication device and without operating the mobile communication device).

Step 3820 of the method 3800 is performed the same as step 1760.

Step 3822 of the method 3800 is performed the same as step 1762.

Step 3824 of the method 3800 is performed the same as step 1764.

At step 3826 of the method 3800 is performed the same as step 1766.

The following steps of method 3800 will now be described based on the transmitter arrangement shown in FIGS. 36 and 37 operating at exit points.

As the user approaches an exit point of the vehicular parking facility, step 3828 of the method 3800 is performed the same as step 1768.

At step 3830, the method 3800 includes the mobile communication device 310 determining a mean value indicative of the received signal strength based on the received exit transmitter signals. In one particular form, the mean value may be a harmonic mean value. Other mean values can be determined.

At step 3832, the method 3800 includes the mobile communication device 310 determining a mean value indicative of the received signal strength for signals received from a left pair of the transmitters. In the transmitter arrangement shown in FIGS. 36 and 37, this may be transmitters 1610A and 1610C. In one particular form, the mean value may be a harmonic mean value. Other mean values can be determined.

At step 3834, the method 3800 includes the mobile communication device 310 determining a mean value indicative of the received signal strength for signals received from a right pair of the transmitters. In the transmitter arrangement shown in FIGS. 36 and 37, this may be transmitters 1610B and 1610D. In one particular form, the mean value may be a harmonic mean value. Other mean values can be determined.

At step 3836, the method 3800 includes the mobile communication device 310 determining left and right mask values based on the mean values for the left and right pairs of transmitters 1610A and 1610C, 1610B and 1610D. Specifically, each mask value is determined as a value that ranges between 0 and 1. In a particular form, in the event that a left mask value is to be calculated for determining if the mobile communication device 310 is located in the left lane as shown in FIGS. 36 and 37, Equation 2 can be used which is discussed above. In the event that a right mask value is to be calculated, Equation 3 can be used as discussed above.

At step 3838, the method 3800 includes determining a left and right masked mean value using the mean value and the left and right mask values respectively. In one form, the masked mean value may be expressed in dBm. Therefore, the left and right masked mean values expressed in dBm may be calculated by the mobile communication device 310 according to Equation 4 and 5 discussed above.

At step 3840, the method 3800 includes the mobile communication device 310 using the left and right masked mean values to determine if one or more criteria have been satisfied to indicate that mobile communication device 310 is located within a left or right detection area 1630A, 1630B at the exit points. For example, the left masked mean value may be compared to a left lane threshold to determine if the mobile communication device 310 is located in the detection area associated with the left lane. More specifically, in the event that the left masked mean value is greater than the threshold, the mobile communication device 310 determines that the mobile communication device 310 is located in the detection area 1630A for the left lane exit point. Similarly, the right masked mean value may be compared to a right lane threshold to determine if the mobile communication device 310 is located in the detection area 1630B associated with the right lane. More specifically, in the event that the right masked mean value is greater than the threshold, the mobile communication device 310 determines that the mobile communication device 310 is located in the detection area 1630B for the right lane exit point.

In the event that the left or right masked mean values satisfy (i.e. greater than or equal to) the respective threshold defining the respective left or right detection areas, the method 3800 continues to proceed to step 3842. Otherwise, in the event that both the left and right masked mean values do not satisfy (i.e. less than or equal to) the respective thresholds, the method 3800 proceeds back to step 3828 whilst the entity associated with the mobile communication device 310 continues to approach an entry point 1630.

At step 3842, the method 3800 includes the user's mobile communication device 310 transferring an exit request indicative of the authorisation data to the exit communication system 356 associated with the detected lane in response to the respective mean value satisfying (i.e. greater than or equal to) the respective exit threshold. In a preferable form, the exit request is generated and transferred in an automated manner without user intervention (i.e. without the user holding the mobile communication device and without operating with the mobile communication device). The exit request is indicative of at least the authorisation data in this example.

At step 3844, the method 3800 includes the communication device 356 transferring the exit request to the access control processing system 312 and the ticket reading machine 316. In particular, the exit communication device 356 of the exit point microcontroller 358 transfers the exit request to the ticket reading machine 316 via the data cable 338. The ticket-reading machine 316 then transfers the exit request to the access control processing system 312 via the LAN.

Step 3846 of the method 3800 is performed the same as step 1774.

Step 3848 of the method 3800 is performed the same as step 1776.

It will be appreciated that received signal strength values may be scaled for method 3900. For example, scaling may be performed such that the magnitude of particular values can be expressed more advantageously from a memory management and processing speed point of view. In particular, RSSI values expressed in dBm may be offset by 100 dBm such that values expressed in Watts or milliwatts can be stored in data structures such as an integer data structure or the like. In the event that the masked mean value is to be compared to a threshold value in dBm, the masked mean value may be adjusted (such as subtracting −100 dBm) or the threshold can be adjusted according to this scaling. Additionally or alternatively, due to the various positions which the mobile communication device 310 may be located in a vehicle which may affect the reception experienced by the respective mobile communication device, the method 3800 can be modified to apply entry and exit scale values to received signal strength values to determine whether the mobile communication device 310 is located in a particular detection area associated with a particular lane.

Figure 40A:
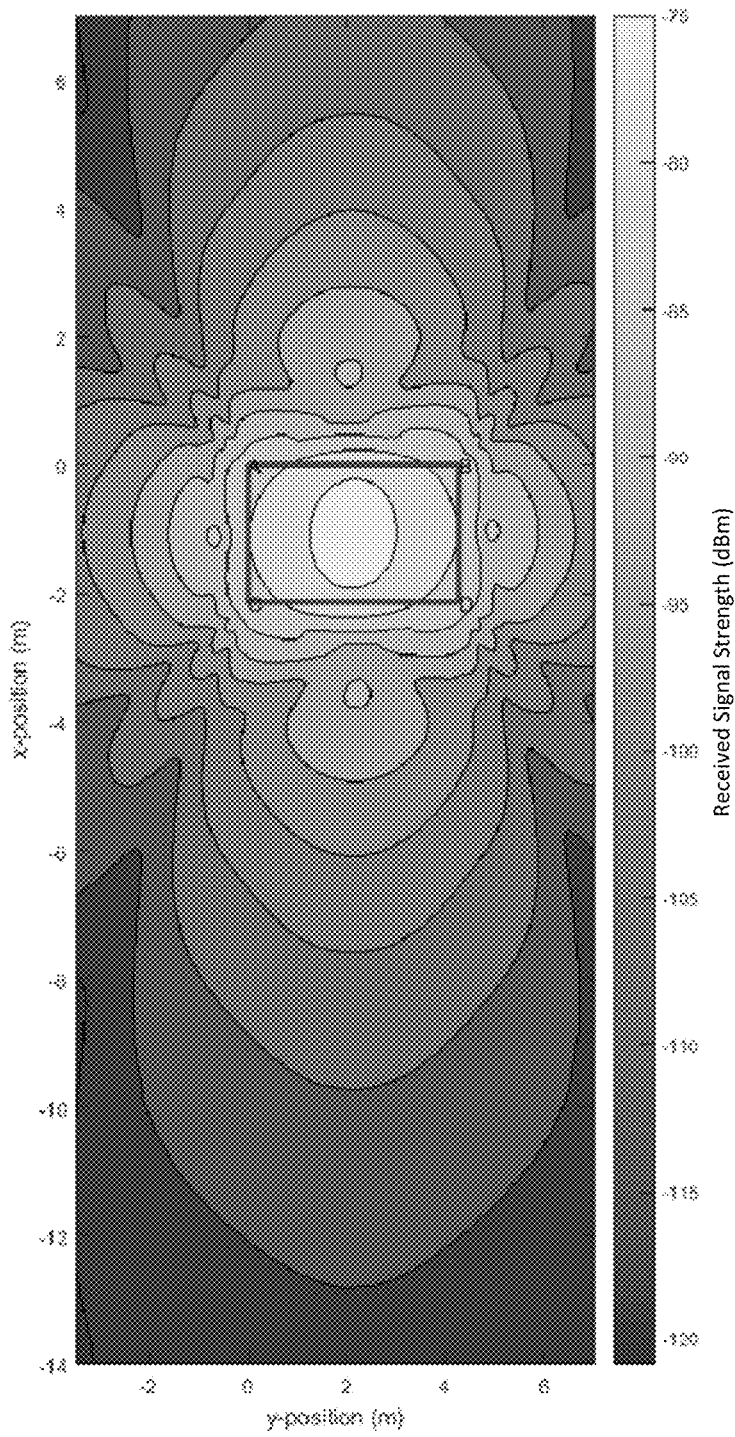
FIG. 40A is a contour plot representation showing the mean value at various positions calculated for the alternate transmitter arrangement of FIGS. 36 and 37.
Figure 40B:
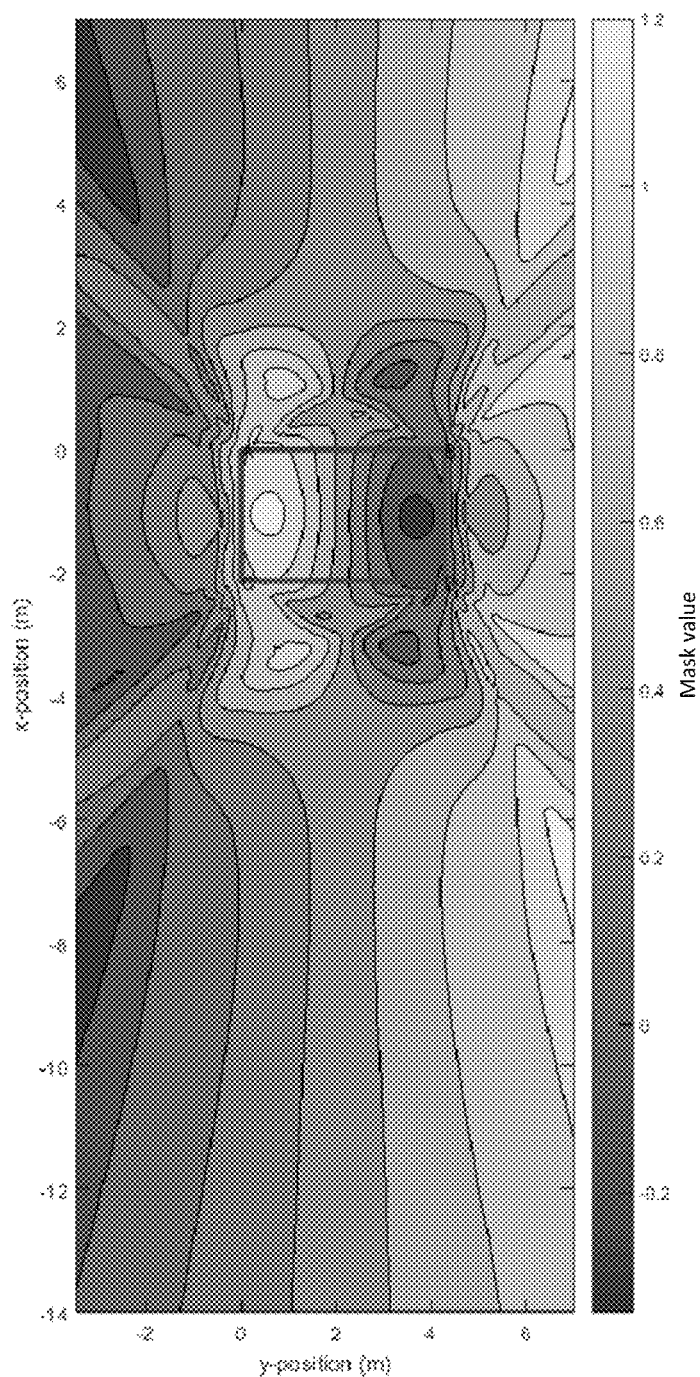
FIG. 40B is a contour plot representation showing a discrepancy between a left mean value and a right mean value at various positions calculated for the alternate transmitter arrangement of FIGS. 36 and 37.
Figure 40C:
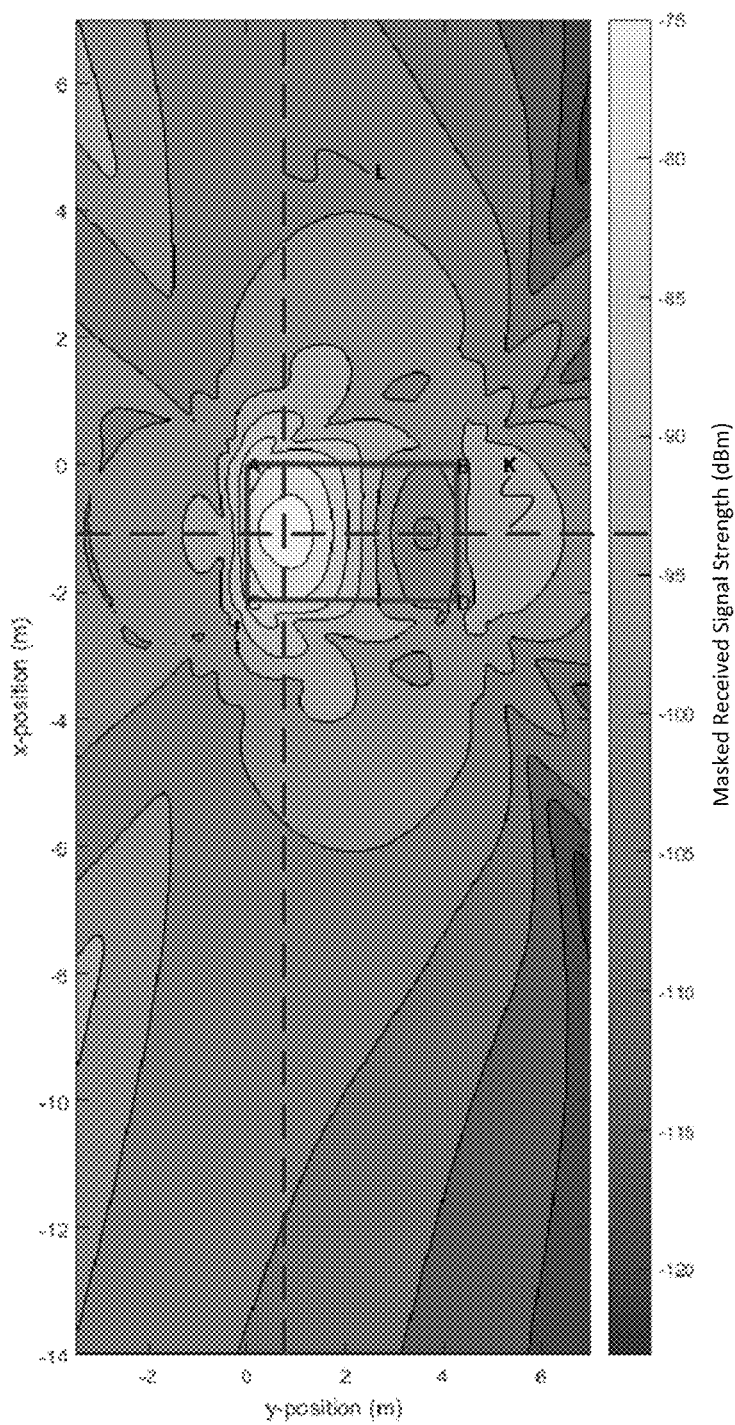
FIG. 40C is a contour plot representation showing the masked mean value at various positions defining a left detection area for the alternative transmitter arrangement of FIGS. 36 and 37.
Figure 41:
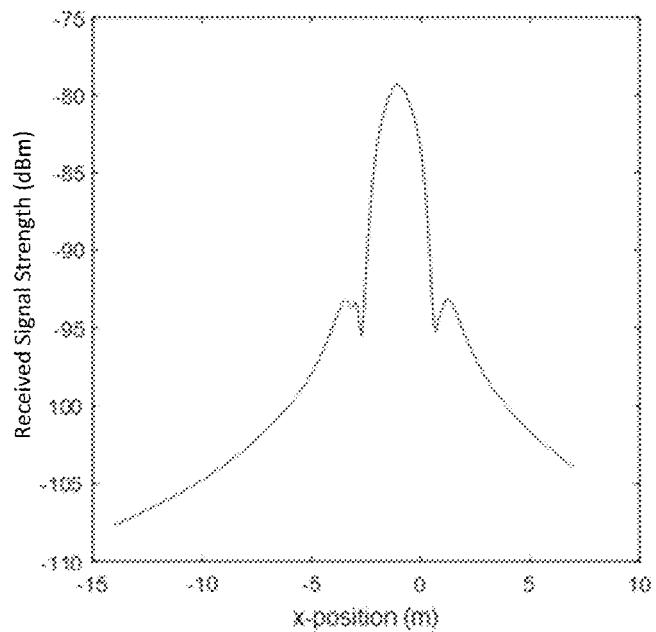
FIG. 41 is a graph showing the masked mean value at positions along line K.
Figure 42:
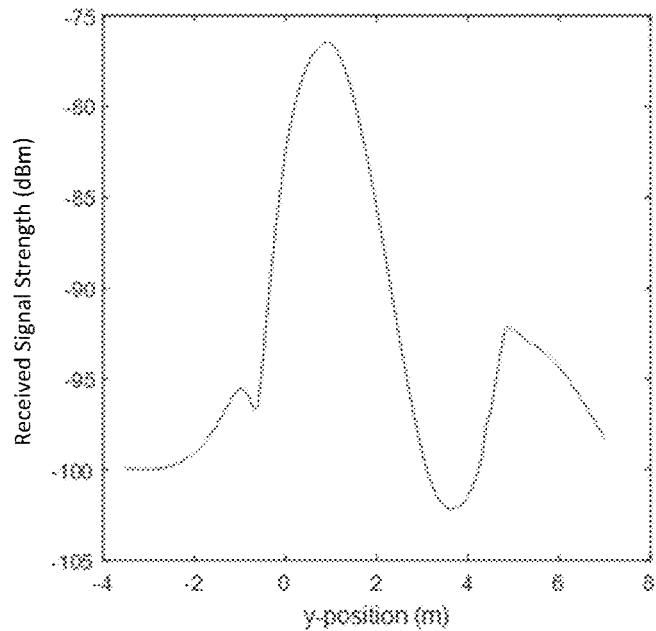
FIG. 42 is a graph showing the masked mean value at positions along line L.
Figure 43:
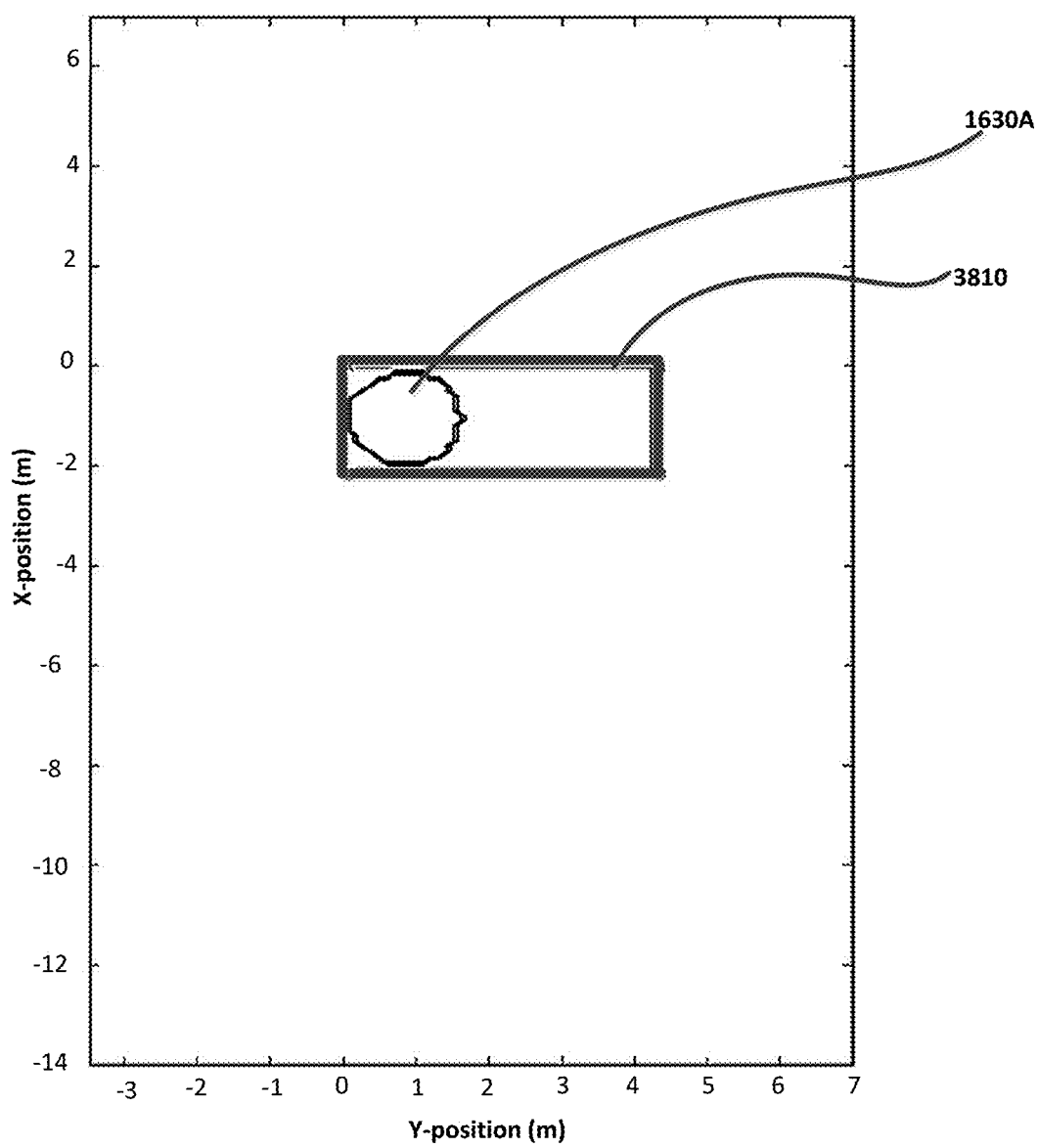
FIG. 43 is a two dimensional plot showing the boundary of the left detection area defined by a threshold for the alternate transmitter arrangement of FIGS. 36 and 37.

Referring to FIGS. 40A, 40B and 40C there is shown three contour plots based on a simulation which illustrate the signal processing being performed for detecting whether a mobile communication device 310 located within a vehicle is located in a left or right lane using the transmitter layout shown in FIGS. 36 and 37. The contour plot of FIG. 40A shows the mean harmonic value of the received signals from the transmitters that is determined at various positions. The contour plot of 40B shows a left mask value for the left pair of transmitters determined at various positions. The contour plot of 40C shows the multiplication of the first contour plot (i.e. the mean value) and the second contour plot (the mask value) which results in the masked mean value at various positions. As can be seen in the third contour plot, the higher RSSI values are shown in the left portion of the common transmitting area 3810 for the transmitters 1610. FIGS. 41 and 42 show the RSSI values in the x and y axis for the third contour plot. By setting an appropriate threshold value, a detection area for the left lane can be defined as shown in FIG. 43.

Figure 44:
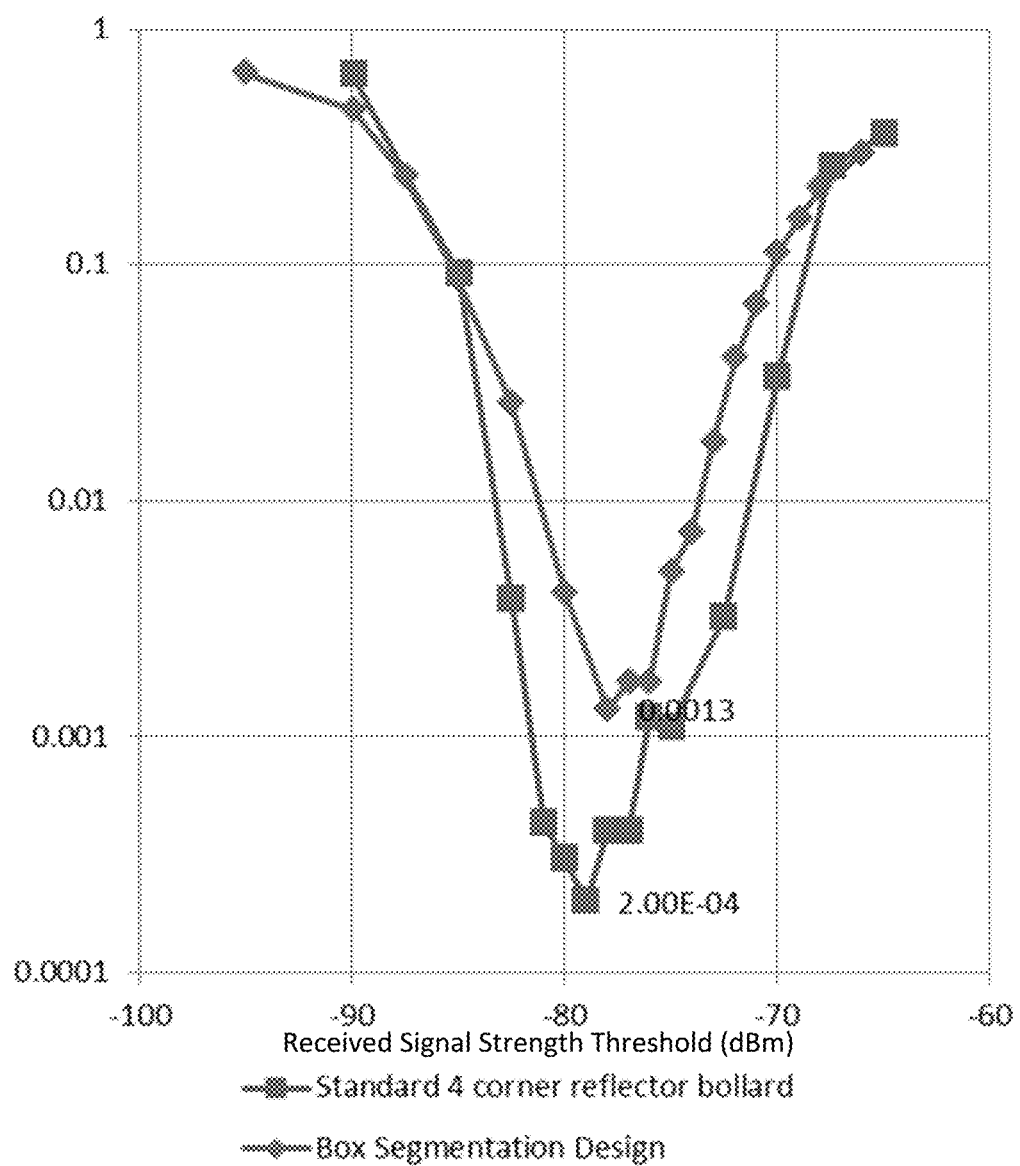
FIG. 44 is a graph showing a comparison of an error rate between the alternate transmitter arrangement of FIGS. 16A and 16B compared to the alternate transmitter arrangement of FIGS. 36 and 37.

Referring to FIG. 44 there is shown an error rate comparison between the design discussed in relation to the transmitter arrangement discussed in relation to FIGS. 16A and 16B compared to the transmitter arrangement discussed in relation to FIGS. 38A and 38B. As can be seen, the transmitter arrangement of FIGS. 38A and 38B has a minimum error rate of 0.13% (i.e. 99.87% success rate) which is a higher error rate than the transmitter arrangement of FIGS. 16A and 16B (0.02% resulting in a 99.98% success rate). However, given that the error rate is still extremely small, the benefits in installing half (or approximately half depending upon the physical arrangement) the transmitters needed to detect whether a vehicle is located in a left lane or right lane may be considered more advantageous despite the slightly higher error rate.

It will be appreciated that if there are a large number of neighbouring entry or exit points, the above described alternate transmitter arrangement can be used, where a set of transmitters 1610 transmit across two neighbouring lanes. Therefore, there may be a plurality of sets of transmitters in such a configuration.

As discussed above, the mobile communication device 310 can receive configuration data from the server processing system 340. The server processing system 340 may be a cloud server. The configuration data can include data regarding the configuration of one or more communication systems 306 associated with one or more restricted areas. In particular, the configuration data can include unique device identities (such as a universally unique identifier, MAC addresses, etc) for each entry and exit communication device and the associated identity of the restricted area (i.e. identity of the parking facility or the like), calibration data such as transmission characteristics of each entry and exit communication device and the side of a vehicle path each communication device is located. The computer program 308 can configure the mobile communication device 310 to obtain updated configuration data from time to time. The configuration data may be pushed to or pulled by the mobile communication device 310 from the cloud server 340. Therefore, in the event that a particular communication system 306 is reconfigured thereby altering the various transmission characteristics of the particular communication system 306 for a restricted area, the configuration data can be altered at the cloud server 340, wherein each mobile communication device 310 obtains the altered configuration data in a timely manner (e.g. within 6 hours).

The systems described are advantageous as the mobile communication device 310 transmits the entry/exit request using a short range wireless communication network to the local communication system 306. Thus, the user does not require Internet access to be able to enter or exit the restricted area. However, in a variation on these systems, the entry request and exit request can be alternatively transferred via a WAN, such as the Internet, to the server processing system 340 for processing. An example of this system arrangement 1502 is shown in FIG. 15. It will be appreciated that some restricted areas (e.g. underground parking facilities) may not be appropriate for such a configuration. However, for areas which are appropriate where the mobile communication device 310 is able to access the Internet using mobile communication services, the server processing system 340 can be configured to process the received entry or exit request based on the data stored in the data store 342 to determine the validity of the request. In response to positive validation, the server processing system 340 can transfer a command to the access control processing system 312 of the access control system 1504 to actuate the respective entry/exit control assembly 318, 320 (i.e. boom gate or the like) to allow the user to enter or exit the restricted area. In some instances the entry/exit control assembly 318/320 may be more sophisticated and can receive data directly from the server processing system 340. The systems 1502 and 1504 operate together to form system 1500.

It will be appreciated that whilst the previous examples have shown a single server processing system 340, it is possible that a server processing system may include a distributed server processing system including multiple server processing systems.

It will be appreciated that whilst in previous examples the entry point microcontroller 338 and the exit point microcontroller 358 are not directly connected to the access control processing system 312 (rather indirectly via the ticket issuance machine 314 and the ticket reading machine 316), it is possible for the system 300 to be modified such that the entry point microcontroller 338 and the exit point microcontroller 358 can be configured to be connected directly to the access control processing system 312 via a communication medium such as via a data cable (e.g. network cable) such that direct communication can take place between the respective processing systems.

In the examples described above, no user interaction with the mobile communication device 310 is required in order for the entry request or exit request to be generated and transferred. However, in particular variations on these examples, the mobile communication device 310 may be configured by the computer program 308 to allow the user to interact with a user interface of the computer program which is presented via the display of the mobile communication device 310 in order to generate and transfer the entry request or exit request. In certain examples, analysis of the received signal strength of the entry and exit signals are unnecessary as the user simply interacts with the interface when they are about to enter or exit the restricted area. However, in other examples, the analysis of the received signal strength of the entry and exit signals can be used by the mobile communication device 310 to enable a portion of the interface which is normally disabled. In particular, prior to approaching the entry or exit point of the restricted area, a portion of the interface of the computer program 308, such as a button, is disabled. The mobile communication device 310 is configured by the computer program to analyse the received signal strength as discussed above in prior examples. When the mobile communication device 310 determines that the one or more entry or exit criteria have been satisfied, the computer program 308 enables the button of the interface such that the user can then select the button to instruct the mobile communication device to generate and transfer the entry or exit request. This configuration reduces the risk that a user in a queue at the entry or exit point interacts with the computer program 308 to generate and transfer an entry or exit request which actually allows a different user located ahead in the queue to enter or exit the restricted area.

Figure 45:
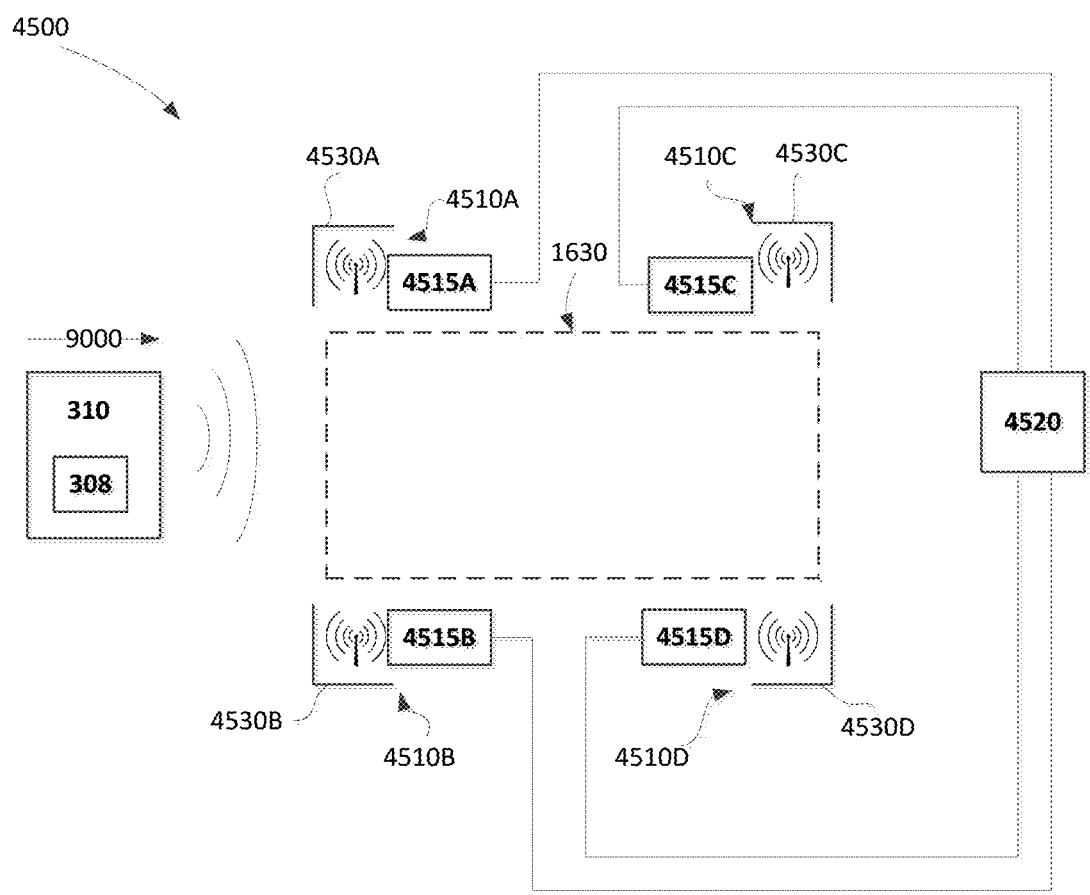
FIG. 45 is a further system for detecting if a mobile device is located within a detection area.

In another example shown in FIG. 45, there is provided a system 4500 which can include a mobile device 310, a plurality of receivers 4510 (4510A, 4510B, 4510C, 4510D) and a processing system 4520. Each receiver 4510 has associated therewith a reflector antenna 4530 (4530A, 4530B, 4530C, 4530D). The mobile device 310 is configured to transmit a signal which is received by at least two receivers 4510. The receivers 4510 which receive the signal communicate a received signal strength to the processing system 4520. The processing system 4520 determines based on the received signal strengths for at least two of the receivers 4510 whether the mobile device 310 is located within a detection area 1630. Similarly to previous examples, the processing system 4520 can determine a mean of the received signal strengths and then determine whether criteria has been satisfied based on the mean value to indicate that the mobile device 310 is located within the detection area 1630. As the reflector antennas 4530 act as a shield, some of the receivers 4510 will not receive the signal transmitted by the mobile device 310 when the mobile device 310 is located outside the detection area, or at least the received signal strength at these receivers 4510 will be low compared to when the mobile device 310 is located within the detection area. For example, in FIG. 45, the reflector antennas 4530A and 4530B act as a shield for receivers 4510A, 4510B, thus the mean value is lower thereby allowing for the system to correctly determine that the mobile device 310 is not located in the detection area 1630. Each receiver 4510 may have an associated receiver processing system 4515 to determine the received signal strength and communicate the received signal strength to the processing system 4520.

This arrangement of receivers 4510 discussed in relation to FIG. 45 can be substituted for the transmitter arrangement used in system 1700. The mobile communication device 310 of system 1700 can be reconfigured to periodically transmit a signal, such as a Bluetooth signal, when approaching or within the detection area. The processing system 4520 which determines the mean received signal strengths can be the entry point microcontroller 338 or exit point controller 358 of system 1700 which receives the received signal strengths from the receiver processing systems 4515 that receive the signal transmitted by the mobile device 310. The entry point microcontroller 338 or exit point microcontroller 358 can then determine whether criteria has been satisfied to indicate whether the mobile device 310 is located within the detection area 1630.

In examples where the monitoring system monitors a vehicle entering or exiting an area, the mobile device 310 may be part of the vehicle rather than a separate device, such as a smart phone, located within the vehicle. For example, the mobile device 310 may an on-board processing system of the vehicle. In certain embodiments of this example, the vehicle could be an autonomous or semi-autonomous vehicle.

It will be appreciated that for systems described in relation to FIGS. 17 and 36, substantially simultaneous entry or exit requests may be received by the access control system 304 from multiple mobile communication device 310 located within the detection area. In this regard, the entry request and the exit request generated by each mobile communication device can be indicative of one or more wireless devices which the mobile communication device is currently connected thereto, wherein in the event that the communication system receives data indicative of a plurality of substantially simultaneous entry or exit requests received from multiple mobile communication devices, the one or more connected wireless devices indicated by at least one of the entry request or exit request is used to at least partially determine which entry or exit request from the plurality of substantially simultaneous entry or exit requests to process. For example, the entry or exit request from one of the mobile devices which is connected to a in-vehicle hands-free system may be accepted for processing and the remaining requests may be disregarded.

In an additional or alternate manner to address substantially simultaneous entry or exit requests being received by the access control system 304, the mobile communication device 310 can determine, based on the received signal strength of the received signals from the transmitters 1610, which side or quadrant of the detection area the mobile device 310 is positionally offset within the detection area. Each entry or exit request can indicate the positional offset of the mobile device within the detection area. The access control system 304 can then use the positional offset of each mobile device to filter the entry or exit requests. For example, the access control system 304 may accept an entry or exit request from a mobile device 310 indicating a positional offset corresponding to a front right quadrant in the event that drivers are conventionally located in the front right portion of the vehicle. In jurisdictions where the driver is located in the front left portion of the vehicle, the access control system 304 may accept an entry or exit request from a mobile device indicating a positional offset corresponding to a front left quadrant. Other entry or exit requests which were received substantially simultaneously can then be dismissed.

Many modifications within the scope of the invention will be appreciated by those skilled in the art without department from the spirit of the invention.

What is claimed is:

1. A system including:
a plurality of transmitters, each transmitter having associated therewith a reflector antenna configured to substantially reflect signal transmission toward a detection area, wherein the reflector of at least some of the plurality of transmitters face substantially toward each other to thereby define at least some of the detection area located therebetween; and
a mobile device configured to:
receive transmitter signals from at least two transmitters from the plurality of transmitters; and
determine that the mobile device is located within the detection area based on received signal strengths of the at least some of the transmitter signals.

2. The system according to claim 1, wherein each reflector antenna is a corner reflector antenna.

3. The system according to claim 2, wherein the respective reflecting walls of each reflector antenna are walls of a bollard housing the respective transmitter.

4. The system according to claim 3, wherein a dipole driven element of each transmitter is spaced from the corner reflector antenna by a spacing bracket mounted within the respective bollard.

5. The system according to claim 3, wherein each bollard includes a cutout section to enable transmission of the respective transmitter signal by the respective transmitter.

6. The system according to claim 1, wherein the plurality of transmitters includes:
two transmitters;
three transmitters, wherein the plurality of transmitters are spaced apart from each other in a triangular configurations; or
four transmitters, wherein the plurality of transmitters are spaced apart from each other in a quadrilateral configurations.

7. The system according to claim 1, wherein the plurality of transmitters are Bluetooth devices.

8. The system according to claim 1, wherein the determination that the mobile device is located within the detection area is based on a mean value of the received signal strengths.

9. The system according to claim 8, wherein the mean value is one of:
a harmonic mean value; and
a geometric mean value.

10. The system according to claim 8, wherein the mobile device is configured to determine a mask value using the received signal strengths for the least some of the transmitters, wherein the mobile device uses the mean value and the mask value to determine if the mobile device is located in one of a plurality of detection areas associated with the plurality of transmitters.

11. The system according to claim 8, wherein the mobile device is configured to:
determine a first mask value based on a discrepancy between a first mean value of the received signal strength for signals received from a first pair of the transmitters of the plurality of transmitters and a second mean value of the received signal strength for signals received from a second pair of the transmitters of the plurality of transmitters;
determine a second mask value based on a discrepancy between the second mean value the first mean value;
determine if the mobile device is located in a first detection area in the event that one or more first criteria are satisfied based on masking the mean value using the first mask value; and
determine if the mobile device is located in a second detection area in the event that one or more second criteria are satisfied based on masking the mean value using the second mask value.

12. The system according to claim 8, wherein the mobile device is configured to determine that the mobile device is located within the detection area in response to the mobile device determining that the mean value of the received signal strengths is greater than or equal to a signal strength threshold over a threshold period of time.

13. The system according to claim 8, wherein the mobile device is configured to determine that the mobile device is located within the detection area in response to the mobile device determining that the mean value of the received signal strengths is greater than or equal to a first signal strength threshold over a threshold period of time starting when the mean value of the received signal strengths is greater than a second signal strength threshold, wherein the second signal strength threshold is greater than the first signal strength threshold.

14. The system according to claim 1, wherein the mobile device is configured to transfer data indicative of the determination that the mobile device is within the detection area to a monitoring system.

15. The system according to claim 14, wherein the monitoring system includes a controller with an associated communication device, wherein the data indicative of the determination is an access request generated and transferred by the mobile device which is received by the controller via the communication device, wherein the controller is configured to facilitate, based on the request, instructing an access control system to allow the entity to travel through an entry or exit point.

16. The system according to claim 15, wherein the entry or exit points are associated with a vehicular parking facility.

17. The system according to claim 16, wherein at least one of the entry request and the exit request generated by the mobile communication device is indicative of one or more wireless devices which the mobile communication device is currently connected thereto, wherein in the event that the controller receives data indicative of a plurality of substantially simultaneous entry or exit requests received from multiple mobile communication devices, the one or more connected wireless devices indicated by at least one of the entry request or exit request is used to at least partially determine which entry or exit request from the plurality of substantially simultaneous entry or exit requests to process.

18. The system according to claim 16, wherein the mobile communication device is configured to determine, using the received signal strengths of the at least some of the transmitter signals, a positional offset of the mobile device within the detection area, wherein at least one of the entry or exit request is indicative of a positional offset of the mobile device within the detection area, wherein in the event that the controller receives data indicative of a plurality of substantially simultaneous entry or exit requests received from multiple mobile communication devices, the positional offset indicated by at least one of the entry request or exit request is used to at least partially determine which entry or exit request from the plurality of substantially simultaneous entry or exit requests to process.

19. The system according to claim 1, wherein the mobile device is an on-board processing system of a vehicle.

20. A method including:
    transmitting, from a plurality of transmitters, transmitter signals, wherein each transmitter has associated therewith a reflector antenna configured to substantially reflect signal transmission toward a detection area, wherein the reflector of at least some of the plurality of transmitters face substantially toward each other thereby defining at least some of the detection area located therebetween; and
    determining, at a mobile device, that the mobile device is located within the detection area based on received signal strengths of at least two transmitter signals of the plurality of transmitter signals.

21. The method according to claim 20, wherein the mobile device is an on-board processing system of a vehicle.

22. A system including:
    a plurality of transmitters, each transmitter having associated therewith a reflector antenna configured to substantially reflect signal transmission toward a detection area, wherein the reflector of at least some of the plurality of transmitters face substantially toward each other to thereby define at least some of the detection area located therebetween; and
    a non-transitory computer readable medium including a computer program executable by a mobile device, wherein execution of the computer program configures the mobile device to:
        receive transmitter signals from at least two transmitters from the plurality of transmitters; and
        determine that the mobile device is located within the detection area based on received signal strengths of the at least some of the transmitter signals.

23. The system according to claim 22, wherein the mobile device is an on-board processing system of a vehicle.

* * * * *